AUTOMATIC CONTROL APPARATUS

Filed Sept. 5, 1961 29 Sheets-Sheet 1

INVENTOR.
JOHN T. EVANS

BY

Irving Kayton

ATTORNEY

March 9, 1965 J. T. EVANS 3,173,001

AUTOMATIC CONTROL APPARATUS

Filed Sept. 5, 1961 29 Sheets-Sheet 2

INVENTOR.
JOHN T. EVANS

BY Irving Kayton

ATTORNEY

FIG. 4E
| A | B | C D | $G_N$ | $G_{N+1}$ | $H_N$ | $H_{N+1}$ |
|---|---|---|---|---|---|---|
| 0 | 0 | PULSE ABSENT | 0 | 0 | 1 | 1 |
| | | | 1 | 1 | 0 | 0 |
| 0 | 1 | | 0 | 0 | 1 | 1 |
| | | | 1 | 1 | 0 | 0 |
| 1 | 0 | | 0 | 0 | 1 | 1 |
| | | | 1 | 1 | 0 | 0 |
| 1 | 1 | | 0 | 0 | 1 | 1 |
| | | | 1 | 1 | 0 | 0 |
| (NOT ALLOWED) 0 | 0 | PULSE PRESENT | 0 | 0 | — | — |
| | | | 1 | 1 | — | — |
| 0 | 1 | | 0 | 1 | 1 | 0 |
| | | | 1 | 1 | 0 | 0 |
| 1 | 0 | | 0 | 0 | 1 | 1 |
| | | | 1 | 0 | 0 | 1 |
| 1 | 1 | | 0 | 0 | 1 | 1 |
| | | | 1 | 1 | 0 | 0 |
FIG. 4F
| | E | F | G | H |
|---|---|---|---|---|
| NORMAL STATE FOR OPERATION WITH TRIGGER INPUTS | 0 | 0 | NO CHANGE | |
| ELECTRONIC SET TO 0 STATE | 0 | 1 | 0 | 1 |
| ELECTRONIC SET TO 1 STATE | 1 | 0 | 1 | 0 |
| HOLDS BOTH OUTPUTS AT 0 LEVELS | 1 | 1 | 0 | 0 |
FIG. 4B
| A | B | (A+B) | $(\overline{A+B})$ |
|---|---|---|---|
| 0 | 0 | 0 | 1 |
| 0 | 1 | 1 | 0 |
| 1 | 0 | 1 | 0 |
| 1 | 1 | 1 | 0 |
FIG. 4G
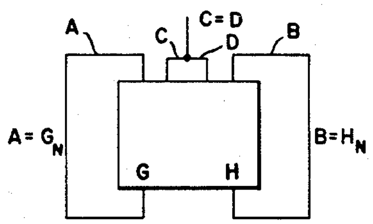
FIG. 4D
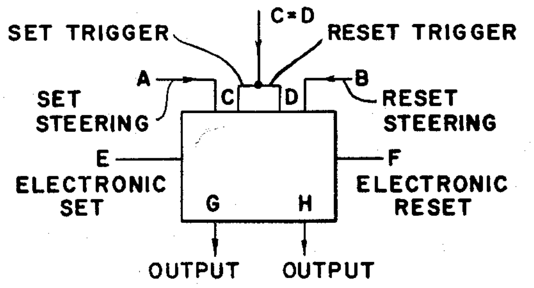
FIG. 4A
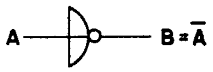
FIG. 4C
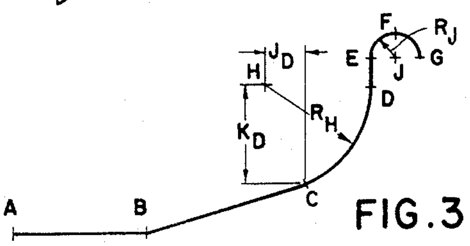
FIG. 3
INVENTOR.
JOHN T. EVANS
BY
Irving Kayton
ATTORNEY

| INPUTS | | | | | | OUTPUTS | | | |
|---|---|---|---|---|---|---|---|---|---|
| E | F | C | D | A | B | $G_N$ | $G_{N+1}$ | $H_N$ | $H_{N+1}$ |
| 0 | 1 | PULSE MAY BE PRESENT OR ABSENT | | MAY BE EITHER 0 OR 1 | | 0 | 0 | 1 | 1 |
| | | | | | | 1 | 0 | 0 | 1 |
| 1 | 0 | | | | | 0 | 1 | 1 | 0 |
| | | | | | | 1 | 1 | 0 | 0 |
| 1 | 1 | | | | | 0 | 0 | 1 | 0 |
| | | | | | | 1 | 0 | 0 | 0 |
| 0 | 0 | PULSE ABSENT | PULSE ABSENT | 0 | 0 | 0 | 0 | 1 | 1 |
| | | | | | | 1 | 1 | 0 | 0 |
| 0 | 0 | PULSE ABSENT | PULSE ABSENT | 0 | 1 | 0 | 0 | 1 | 1 |
| | | | | | | 1 | 1 | 0 | 0 |
| 0 | 0 | PULSE ABSENT | PULSE ABSENT | 1 | 0 | 0 | 0 | 1 | 1 |
| | | | | | | 1 | 1 | 0 | 0 |
| 0 | 0 | PULSE ABSENT | PULSE ABSENT | 1 | 1 | 0 | 0 | 1 | 1 |
| | | | | | | 1 | 1 | 0 | 0 |
| 0 | 0 | PULSE ABSENT | PULSE PRESENT | 0 | 0 | 0 | 0 | 1 | 1 |
| | | | | | | 1 | 0 | 0 | 1 |
| 0 | 0 | PULSE ABSENT | PULSE PRESENT | 0 | 1 | 0 | 0 | 1 | 1 |
| | | | | | | 1 | 1 | 0 | 0 |
| 0 | 0 | PULSE ABSENT | PULSE PRESENT | 1 | 0 | 0 | 0 | 1 | 1 |
| | | | | | | 1 | 0 | 0 | 1 |
| 0 | 0 | PULSE ABSENT | PULSE PRESENT | 1 | 1 | 0 | 0 | 1 | 1 |
| | | | | | | 1 | 1 | 0 | 0 |
| 0 | 0 | PULSE PRESENT | PULSE ABSENT | 0 | 0 | 0 | 1 | 1 | 0 |
| | | | | | | 1 | 1 | 0 | 0 |
| 0 | 0 | PULSE PRESENT | PULSE ABSENT | 0 | 1 | 0 | 1 | 1 | 0 |
| | | | | | | 1 | 1 | 0 | 0 |
| 0 | 0 | PULSE PRESENT | PULSE ABSENT | 1 | 0 | 0 | 0 | 1 | 1 |
| | | | | | | 1 | 1 | 0 | 0 |
| 0 | 0 | PULSE PRESENT | PULSE ABSENT | 1 | 1 | 0 | 0 | 1 | 1 |
| | | | | | | 1 | 1 | 0 | 0 |
| 0 | 0 | PULSE PRESENT | PULSE PRESENT | 0 NOT ALLOWED | 0 | 0 | — | 1 | — |
| | | | | | | 1 | — | 0 | — |
| 0 | 0 | PULSE PRESENT | PULSE PRESENT | 0 | 1 | 0 | 1 | 1 | 0 |
| | | | | | | 1 | 1 | 0 | 0 |
| 0 | 0 | PULSE PRESENT | PULSE PRESENT | 1 | 0 | 0 | 0 | 1 | 1 |
| | | | | | | 1 | 0 | 0 | 1 |
| 0 | 0 | PULSE PRESENT | PULSE PRESENT | 1 | 1 | 0 | 0 | 1 | 1 |
| | | | | | | 1 | 1 | 0 | 0 |

FIG.4H

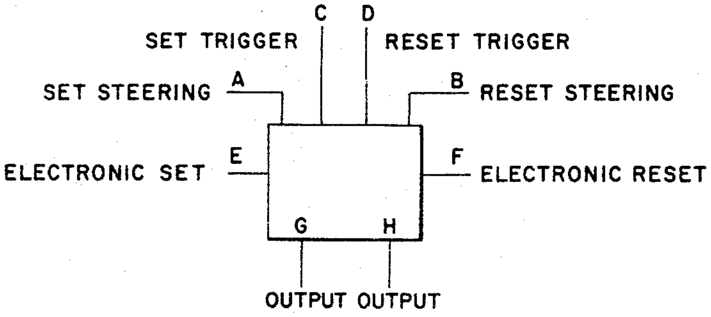

INVENTOR.
JOHN T. EVANS
BY
Irving Kayton
ATTORNEY

INVENTOR.
JOHN T. EVANS

BY Irving Kayton
ATTORNEY

INVENTOR.
JOHN T. EVANS
BY
Irving Kayton
ATTORNEY

March 9, 1965 J. T. EVANS 3,173,001

AUTOMATIC CONTROL APPARATUS

Filed Sept. 5, 1961 29 Sheets-Sheet 7

INVENTOR.
JOHN T. EVANS

BY

Irving Kayton
ATTORNEY

March 9, 1965 J. T. EVANS 3,173,001

AUTOMATIC CONTROL APPARATUS

Filed Sept. 5, 1961 29 Sheets-Sheet 8

INVENTOR.
JOHN T. EVANS

BY

Irving Kayton
ATTORNEY

March 9, 1965 J. T. EVANS 3,173,001

AUTOMATIC CONTROL APPARATUS

Filed Sept. 5, 1961 29 Sheets-Sheet. 9

INVENTOR.
JOHN T. EVANS

BY

Irving Kayton
ATTORNEY

AUTOMATIC CONTROL APPARATUS

Filed Sept. 5, 1961 29 Sheets-Sheet. 10

INVENTOR.
JOHN T. EVANS
BY
Irving Kayton
ATTORNEY

BY

INVENTOR.
JOHN T. EVANS

Irving Kayton
ATTORNEY

March 9, 1965 J. T. EVANS 3,173,001

AUTOMATIC CONTROL APPARATUS

Filed Sept. 5, 1961 29 Sheets-Sheet 12

PULSE RATE MULTIPLIER PATTERNS

INVENTOR.
JOHN T. EVANS

BY

Irving Kayton

ATTORNEY

PULSE RATE MULTIPLIER PATTERNS

INVENTOR.
JOHN T. EVANS

BY

Irving Kayton
ATTORNEY

March 9, 1965 J. T. EVANS 3,173,001

AUTOMATIC CONTROL APPARATUS

Filed Sept. 5, 1961 29 Sheets-Sheet 14

INVENTOR.
JOHN T. EVANS

BY

Irving Kayton

ATTORNEY

INVENTOR.
JOHN T. EVANS
BY
Irving Kayton
ATTORNEY

March 9, 1965 J. T. EVANS 3,173,001

AUTOMATIC CONTROL APPARATUS

Filed Sept. 5, 1961 29 Sheets-Sheet. 16

INVENTOR.
JOHN T. EVANS

BY Irving Kayton

ATTORNEY

INVENTOR.
JOHN T. EVANS
BY
Irving Kayton
ATTORNEY

INVENTOR.
JOHN T. EVANS
BY
Irving Kayton
ATTORNEY

March 9, 1965

J. T. EVANS 3,173,001

AUTOMATIC CONTROL APPARATUS

Filed Sept. 5, 1961

29 Sheets-Sheet. 19

INVENTOR.
JOHN T. EVANS

BY

Irving Kayton
ATTORNEY

INVENTOR.
JOHN T. EVANS
BY
Irving Kayton
ATTORNEY

INVENTOR.
JOHN T. EVANS
BY
Irving Kayton
ATTORNEY

INVENTOR.
JOHN T. EVANS
BY
Irving Kayton
ATTORNEY

INVENTOR.
JOHN T. EVANS
BY
Irving Kayton
ATTORNEY

INVENTOR.
JOHN T. EVANS
BY
Irving Kayton
ATTORNEY

March 9, 1965 J. T. EVANS 3,173,001

AUTOMATIC CONTROL APPARATUS

Filed Sept. 5, 1961 29 Sheets-Sheet 25

INVENTOR.
JOHN T. EVANS

BY Irving Keyton
ATTORNEY

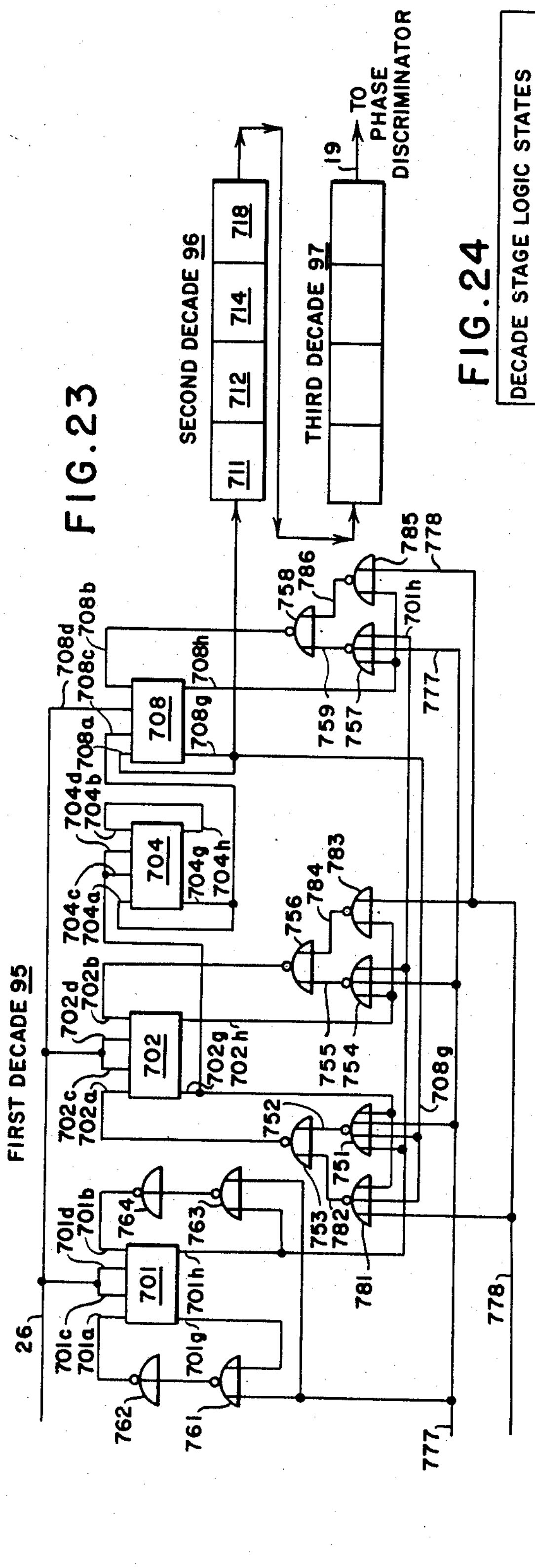
FIG. 23
FIG. 24
| DECIMAL NUMBER | 1-UNIT STAGE | 2-UNIT STAGE | 4-UNIT STAGE | 8-UNIT STAGE |
|---|---|---|---|---|
| | DECADE STAGE LOGIC STATES | | | |
| 0 | 0 | 0 | 0 | 0 |
| 1 | 1 | 0 | 0 | 0 |
| 2 | 0 | 1 | 0 | 0 |
| 3 | 1 | 1 | 0 | 0 |
| 4 | 0 | 0 | 1 | 0 |
| 5 | 1 | 0 | 1 | 0 |
| 6 | 0 | 1 | 1 | 0 |
| 7 | 1 | 1 | 1 | 0 |
| 8 | 0 | 0 | 0 | 1 |
| 9 | 1 | 0 | 0 | 1 |
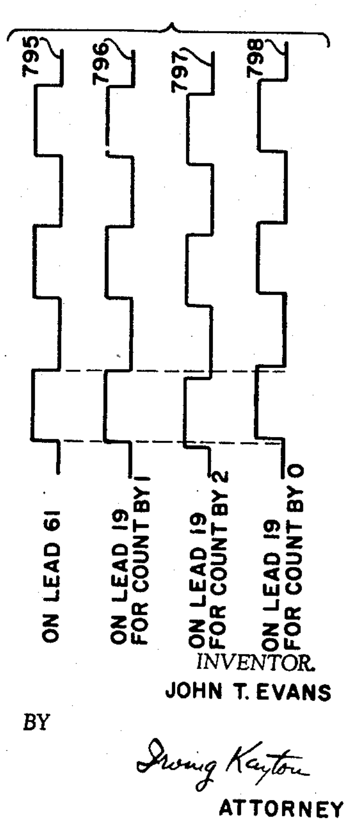
FIG. 27
INVENTOR.
JOHN T. EVANS
BY
Irving Kayton
ATTORNEY INVENTOR.
JOHN T. EVANS
BY
Irving Kayton
ATTORNEY

INVENTOR.
JOHN T. EVANS

BY

Irving Kayton
ATTORNEY

March 9, 1965 J. T. EVANS 3,173,001

AUTOMATIC CONTROL APPARATUS

Filed Sept. 5, 1961 29 Sheets-Sheet 29

| STATE OF COUNTER 810 | | | | INCHES/10 ERROR COMMAND | UNITS OF CURRENT INTO SUMMING POINT 848 | | | |
|---|---|---|---|---|---|---|---|---|
| 811 | 812 | 814 | 818 | | -1 | -2 | +1 | +2 |
| 0 | 0 | 0 | 1 | -7 | | | ✓ | ✓ |
| 1 | 0 | 0 | 1 | -6 | | | ✓ | ✓ |
| 0 | 1 | 0 | 1 | -5 | | | ✓ | ✓ |
| 1 | 1 | 0 | 1 | -4 | | | ✓ | ✓ |
| 0 | 0 | 1 | 1 | -3 | | | ✓ | ✓ |
| 1 | 0 | 1 | 1 | -2 | | | | ✓ |
| 0 | 1 | 1 | 1 | -1 | | | ✓ | |
| 1 | 1 | 1 | 1 | 0 | | | | |
| 0 | 0 | 0 | 0 | +1 | ✓ | | | |
| 1 | 0 | 0 | 0 | +2 | | ✓ | | |
| 0 | 1 | 0 | 0 | +3 | ✓ | ✓ | | |
| 1 | 1 | 0 | 0 | +4 | ✓ | ✓ | | |
| 0 | 0 | 1 | 0 | +5 | ✓ | ✓ | | |
| 1 | 0 | 1 | 0 | +6 | ✓ | ✓ | | |
| 0 | 1 | 1 | 0 | +7 | ✓ | ✓ | | |
| 1 | 1 | 1 | 0 | +8 | ✓ | ✓ | | |

INVENTOR.
JOHN T. EVANS

BY

Irving Kayton
ATTORNEY 3,173,001

AUTOMATIC CONTROL APPARATUS

John T. Evans, Waynesboro, Va., assignor to General Electric Company, a corporation of New York Filed Sept. 5, 1961, Ser. No. 136,419
12 Claims. (Cl. 235—154)

This invention has to do with electronic automatic control systems, and more particularly with numerical control systems for controlling the motion, in a preferred embodiment, of the cutting element of a machine tool relative to the workpiece in order to describe a contoured or complicated cutting path on the workpiece.

In the class of machine tool control equipment known as "Numerical Contouring Control" systems, the magnitude of the commanded velocity of the workpiece relative to the cutting tool is of great importance at every instant during the cutting operation. Consider, in a metal milling machine, cutting an irregular shape involving a combination of straight lines and circular arcs in the surface of a metallic plate. The optimum velocity with which workpiece and cutting tool move relative to each other in this situation are determined by several limiting factors in addition to the desire to proceed with the operation as rapidly as possible. For example, the thickness of the metal to be cut, the composition of the alloy or compound of which the metal is comprised, the hardness and melting point of the cutting tool, the amount and type of coolant that may or may not be applied to the cutting tool as it cuts through the metal are factors that enter into the consideration of the optimum speed. Too high a velocity of relative motion results in damaging the workpiece, or the cutting tool, or both. In contouring control, therefore, direct and positive velocity control is required at all times.

Of equal importance is control of the path length and direction of the cut or sequence of path cuts. Since contour cutting often involves intricate path shapes, the displacement of the cutting tool relative to the workpiece must be under constant, and carefully predetermined control.

The requirements of contouring control may be considered analogous to some of the modern safety driving tests or races recently developed for both automobiles and pleasure boats. In such races, the course that the vehicle must travel is carefully predetermined and a safe speed is also carefully determined for each leg of the route. The winner of such a race is the one who comes closest to following the prescribed route at the predetermined safe speed.

The predetermined speed, path length and direction for each leg or cut which the machine tool is constrained to follow under the direction or command of a contouring control system is typically fed into the control system in numerical form programmed on punched tape or punched cards, although in certain applications magnetic tape containing the digital information is used. This numerical input data is routed to appropriate subsystems of the control system, whereupon the control function is set into operation. In order that the numerical information be utilized by the electronic control equipment, the input data must be presented in an electrical form compatible with the overall system and which enables the control system to accurately control the speed and path of the machine tool relative to the workpiece. One form of representation of the velocity and path length data, known in the art, is a train of electrical pulses. In such a representation, each pulse in the train corresponds to a discrete increment of motion of the cutting tool relative to the workpiece, such that if the control system generates X pulses, the machine tool, in obeying the command of the control system, moves a distance of X times the incremental distance defined by each pulse.

In the preferred embodiment, herein subsesquently to be described, the incremental distance represented by each pulse is .0001 of an inch. If the control system were to generate 100,000 pulses, for the purpose of determining a path length, then the total motion that would be traversed by the cutting tool relative to the workpiece would be 100,000 times .0001 or 10 inches.

When each pulse represents an incremental distance, the frequency of the pulses, i.e., the pulse repetition rate, defines velocity and may be used to control the speed of motion of the machine tool. This is so, since pulse rate is convertible into increments of distance per unit time. In the preferred embodiment, the length of each cut is commensurate with numbers of pulses, and speed of motion of the cutting tool relative to the workpiece is commensurate with pulse frequency or rate.

The general organization of the automatic control system comprehends that the path length and velocity commands of the control system are represented by the phase and rate of change of phase, respectively, of a pulse train applied to a servo mechanism which in turn is coupled to, and drives, the machine tool. A sensing mechanism observes the position of the machine tool as the machine tool responds to the command signals, and generates a pulse train whose phase relative to a reference is representative of the present actual position of the machine tool. The phase of the command position signal is compared with the phase of the actual position signal so that an error signal directly proportional to the phase difference may be generated to provide feed back control in the feed back loop of the servo mechanism. The magnitude of the error signal, and its sense or polarity (determined by whether the phase of the command signal leads or lags that of the actual position signal) causes the machine tool to move in such direction as to tend to reduce the magnitude of the error signal.

The same basic pulse rate and phase relative to a reference is provided for the command signal as for the machine tool feed back signal so that, with a commanded velocity of zero and an actual tool velocity of zero, two equal frequency and in-phase pulse rates are applied to the comparison means. This results in a zero difference or error signal, and nothing happens. When the commanded velocity is other than zero, means is provided for continuously changing the phase of the basic pulse command signal relative to the reference. Comparison of this phase modulated command pulse train with the phase of the feed back signal of the machine tool which is still at rest will indicate a phase difference increasing in magnitude.

Discriminators, or phase comparison means, are known in the art, which are capable of correctly indicating a phase difference up to 180 degrees. The situation may develop, however, wherein the actual position of the machine tool may lag behind the commanded position by an amount which is representationally greater than a 180 degree phase difference, and indeed may exceed 360 degrees. The prior art discriminators could not cope with this situation, i.e., it would be unable to generate an error signal which would close the gap between the commanded and actual positions. Thus, if the phase difference goes beyond 180 degrees to, for example, 210 degrees, the discriminator would generate a spurious error signal which would increase rather than decrease the gap between the commanded and actual positions. Even if a discriminator were available which correctly respresents a phase difference up to 360 degrees, an error signal responsive to a phase difference greater than 360 degrees would similarly be a spurious one.

In accordance with the principles of the invention, therefore, an extended range discriminator has been provided. The extended range apparatus keeps track of each complete cycle of phase difference and superimposes, for each cycle, an analog control potential upon the potential developed from the discriminator which is commensurate with a phase difference less than 360 degrees. If the phase difference is lagging rather than a leading one, the analog potential is subtracted. In this way the total analog signal applied to the servo system for actuating the machine tool is correctly directly proportional to the actual and total phase difference between the command signal and the feed back signal.

Furthermore, means are provided to insure that even a minute fraction of a cycle of phase difference is accurately represented in the total analog control potential whether or not the total phase difference exceeds one cycle. Another advantage of the embodiment in accordance with the principles of the invention resides in the fact that when the command and posiiton signals are in precise phase, the chance that the discriminator will generate a spurious non-zero error signal is minimized.

The novel features which are believed to be characteristic of the invention are set forth with particularity in the appended claims. The invention itself, however, both as to its organization and method of operation, together with further advantages and objects thereof, may best be understood by reference to the following description taken in connection with the accompanying drawings.

In the drawings:

FIG. 3 is a curve representative of an illustrative shape that may be automatically cut in a workpiece under control of the automatic apparatus of the invention;

FIGS. 4A through 4H represent the basic logic blocks, and their related truth tables, used in the logic circuits of the succeeding figures;

Figure 5A:
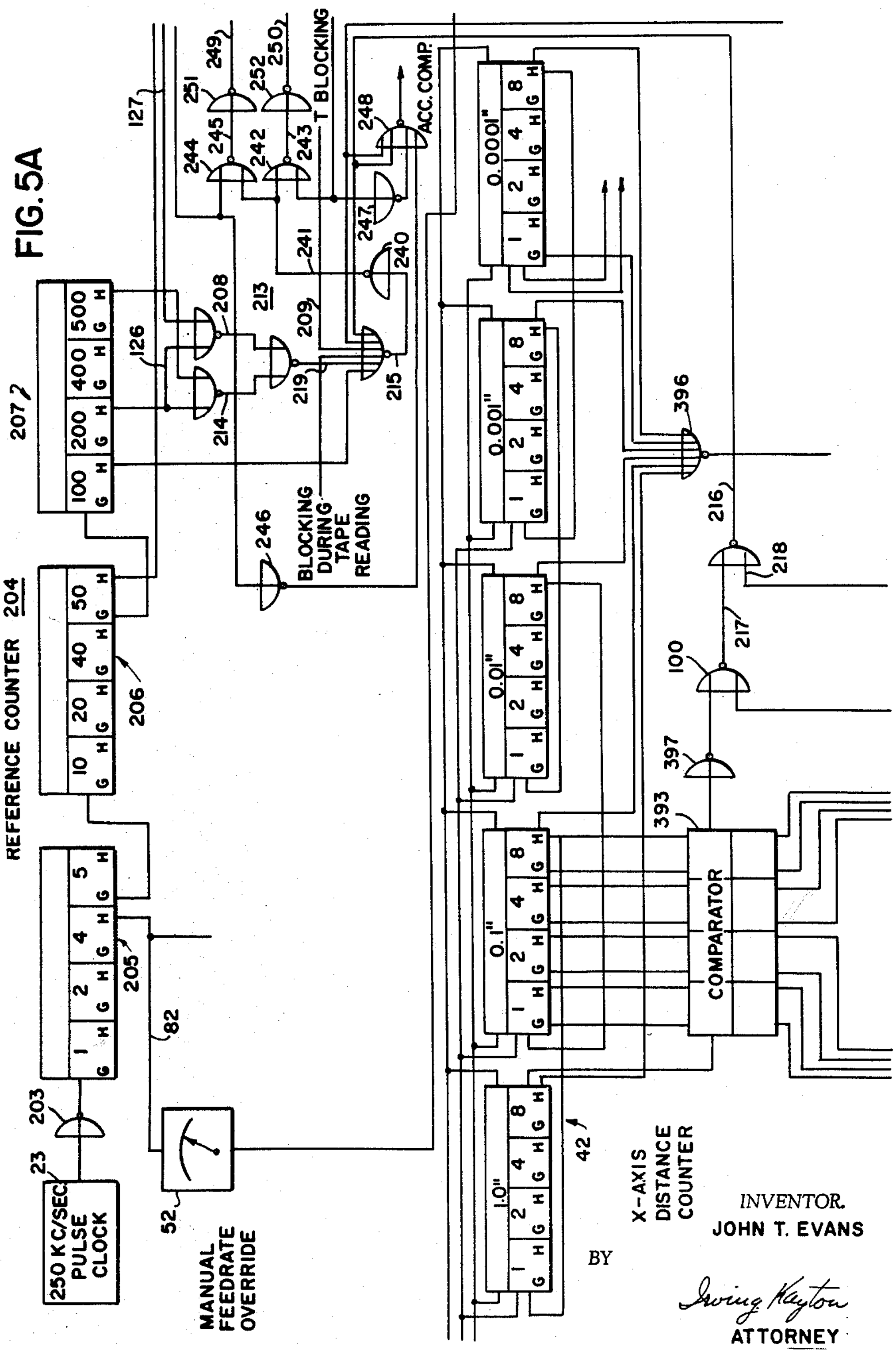
Figure 5B:
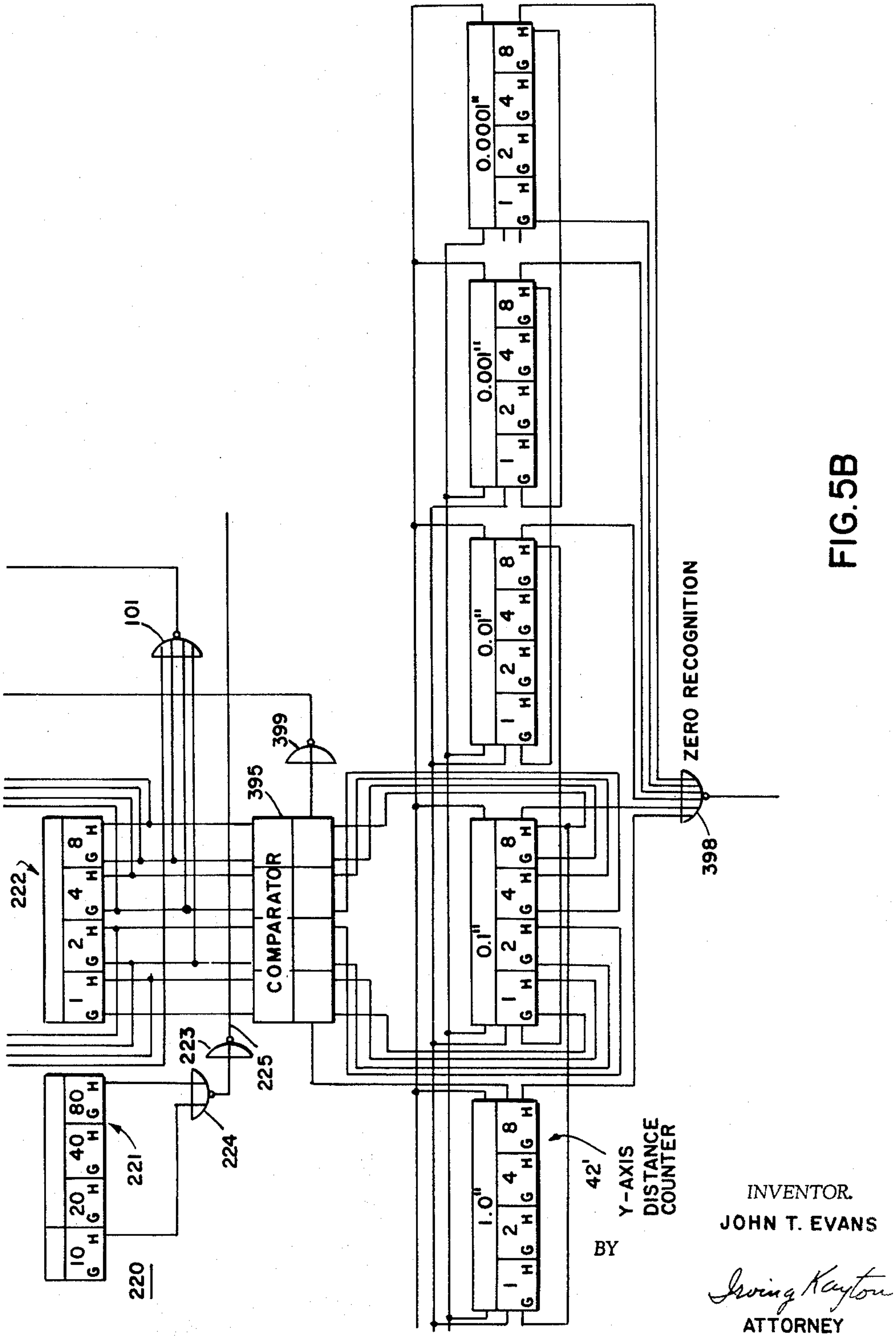
Figure 5C:
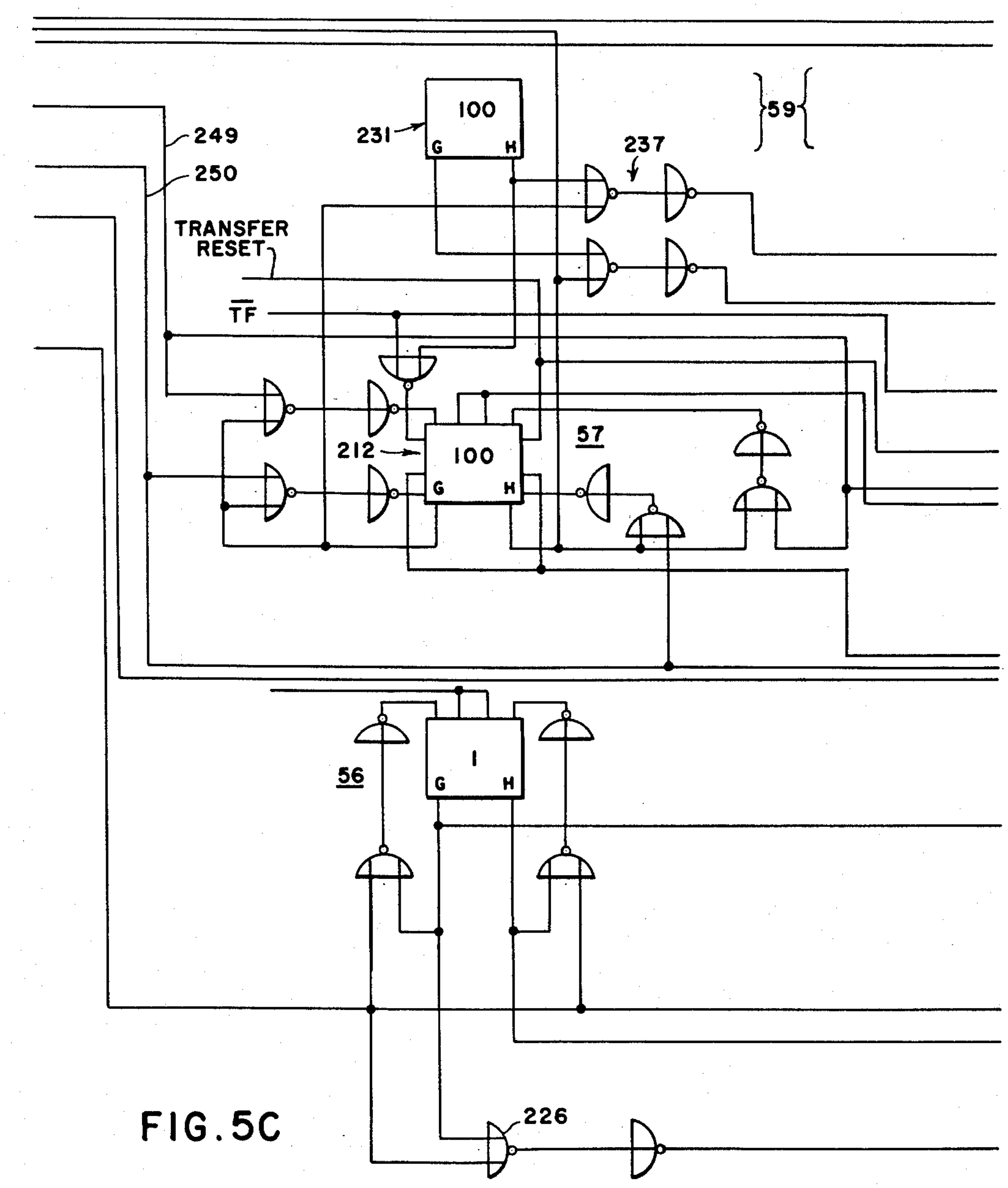
Figure 5D:
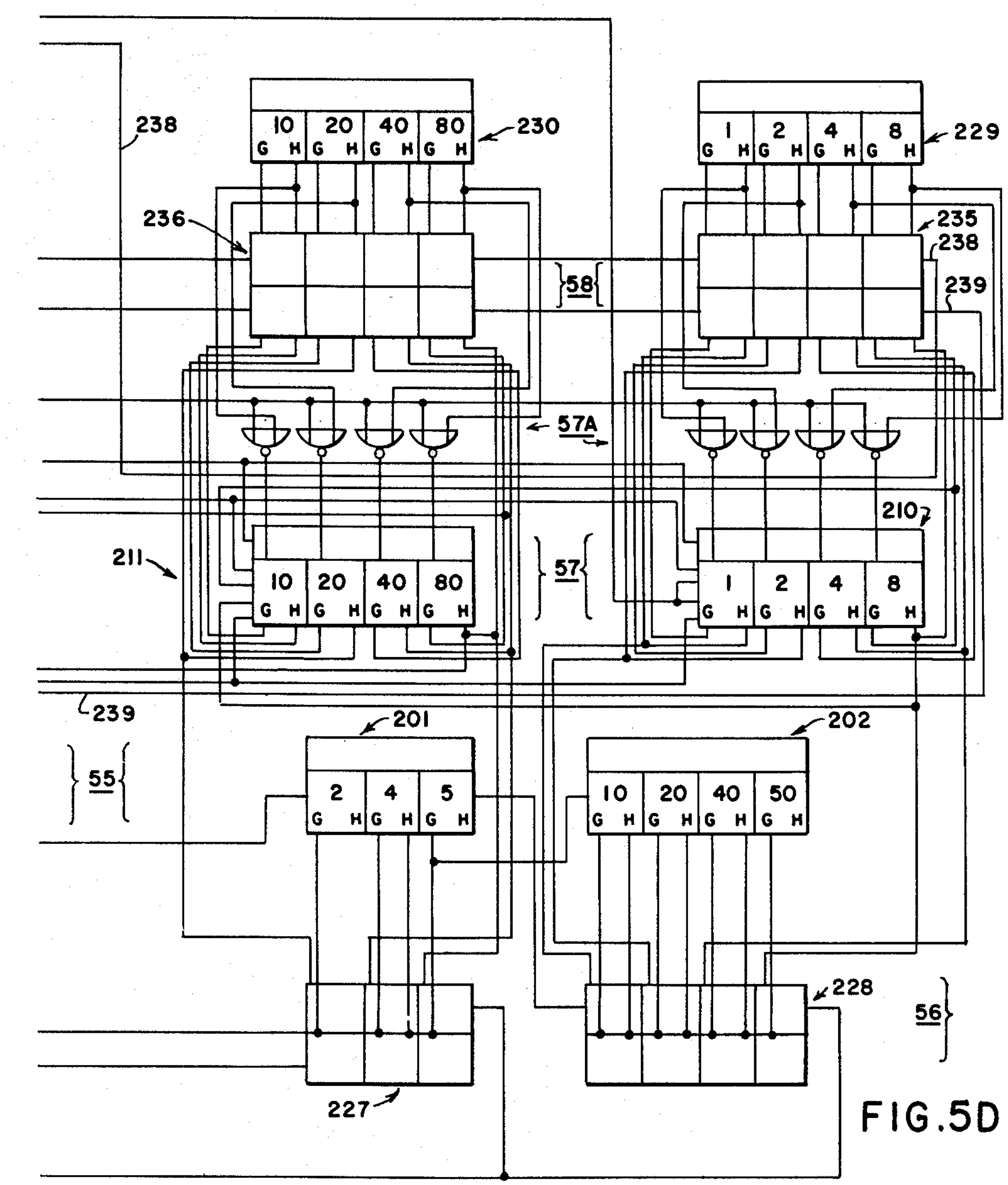
Figure 5E:
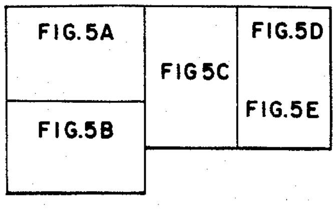
Figure 6:
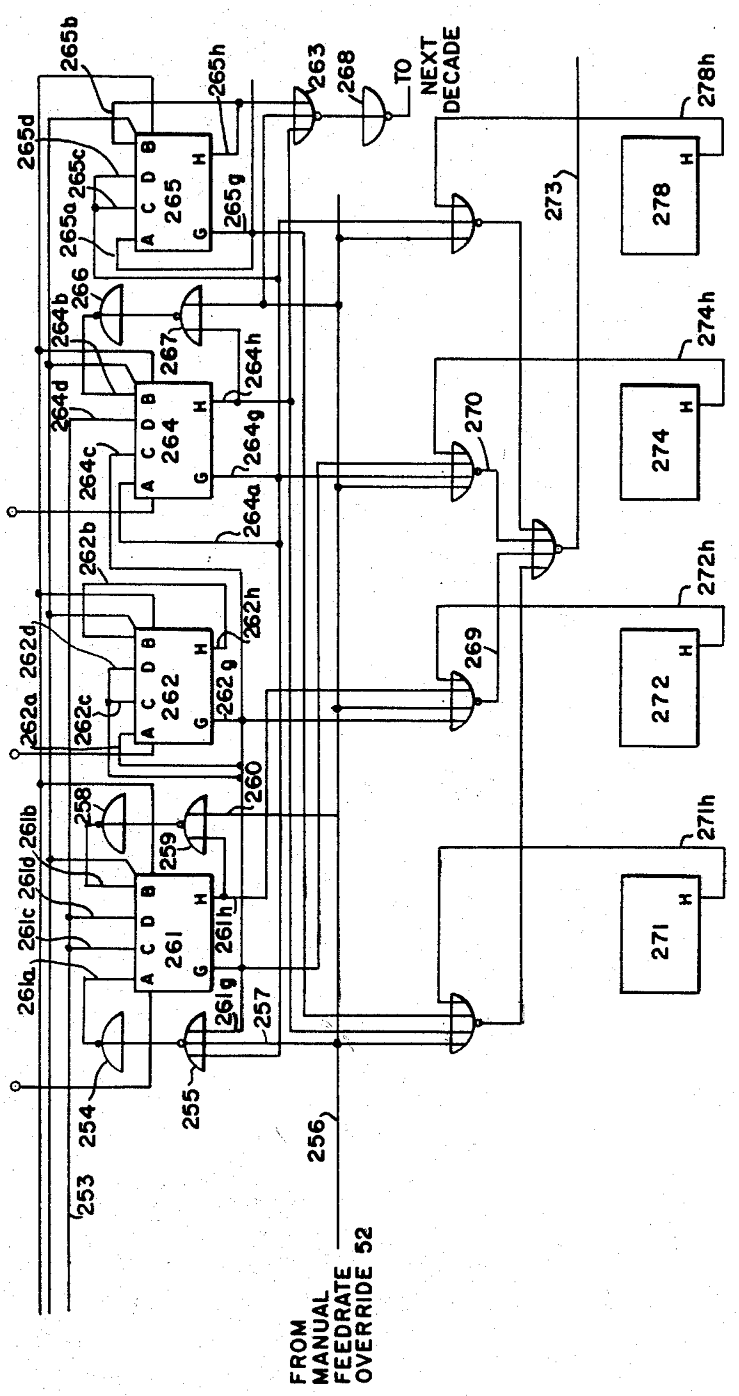
Figure 7A:
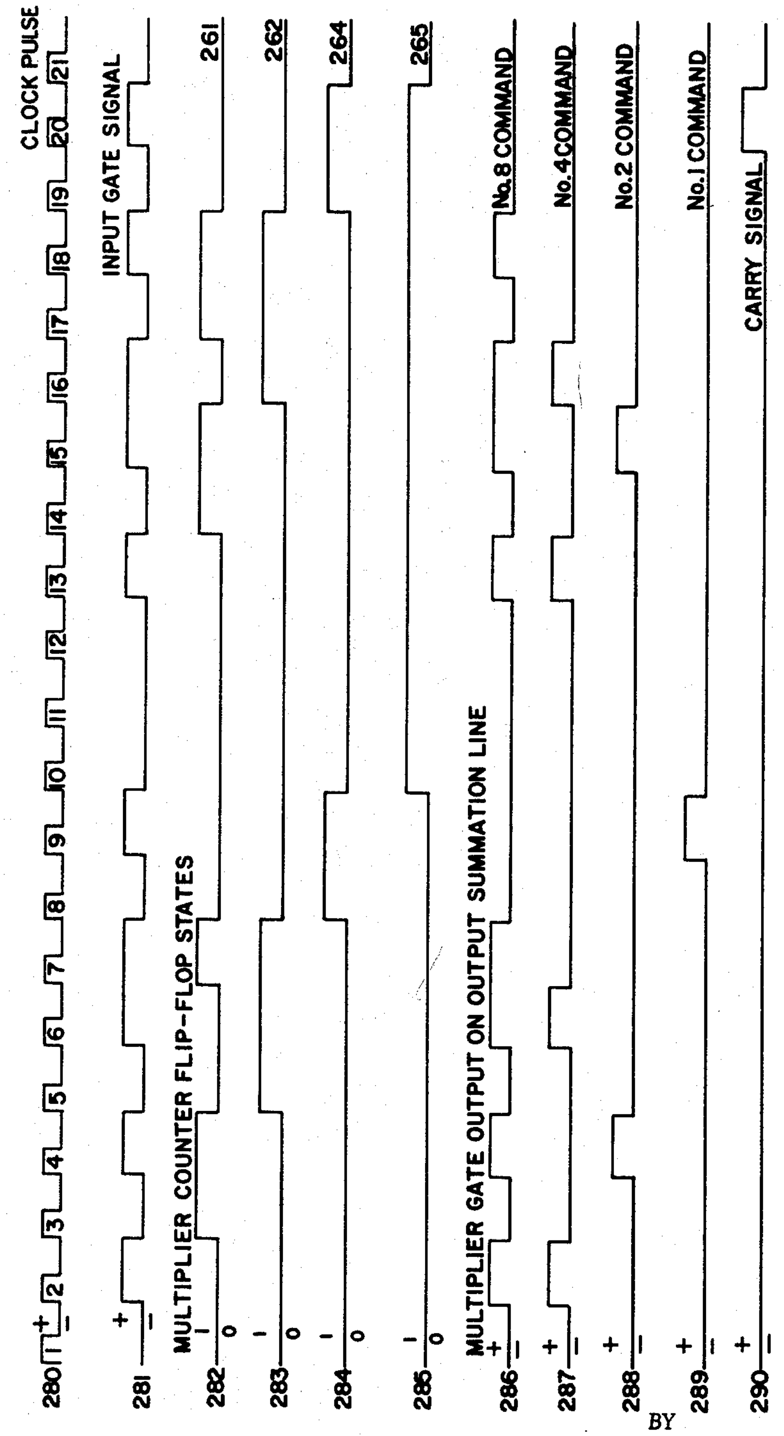
Figure 7C:
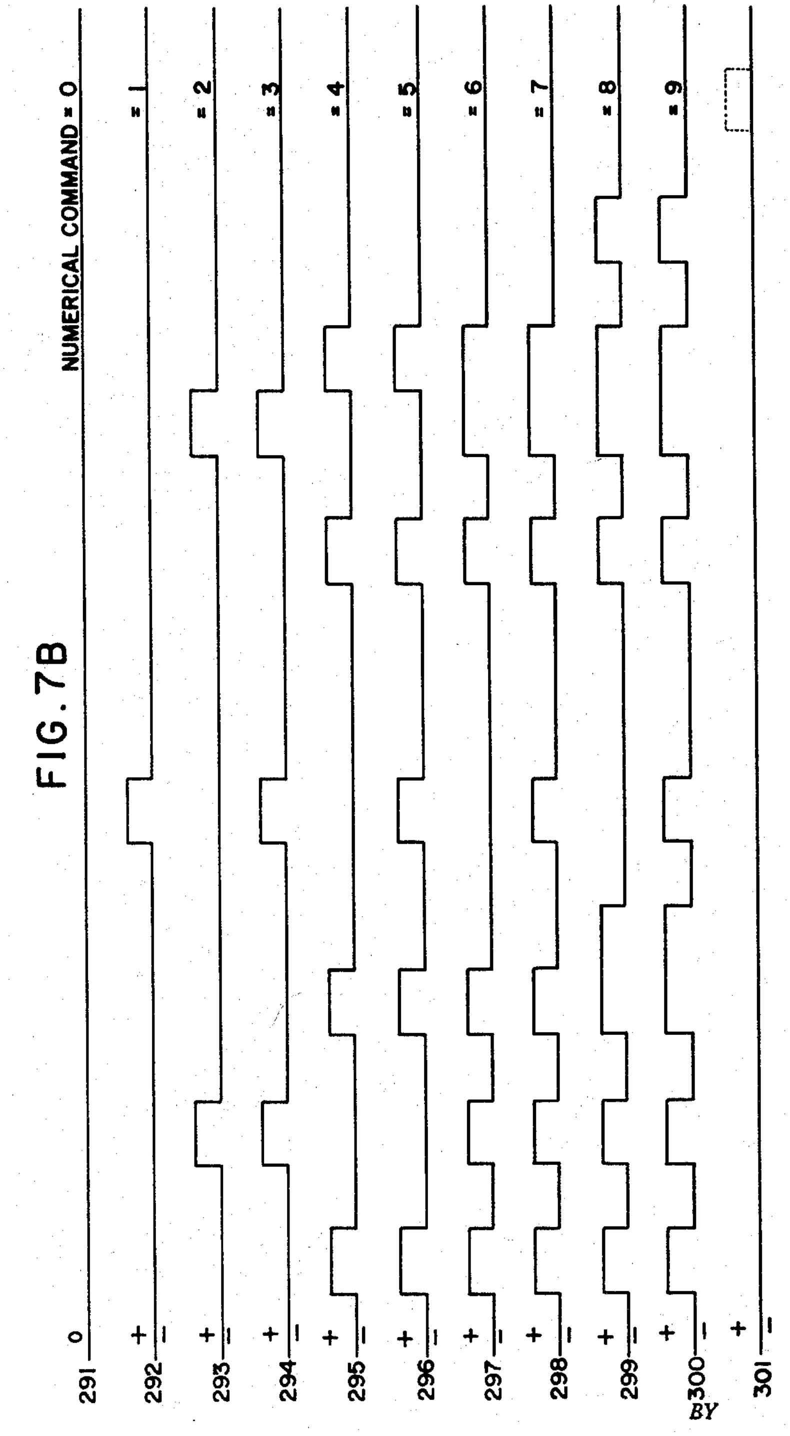
Figure 8A:
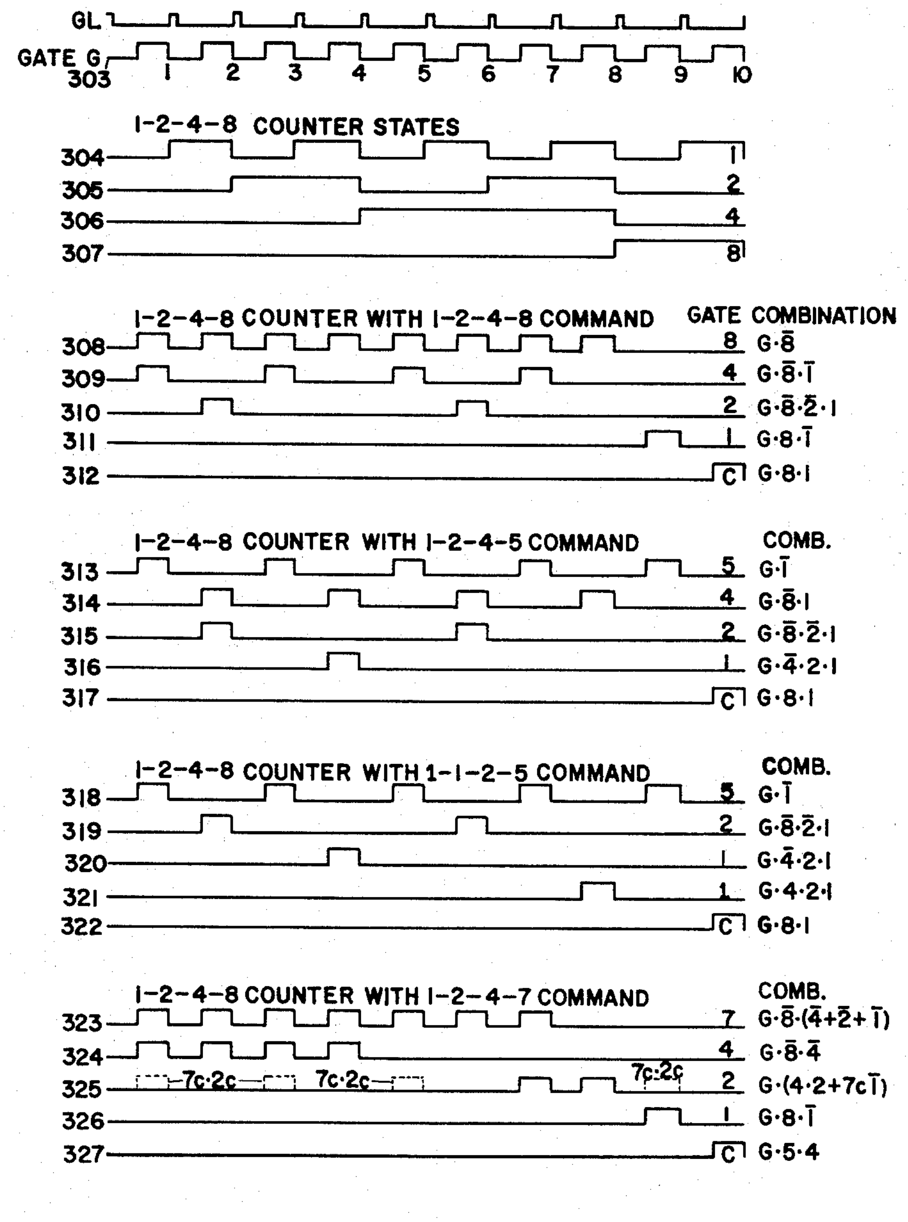
Figure 8B:
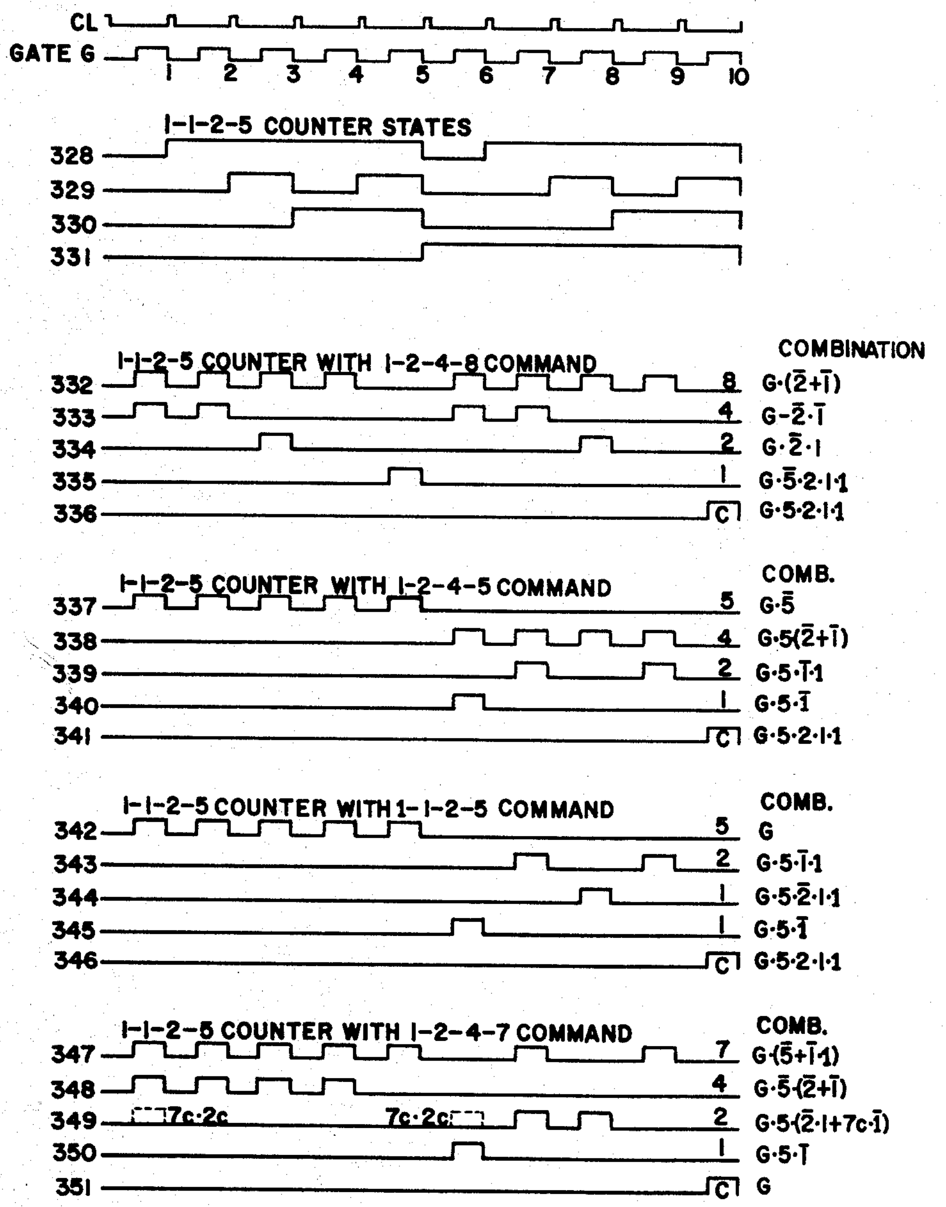
Figure 8C:
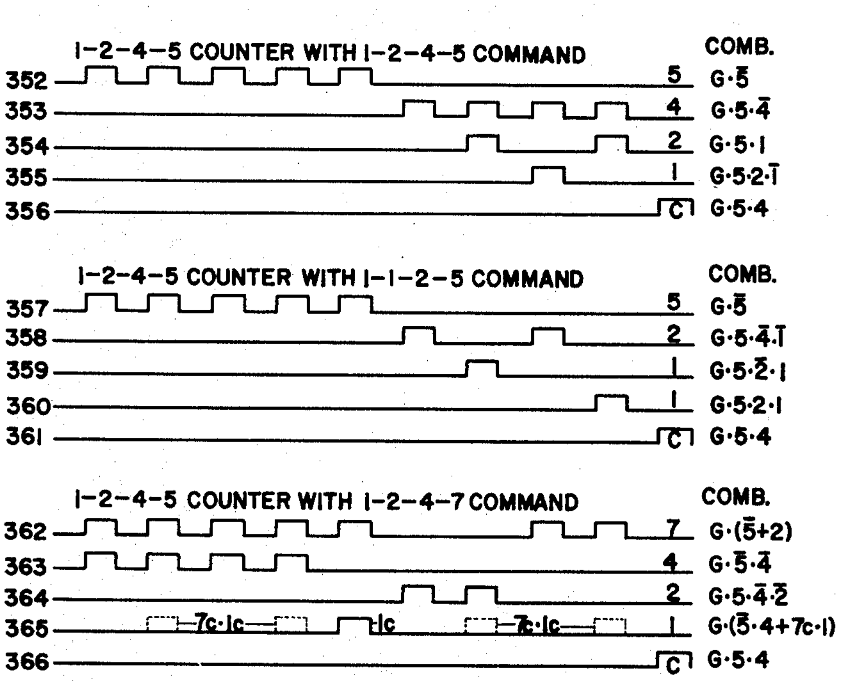
Figure 8D:
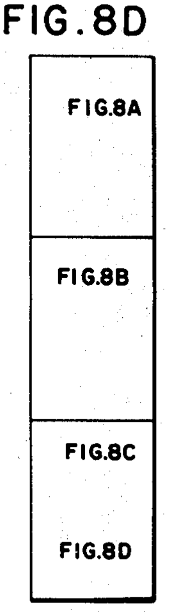
Figure 9:
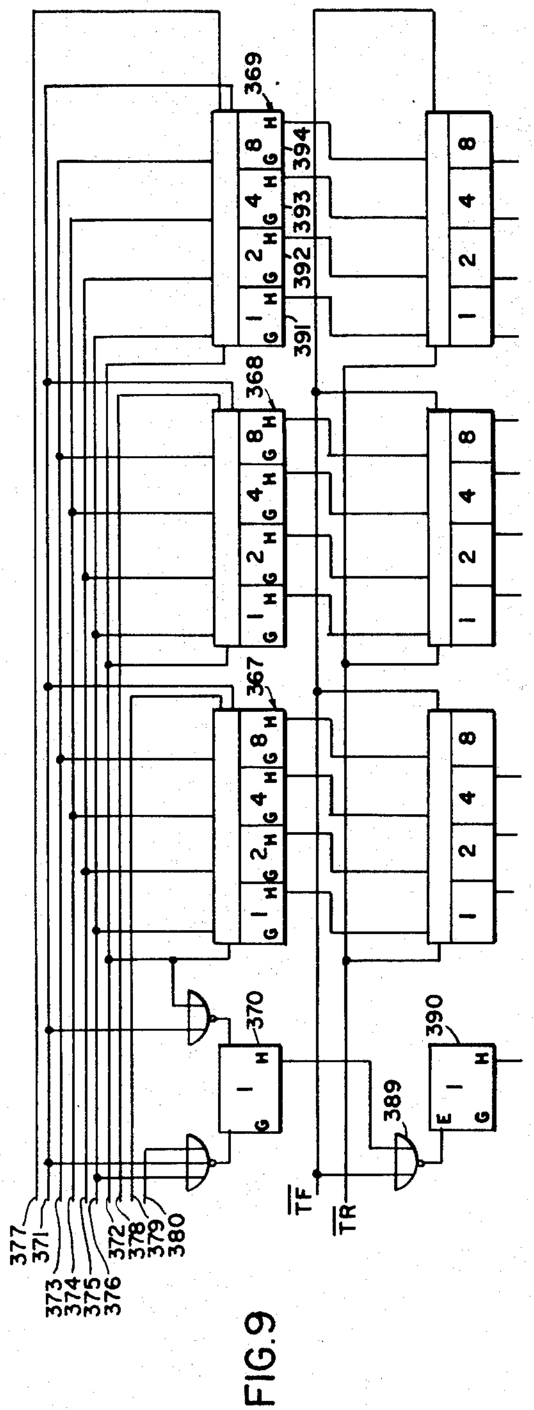
Figure 11:
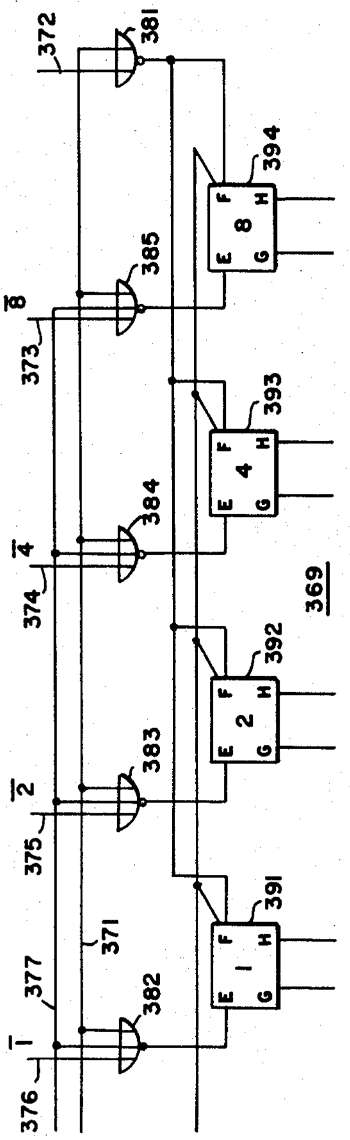
Figure 15:
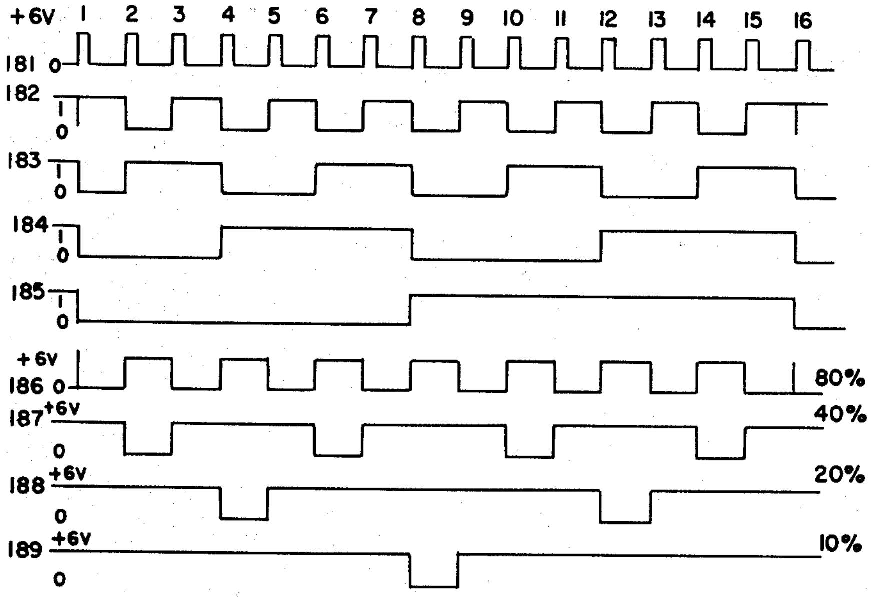
Figure 10:
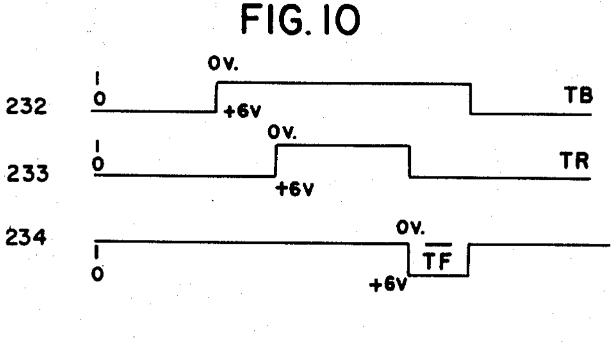
Figure 12:
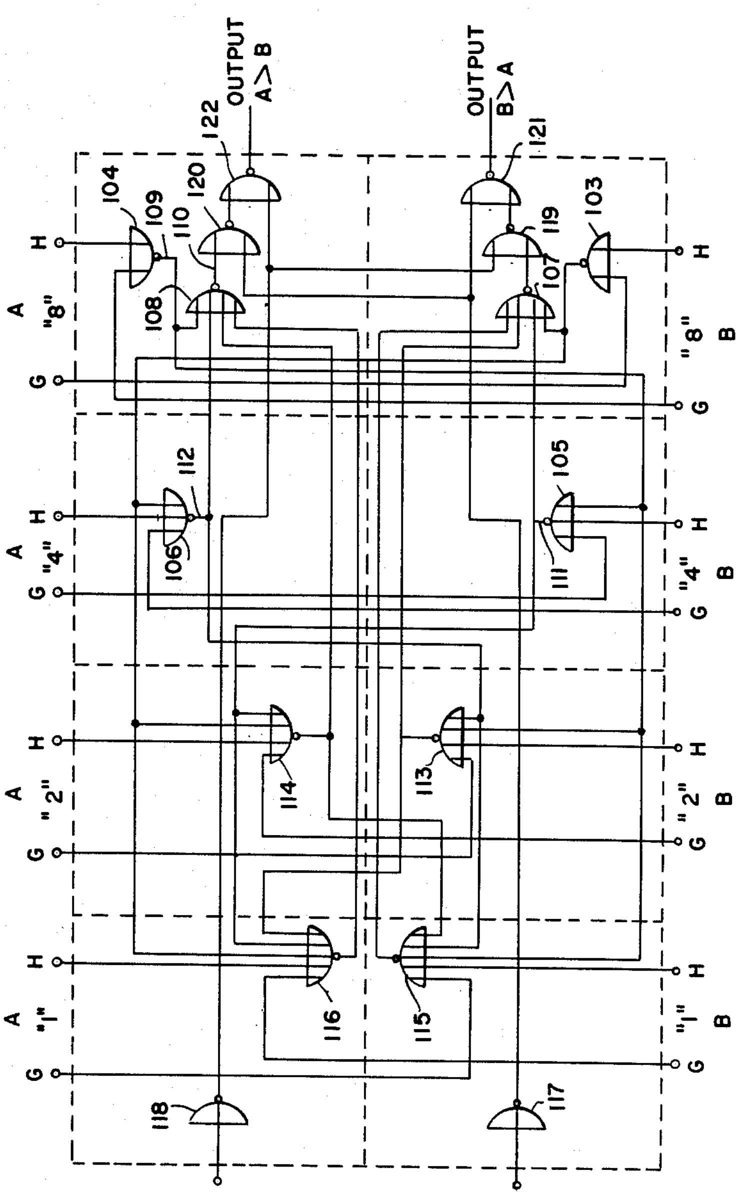
Figure 13:
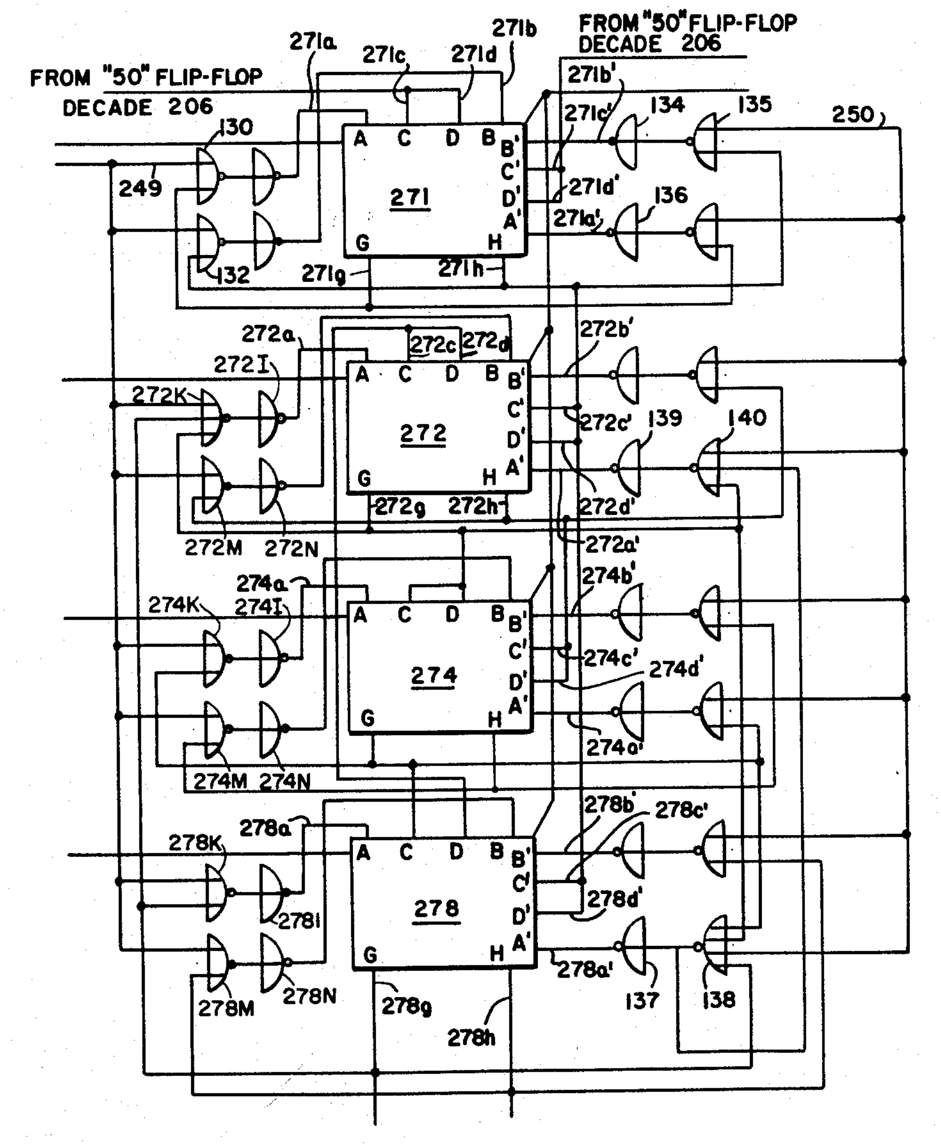
Figure 14:
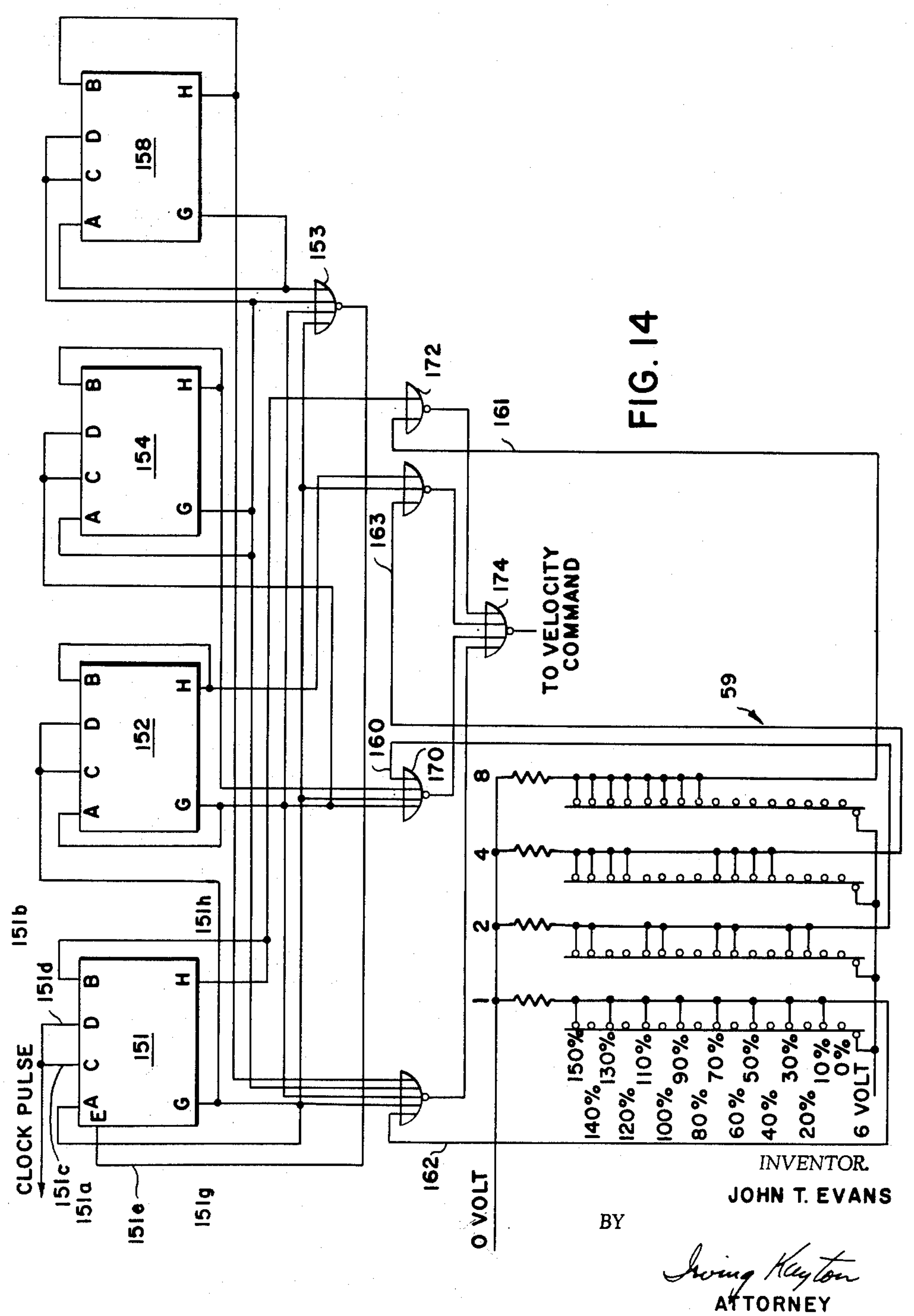
Figures 20, 20A:
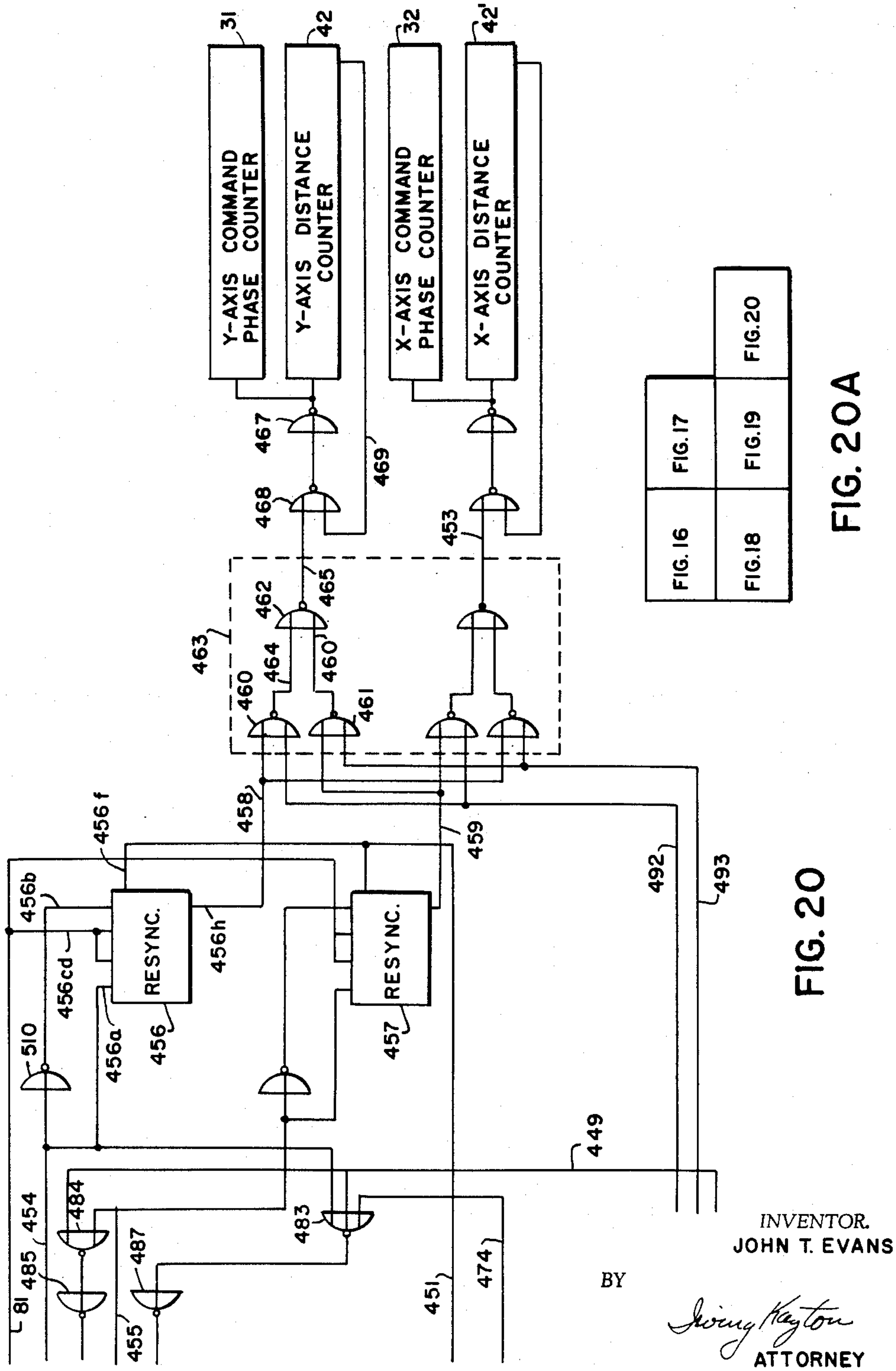
Figure 21:
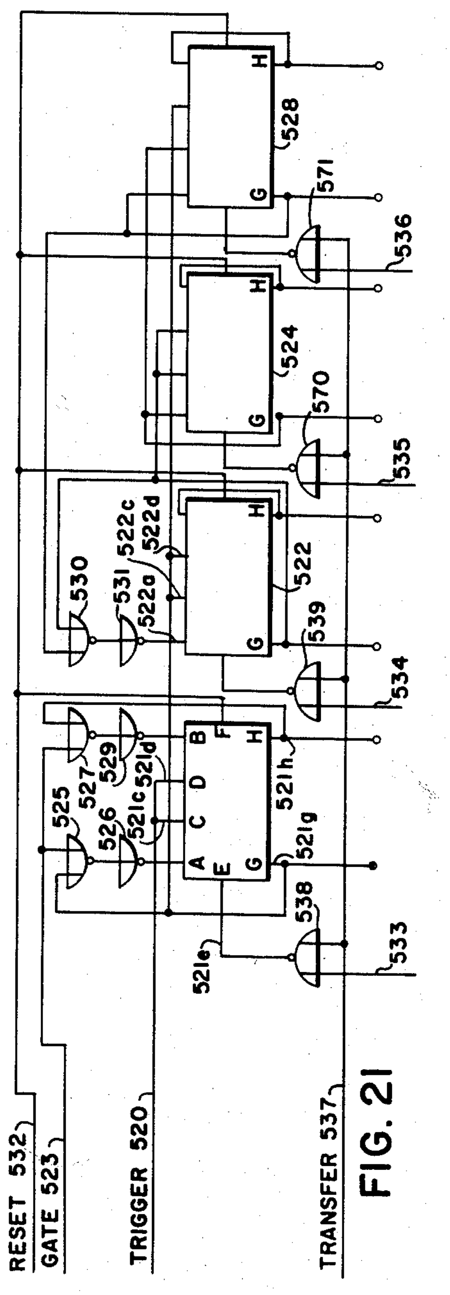
Figure 22:
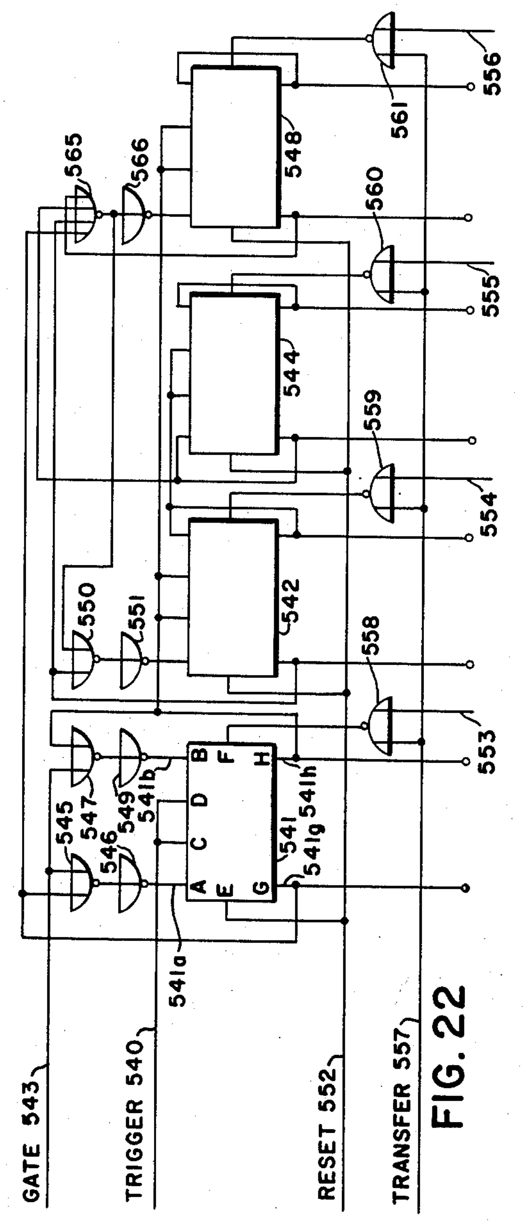
Figure 25:
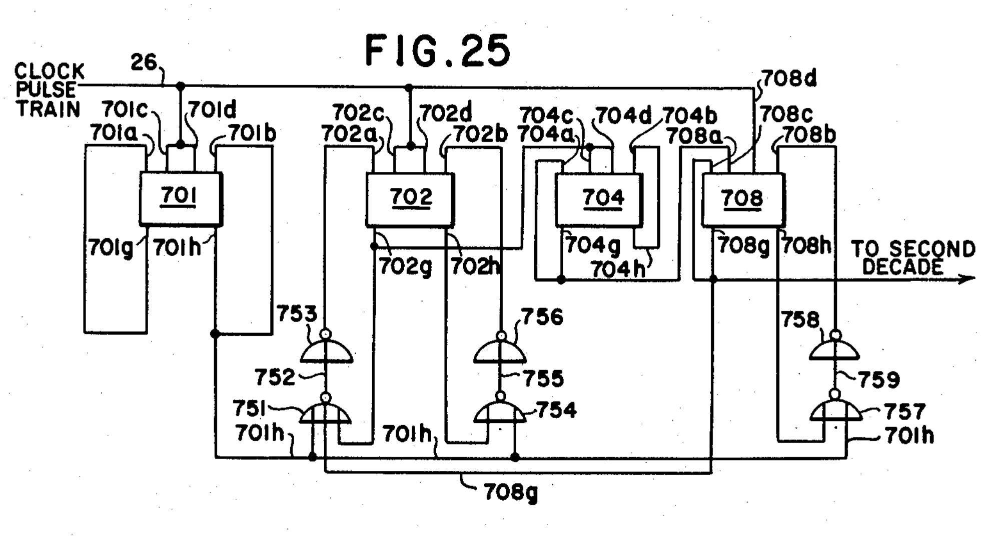
Figure 26:
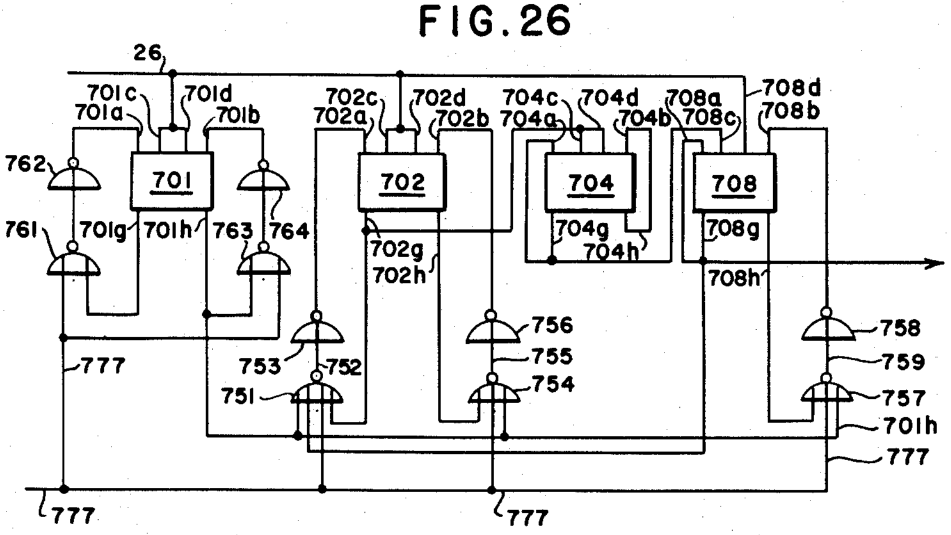
Figure 28:
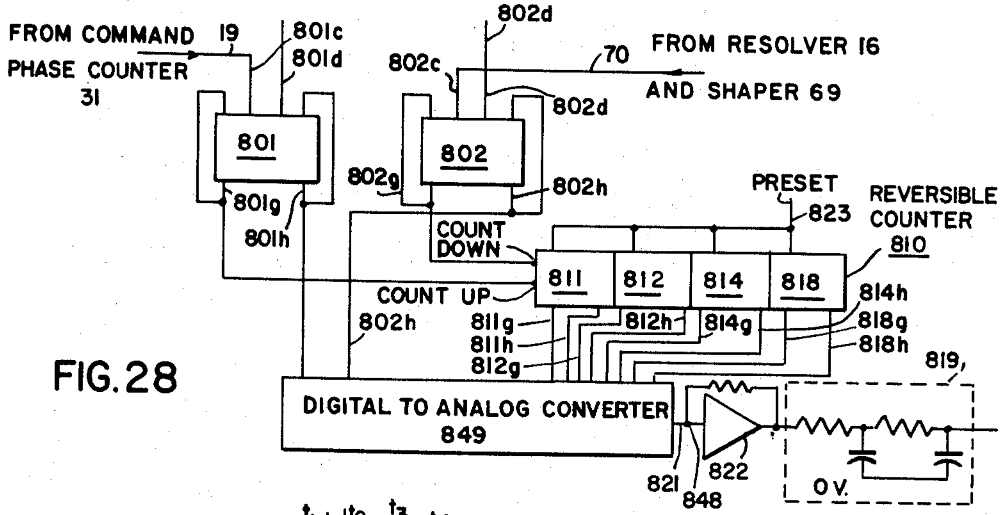
Figure 29:
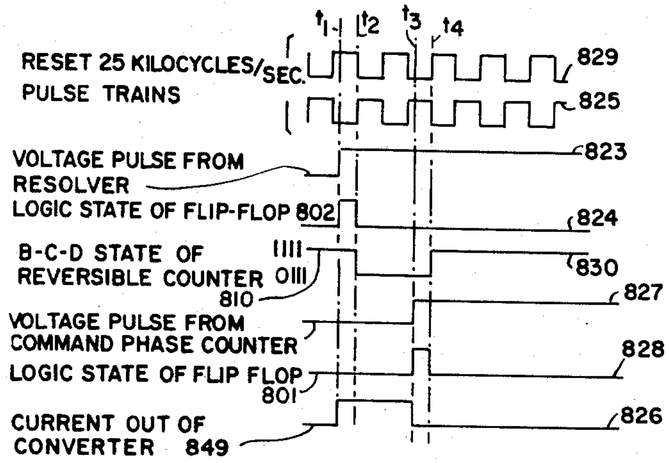
Figure 30:
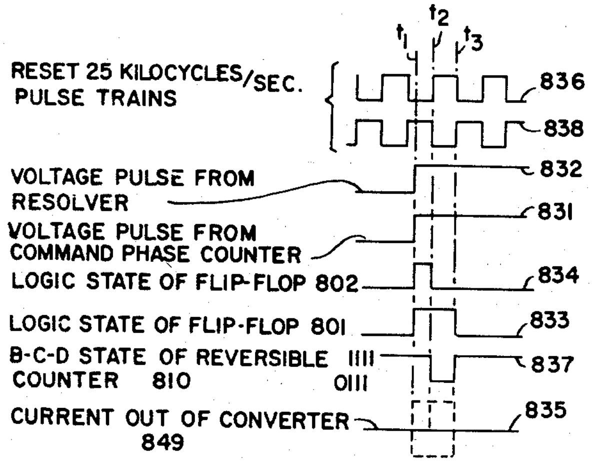
Figures 31, 32:
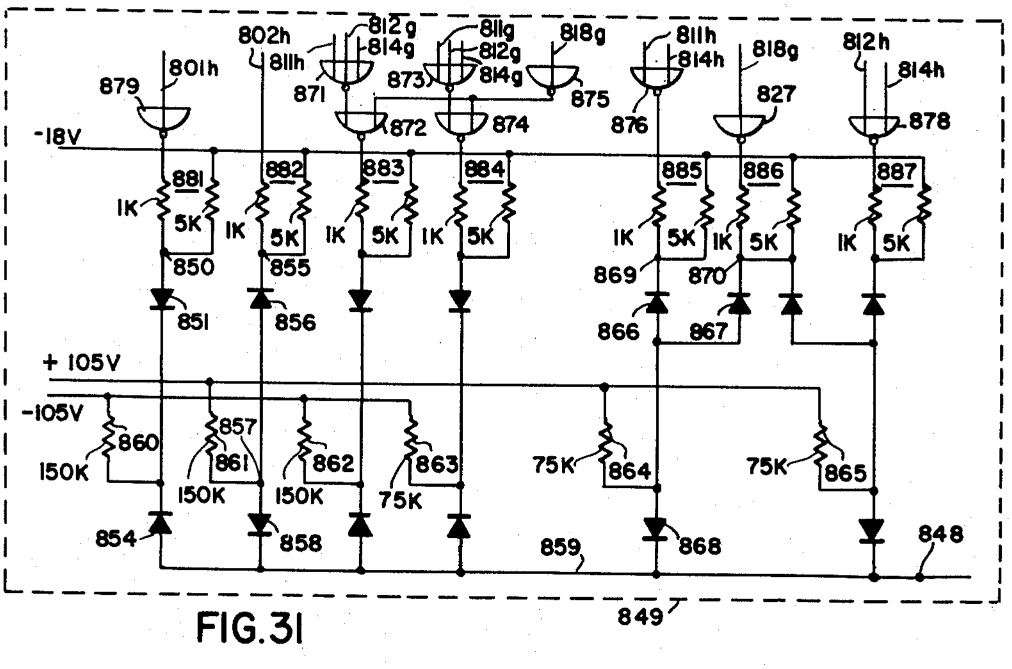

FIGS. 5A–5D taken together as in FIG. 5E is a depiction in some detail of the velocity command;

FIG. 6 is a diagram of a pulse rate multiplier which is suitably employed in the velocity command;

FIGS. 7A and 7B taken together as in FIG. 7C is a timing diagram of the waveforms produced in the pulse rate multiplier;

FIGS. 8A–8C taken together as in 8D is a timing diagram of the waveforms of other combinations of chosen pulse rate multiplier counter and working command storage binary-coded-decimal weightings;

FIGURE 9 is a diagram of the buffer command storage utilized in the velocity command;

FIG. 10 is a timing diagram of the waveforms of the transfer signals which are generated to enable the transfer of information from a buffer command storage to a working command storage;

FIG. 11 is a diagram which illustrates the transfer of information from the buffer command storage to the working command storage;

FIG. 12 is a diagram of the binary-coded-decimal comparator used in the numerical contouring control system;

FIG. 13 is a diagram of a reversible counter suitable for use, as the working command storage;

FIG. 14 is a diagram of the manual feedrate override;

FIG. 15 is a timing diagram of the waveforms produced in the manual feedrate override;

FIGS. 16 through 20, when taken together as shown in FIG. 20A, comprise a detailed logic representation of the elements used to generate X and Y velocity command signals, specifically illustrating the use of simple count-up and count-down registers for circular interpolation and means of handling circle function overflow;

FIG. 21 is a logic representation of a typical count-up binary-coded-decimal counter;

FIG. 22 is a logic representation of a typical count-down binary-coded-decimal counter;

FIG. 23 is a diagram of a command phase counter showing the details of a variable rate decade;

FIG. 24 is a table of binary-coded-decimal states of a decade representing decimal digits;

FIGS. 25 and 26 are two diagrams showing decade circuits included in the variable rate decade of FIG. 23;

FIG. 27 is a timing diagram of the waveforms produced by the command phase counter of FIG. 23 for certain illustrative operating conditions;

FIG. 28 is a diagram of the extended range phase discriminator in accordance with the principles of the invention;

FIGS. 29 and 30 are timing diagrams of the waveforms at various components of the discriminator of FIG. 28 for two different input conditions;

FIG. 31 is a schematic and logic diagram of a specific digital to analog converter that may be used in the discriminator of FIG. 28; and FIG. 32 is a table describing the output conditions of the converter of FIG. 31 for all possible inputs thereto.

NUMERICAL CONTOURING SYSTEM—IN GENERAL

Figure 1:
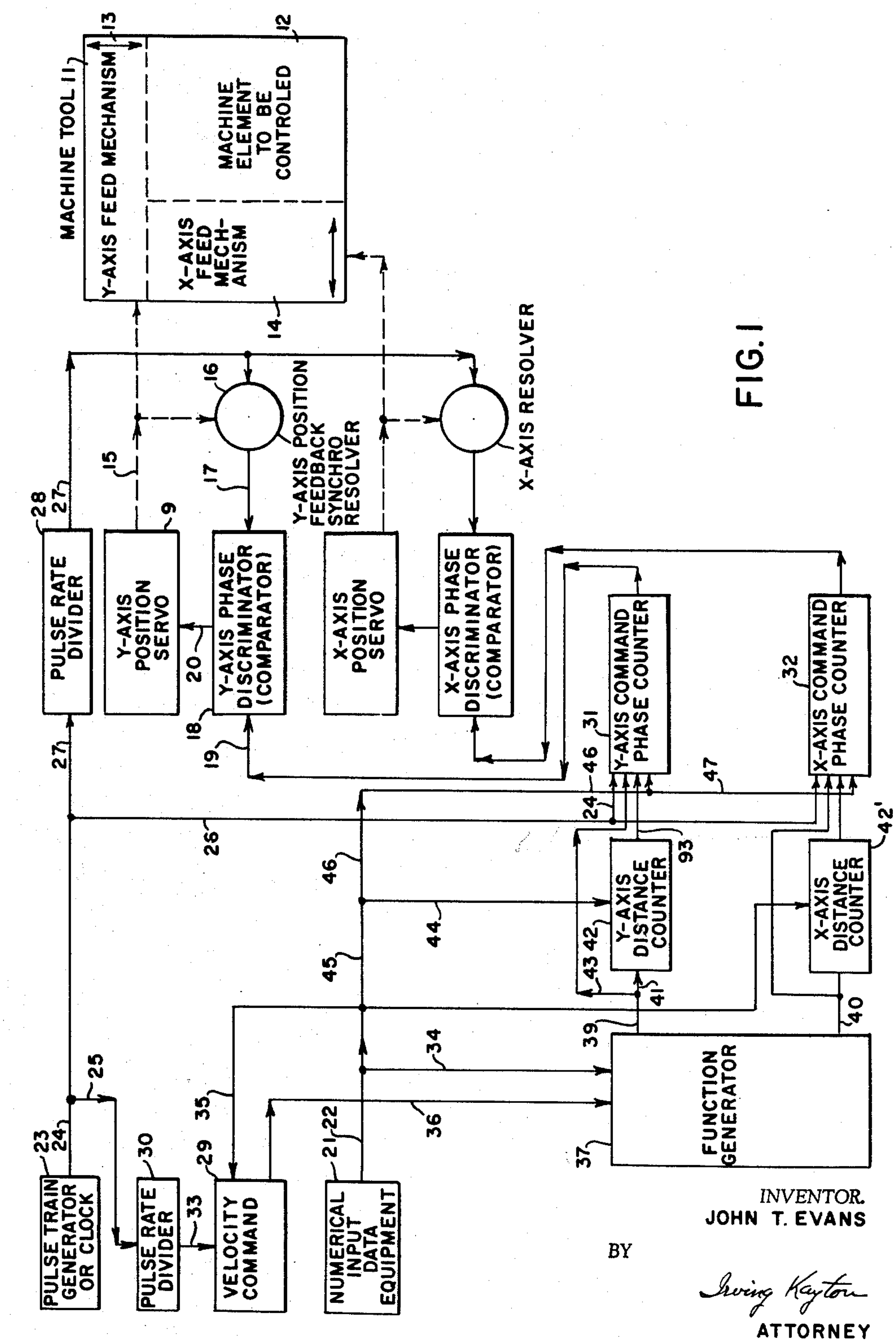
FIG. 1 is a general block diagram of a numerical contouring control system.

Referring to FIGURE 1, there is disclosed a general block diagram of the overall numerical contouring control system. FIGURE 1 is presented primarily to show the interrelationship of the three broad sections of the system; they are the machine tool itself, the servo system loop, and the overall electronic control section. The machine tool and the control section are coupled by the servo mechanism loop. The description relative to FIGURE 1 of the overall function of the system, and broad relationship of the sub-system within these three sections, will provide a basis for more readily comprehending the detailed description of the system arrangement and operation, as well as the detailed logic circuitry of the sub-systems which highlight the various aspects of the invention, and which will subsequently be described in detail.

The numerical contouring control system, as represented in FIGURE 1; may be viewed as comprising three broad sections. The purpose of the entire system, of course, is to control, automatically, the machine tool 11, shown at the right-hand side of the drawing. Machine tool 11 comprises the machine element 12 to be controlled by the contouring control section, the Y-axis feed mechanism 13, and the X-axis feed mechanism 14. Feed mechanisms 13 and 14 comprise appropriate drive shafts and gearing which actuate machine element 12 for motion along the two coordinates. It is to be understood that the system may be utilized for controlling machine elements in additional coordinates, but to simplify the explanation of the principles of the invention, a description of the third coordinate has been omitted. Machine element 12 may be the cutting tool, itself, or may be the table holding the workpiece which is to be contoured. Alternatively, feed mechanisms 13 and 14 may control both the cutting tool and the motion of the workpiece. For the purposes of this discussion, assume that machine element 12 represents the cutting tool.

There is a servo loop for each of the two feed mechanisms. The Y-axis servo loop and the X-axis servo loop are structurally independent of each other in their action in driving the feed mechanisms. Since the equipment throughout the system for the X coordinate is precisely the same as for the Y coordinate, solely the Y coordinate system will be described, except where a discussion of the equipment of both coordinates is required for clarification. The Y-coordinate servo loop comprises a Y-axis position servo 9, including a D.C. amplifier driving a servo motor which by its output shaft 15 controls a feed motor control to actuate the Y-axis feed mechanism 13. Simultaneously, position servo shaft 15 drives the Y-axis position feed back synchro resolver 16. The output lead 17 of position feed back resolver 16 provides an electrical representation of the position of machine element 12 in the Y-coordinate since both feed mechanism 13 and resolver 16 are driven in common by the position servo 9.

Lead 17 is coupled into the Y-axis phase discriminator or comparator 18. The discriminator's function is to compare the actual position of cutting tool 12, in the Y-coordinate, as represented by the Y-axis position feed back resolver 16, on the one hand, with the commanded position from the control section. Thus, the phase of the command signal entering the Y-axis phase discriminator 18 from the left on lead 19 is compared with the phase of the actual feed back position signal which comes into discriminator 18 from resolver 16. The difference in the phase between the command signal and the feed back signal is commensurate with the difference between the commanded position and the actual position. This phase difference is utilized for generating an error signal which is then fed into the servo mechanism 9 on lead 20. Servo mechanism 9 drives the Y-axis feed mechanism in accordance with the instantaneous error signal. The servo mechanism loop, therefore, comprises the Y-axis position servo 9, the Y-axis position feed back synchro resolver 16 and the Y-axis phase discriminator 18. Discriminator 18 is also common to the control section now briefly to be outlined.

The input to the control section of the overall numerical contouring control system is the numerical input data equipment block 21 which accepts numerical command data. Input equipment 21 may be a punched tape, punched card, or magnetic tape, digital input sub-system. For the purposes of the numerical contouring control system under discussion, punched tape has been found to be particularly advantageous. Numerical input data equipment 21 reads the instructions and addresses on the input tape so as to generate the appropriate electrical signals requisite for controlling machine element 12. Typically, the numerical input information is in a coded digital form related to the speed with which the cutting element 12 is to travel while performing its contouring function; it also indicates the X and Y departures and their direction for that cut, or the arc center offsets of the circular path to be generated if that particular cut is to be an arc of a circle. The instructions from input equipment 21 are then routed throughout the control section in accordance with the programmed addresses.

Another type of input is also provided for the control section in the form of a train of pulses generated from a reference clock or oscillator 23. This pulse clock, as is well known in the digital computer art, provides the carrier by which the command signals are transported throughout the control section; it also provides a reference pulse rate input to the servo loop section. Thus, the output of the pulse train generator or clock 23 is applied along its output lead 24 to both the control section of the contouring system along leads 25 and 26, and also to the servo loop section on lead 27. Lead 27 is coupled to the input of the position feed back resolver 16 through the intermediary of a pulse rate divider 28, while the output from clock 23 is applied to the control section on lead 25 as an input to the velocity command block 29, through the intermediary of the pulse rate divider 30. There is no pulse rate divider in lead 26 between clock 23 and the Y-axis command phase counter 31. The insertion of pulse rate divider 30 in lead 25, and divider 28 in lead 27, as well as the absence of a pulse rate divider in lead 26, result in adapting the reference pulse rate from clock 23 for use in different parts of the system having different functions and operating characteristics.

The pulse rate fed into the control section, and the total number of pulses fed into the control section for any given path, define the commanded velocity with which it is desired the machine tool shall move and the total length of the path it is desired that the machine tool traverse. In short, the pulse rate and the total number of pulses are the mechanisms upon which the electronic equipment in the control section operate to provide command signals, subsequently to be converted into the velocity and distance of travel executed by the machine tool.

The function of the velocity command block 29 is to convert a reference pulse rate entering from the pulse rate divider 30 on lead 33 into a pulse rate represented by a number (commensurate with required velocity of motion) punched into the input tape and fed into the system at input data equipment 21. This number is referred to as the feed rate number, and will hereinafter be explained in greater detail. The feed rate number is therefore applied from input 21 along leads 22 and 35 as another input to the velocity command 29. If the punched tape commands a feed rate number of 200 inches per minute, the velocity command from block 29 would operate upon the pulse rate on input lead 33 to provide an output pulse rate on lead 36 of 33.3 kilocycles per second (which is equal to 200 inches per minute with each pulse representing .0001 of an inch). Velocity command block 29 also performs the very important functions of manual feed rate over-ride and automatic acceleration and deceleration. The output pulse rate, commensurate with command velocity, is applied on lead 36 to the function generator 37.

The function generator operates in two modes. The first mode generates command signals for straight line cuts at any angle, sometimes referred to as slope generation or linear interpolation. The second mode generates command signals to perform circular line cuts with a specified radius, also referred to as circular interpolation. For the purposes of discussion relative to FIGURE 1, consider function generator 37 in its relationship to the rest of the system operating solely in the first mode as a slope generator.

Function generator 37 resolves the command velocity entering on lead 36 into two component pulse rates commensurate with required velocities in the X and Y directions. This resolution is performed in accordance with the X and Y departures programmed into the punched tape and applied to the function generator 37 from input equipment 21 along the leads 22 and 34. Thus the input pulse rate to function generator 37 is multiplied by a factor which is directly proportional to the sine of the slope angle of the path cut relative to the X axis to obtain the required Y component of velocity, and is multiplied by the cosine of that angle in order to obtain the required X component of velocity. The X and Y outputs of function generator 37, therefore, are two pulse rates commensurate with the Y and X components of velocity required for the motion of the cutting tool. The X and Y pulse rates are applied as outputs on lead 40 and 39, respectively. Between 39 and 40, and the X and Y feed mechanisms 13 and 14 of machine tool 11, the circuitry for handling the output on lead 39 is identical to that for the output on lead 40. Accordingly, the following discussion will be restricted to the Y coordinate system.

The Y pulse rate output on lead 39 from the function generator 37, is applied to two different circuits, simultaneously. Along lead 41 from lead 39, it is applied to the Y-axis distance counter 42, while along lead 43 from lead 39, it is applied to the Y-axis command phase counter 31. Distance counter 42 controls the length of the path along which the machine element 12 travels for the cut being made. Command phase counter 31 controls (relative to the position feed back resolver 16 through the intermediary of the discriminator 18) the velocity of motion of the machine element 12 for the cut.

Since each pulse represents an incremental distance which the cutting tool 12 travels, counting the pulses in distance counter 42 that exit from function generator 37 is the same thing as measuring the distance which the cutting tool 12 travels along the path. When counter 42 totals a number of pulses equal to the desired path length, its operation stops as does the movement of machine tool cutting element 12. Counter 42 is informed at the beginning of each path, as to the total count required to achieve the desired path length. This input data is applied to counter 42 from input equipment 21 along leads 22 and 44.

The motion of the machine tool is controlled in the command phase counter 31. In command phase counter 31, not only is the required Y coordinate pulse rate applied, thereto along lead 43, but the reference clock pulse rate is also applied as an input from clock 23 along leads 24 and 26. Consider what happens if the Y feed rate command requires no motion in the Y direction, and the simultaneous condition that the machine tool is at rest in correspondence with the command. Under these circumstances, the pulse rate output from function generator 37 on lead 39 is zero, thereby maintaining a constant phase on the phase modulated pulse train output from phase counter 31. Both phase counter 31 and resolver 16 are adapted to provide outputs which are of precisely the same pulse rate, and in phase, under these conditions. Accordingly, there is a zero error signal output from phase discriminator 18 and the cutting element remains motionless. However, if a pulse rate output from function generator 37 does appear on leads 39 and 43, and therefore a pulse train representing a commanded velocity is fed into command phase counter 31, then the pulses on lead 43, as well as the clock pulses on lead 26, are counted by phase counter 31. If the direction of motion commanded by the programmed tape is in a negative direction, the pulses on lead 43 are subtracted from the block pulses in the command phase counter. Whether the direction is positive or negative with respect to the Y coordinate, is indicated to command phase counter 31 by a signal applied from the input equipment 21 along leads 22, 45 and 46. The addition or subtraction of pulses in the command phase counter 31 has the net effect of either advancing or retarding the phase of the output pulses from the phase counter on lead 19, respectively, relative to the output pulse train from the synchro resolver 16 on lead 17. Accordingly, position servo 9 drives the Y-axis feed mechanism in the appropriate direction and at a rate proportional to the error signal developed in discriminator 18. As Y-axis feed mechanism 13 continues its motion, it will eventually traverse the entire distance required for the specific cutting operation. When this distance is completed, it is recognized in the Y-axis distance counter 42 and a blocking signal is generated therefrom along lead 93. This blocking signal is applied to command phase counter 31 in a manner so as to stop the input thereto from function generator 37. When this happens, pulse rate signals can no longer be added to the clock pulse rate in command phase counter 31, with the result that the phase of the output from phase counter 31 can no longer be changed.

NUMERICAL CONTOURING SYSTEM IN DETAIL

Figure 2:
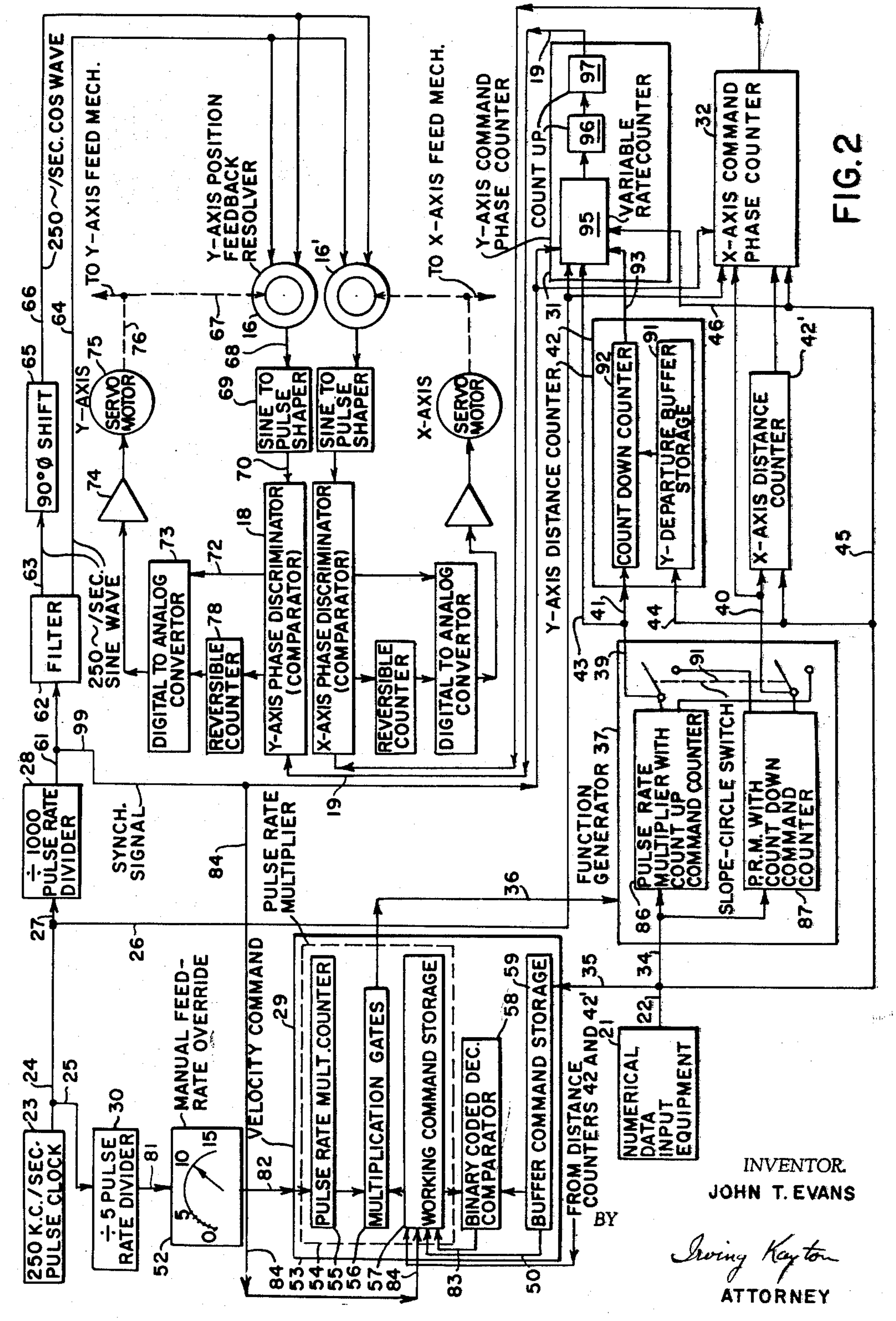
FIG. 2 is a block diagram of a numerical contouring control system shown in greater detail than that of FIG. 1 and which highlights the environment within which the various features of the invention are found.

With the broadly stroked description of the relationship between the sub-systems of the numerical contouring control system as background, consider now FIGURE 2 which shows the overall system in block diagram form sufficiently detailed to more clearly highlight the specific system environment into which the several aspects of the invention fit.

*Servo feed back loop*

Consider first, the application of the actual position information of the cutting tool into the servo loop. At the top left-hand corner of FIGURE 2, the basic clock pulse rate is generated in the pulse clock 23 which provides a pulse train output of 250 kilocycles per second. Each pulse cycle has a period of 4 microseconds with each pulse having a width of 2 microseconds. The 250 kilocycles pulse train is applied along leads 24 and 27 to a divide by 1000 pulse rate divider 28. Pulse rate divider 28 is a three decade counter so that on its output lead 61 is propagated a pulse train of 250 cycles per second, i.e., 250 kilocycles divided by 1000. Pulse clock 23 and divider 28 used to obtain the 250 cycle per second pulse train on lead 61 are devices well known in the digital computing art for generating a clock or reference frequency and for dividing that pulse rate or frequency into one or more pulse rates utilized for controlling various parts of the system.

The 250 cycle pulse train is applied on lead 61 to a filter 62 which serves in a manner well known in the art, to derive from the square wave train a 250 cycle per second sinusoidal wave. The output of filter 62 is applied to two different output leads 63 and 64. Lead 63 couples the sine wave to a 90° phase shifter 65, with the result that the output of phase shifter 65 is a 250 cycle per second cosine wave on lead 66. The sine and cosine voltages are applied as two-phase excitations to the stator windings of synchro resolver 16. The two-phase excitation of the stator windings produces a uniform magnetic flux rotating at 250 revolutions per second in the two pole resolver 16. With the rotor in a stationary condition, the output voltage of the single phase secondary winding of resolver 16 is a single phase voltage of 250 cycles per second (in the form of a sine wave potential) whose phase is dependent upon the rotor position of the resolver.

Rotation of the rotor produces a phase shift of the output signal in the ratio of 360° of phase shift per revolution of the shaft driving the rotor. The shaft, represented by mechanical linkage 67, is mechanically coupled to the Y-axis feed mechanism of the machine tool. The gearing and coupling is such that one 360° revolution of the resolver rotor, is equivalent to .1 of an inch of motion of the cutting tool along the Y-axis. One revolution of the rotor may be conveniently broken down into 1000 angular increments commensurate with increments of motion of the cutting tool along the Y-axis of .0001 of an inch per angular increment (although it is to be understood that the actual resolution of the resolver is infinite). This angular incremental break-down is matched elsewhere in the control section (as was discussed above and will be discussed in more detail below); one pulse in the control section represents a commanded increment of motion of .0001 of an inch for the machine tool.

The 250 cycle per second sinusoidal output voltage of of resolver 16 is applied on lead 68 to a "sine to pulse" shaping or converting network 69. Such a network, well known in the art, functions to limit the amplitude and shape the sinusoidal voltage such that the output from shaper 69 applied along lead 70 to Y-axis phase discriminator 18 is a 250 cycle per second square wave pulse train. This square wave signal is the feed back signal which is indicative of the position of the feed back resolver shaft to within one revolution of the shaft. The phase of the 250 cycle pulse train is indicative of the position of the feed back rotor to well within a 1,000th of one full revolution. During rotation of the resolver rotor, the phase of the resolver output signal increases for rotor rotation against the direction of flux rotation within the resolver, and decreases for rotation with the direction of flux rotation, by an amount proportional to the velocity of rotation. Consequently, the lagging or leading in phase of the output from resolver 16 (relative to the reference output on lead 61 from divider 28) applied to discriminator 18 provides an indication of the machine tool's position in an absolute sense; the phase of resolver output relative to the output of phase counter 31 indicates the direction of required motion.

*The phase discriminator*

The reference, of course, is the commanded position and velocity that is desired for automatically controlling the machine tool. This commanded reference is similarly in the form of a 250 cycle per second square wave applied as an input to Y-axis phase discriminator 18 on lead 19. Phase discriminator 18 compares the commanded signal applied to it on lead 19 from command phase counter 31 with the signal applied to it from the resolver on lead 70. The difference in phase between these two signals constitutes the error signal applied in the servo loop. Thus, such an error signal is applied from discriminator 18 on output lead 72 to a digital to analog converter 73 which functions to convert the phase difference, if any exists, into a D.C. analog potential. This error signal potential is applied to a conventional D.C. operational amplifier 74 which in turn drives the Y-axis servo motor 75. The feed back loop is completed through a feed motor and its shaft 76, which is coupled in turn to the shaft 67 of the resolver rotor as well as to the Y-axis feed mechanism. If the signals applied to the discriminator on lead 70 and 19 are of the same frequency and phase, then the phase difference is zero and there is no error signal out and no motion commanded by the servo loop. This condition conforms to a commanded velocity of zero from the control section and a Y-axis feed mechanism motion of zero.

Let us assume, however, that the control section commands a velocity of motion for the machine tool which is different from the present velocity of the machine tool. This will be done by continuously changing the phase of the command signal applied to the discriminator along lead 19. As the phase of the signal applied to the discriminator shifts relative to the phase of the signal applied thereto on lead 70 from the feed back resolver 16, the phase difference detected at discriminator 18 between the command signal and the feed back signal tends to increase; an error signal is thereby built up. This error signal causes servo motor 75 (through a feed motor) to rotate the resolver rotor in such a direction as to bring this phase difference back to a minimum. For a steady rate of phase shift of the command signal applied to the discriminator on lead 19, the resolver rotor rotates at such a speed as to maintain a constant phase shift difference at discriminator 18. An increase in command speed causes this phase difference to increase sufficiently to cause the error signal to be adequate to drive the servo motor at the higher velocity. When the command signal is brought to a zero rate of phase shift, the feed motor moves the feed back resolver rotor to such a position as to produce a feed back signal in exact phase correspondence with the command signal. Contouring is obtained by causing the phase of the command signal applied to the discriminator to change at such rates and by such magnitude as is required to produce the desired motion of the machine tool.

Discriminator 18 includes the reversible counter 78. This extended range discriminator insures that the digital to analog converter 73 provides an output error signal which is directly proportional to any phase difference whether it be less than or greater than 360°. Specifically, the reversible counter 78 senses the phase difference generated in the discriminator 18. For every full cycle of difference, whether leading or lagging, it excites the digital to analog converter in such a way that the output of converter 73 is a D.C. potential directly proportional not only to the fractional cycle phase difference, but to the additional full cycle phase differences registered in the reversible counter 78. The extended range of operation of the phase discriminator 18 is an important aspect of the instant invention and will be described in greater detail below in connection with FIGURES 28 through 32.

Having thus described the operation of the feed back loop in FIGURE 2, everything else in FIGURE 2 is the control section and is directed to providing the appropriately phased command signal on lead 19 to be applied to the discriminator 18.

*Numeral data input equipment*

The input to the control section is through the numerical data input equipment 21. It is through this equipment that the desired program for the operation of the machine tool is introduced as punched tape carrying the programmed information in the form of binary-coded-decimal representations. The programmed punched tape is "read" at the input equipment 21 by conventional punched tape reading means. Particularly appropriate for binary-coded-decimal punched tape equipment of this control system is the Friden Flexowriter, model SPS. The punched tape reader converts the binary-coded-decimal representation into electrical pulses which are also in the binary-coded-decimal form. These pulses are then routed over the output lead 22 to the various portions of the control section command system for directing the activities of these various sub-systems. Appearing immediately below, is a typical program manuscript which may be punched into the tape in binary-coded-decimal form.

TABLE 1.—PROGRAM MANUSCRIPT

| From Data Point | Data to Point | Program Selection | X Departure | Y Departure | Y Arc Center Offset | X Arc Center Offset | Feed Rate Number |
|---|---|---|---|---|---|---|---|
| A | B | g1 | x+5.0000 | y+0.0000 | -------- | -------- | f020 |
| B | C | g1 | x+6.0000 | y+1.7500 | -------- | -------- | f016 |
| C | D | g3 | x+2.5000 | y+3.7500 | k 3.7500 | j 1.5000 | f025 |
| D | E | g1 | x+0.0000 | y+1.0000 | -------- | -------- | f100 |
| E | F | g2 | x+1.0000 | y+1.0000 | k 0.0000 | j 1.0000 | f100 |
| F | G | g2 | x+1.0000 | y−1.0000 | k 1.0000 | j 0.0000 | f100 |

Such a program would be used to command a series of cuts or paths to form the tool contour shown, for purposes of illustration, in FIGURE 3. Each row of the table consists of one block of information required for performing one specific cut between two points. Thus from Point A to Point B, a slope rather than a circular cut is required. Since the cut is horizontal, the instruction for the Y departure is zero. The columns of the Program Manuscript Table commencing with the "Program Selection" column, and ending with the last column, entitled "Feed Rate" include the types of information actually punched into the tape. The two columns on the left are presented merely for relating the data blocks of the program with the contour to be cut of FIGURE 3.

The program selection for the first path or cut from A to B is coded as *g*1 and means that a straight line, according to some slope, must be cut. The letter "*g*" is the address, and "1" the slope instruction. This straight line slope control is referred to in the art as "linear interpolation." The third row in the program selection column indicates a *g*3 program. This means a circular arc must be cut, (circular interpolation) in a counter-clockwise direction, while a *g*2 program selection requires a circular arc in the clockwise direction.

The X departure column indicates the distance the machine tool must traverse in the X direction from its present point location in order to complete the cut, e.g., in the first row the X departure takes the cutting element from A to B. Similarly, the Y departure is the distance the tool must traverse from the present point in the Y direction (simultaneously with X coordinate motion). The X and Y departure columns with their X and Y addresses, have a plus or minus sign indicating whether the motion is to be in the positive or negative direction along those coordinates. The X and Y arc center offset data are comparable to the X and Y departure data, for defining the path for circular interpolation. The last column is the Feed Rate Number. This is the instruction which determines the speed with which the cutting tool moves relative to the workpiece. For each numerical data instruction there is associated with it the address that properly routes that instruction to that part of the control section where it is to be utilized. In order more readily to correlate FIGURE 3 with the Program Manuscript table, the following relations are set forth. $R_H$ is the radius of the circle for the arc from point C to point D. $K_D$ is the "Y" arc-center offset, and $J_D$ is the "X" arc-center offset.

Other programs may also be selected. Thus, for example, automatic acceleration or deceleration may also be programmed.

In order to resolve the resultant feed rate into its X and Y components, so that motion in these two coordinates may be initiated, it is necessary to multiply the feed rate by the sine and cosine of the slope angle (i.e., arctangent Y departure/X departure). However, nowhere in the Program Manuscript shown are the sines and cosines of any angles actually represented (although they may be used if the programmer so desires). This is because the X and Y departures themselves are utilized for obtaining the appropriate X and Y feed rate components from the overall resultant feed rate. This may be done by using the following simple linear equation as follows: $F_C=10F_D$/length of line or slope, where $F_C$ is the feed rate command as set forth in the last column of the table, $F_D$ is the feed rate actually desired for the cutting tool in inches per minute. With this feed rate command, the X and Y departures may be used in lieu of the sine and cosine of the slope angle.

The use of the addresses and instructions for circular interpolation will be discussed below in connection with the description of FIGURES 16 through 20. Those figures and related discussion are directed to that part of the system which generates circular interpolation information in conjunction with means for preventing errors due to circle function overflow. The expression "error due to circle function overflow" refers to the following situation.

In performing circular interpolation, it is possible in some instances that the end point of the arc departure for one of the two coordinates may be reached slightly sooner than that of the other coordinate. To prevent the carrying over of this positional error into the next programmed cut, the motion for the cordinate earlier completed is arrested until the final position for the second coordinate is also reached.

Numerical data input equipment 21 additionally includes appropriate gating circuitry, to aid in routing the numerical instructions to the appropriate circuits in the control system in accordance with their addresses. Both the punched tape reading equipment and the associated routing circuitry are well known in the art and are not further described here.

With the required address and instruction information available at the appropriate portions of the control section by virtue of the punched tape reading and routing circuitry of input equipment 21, we may now consider the operation of the control section responsive to these instructions.

*Velocity command*

The 250 kilocycles per second output of pulse clock 23 is applied on lead 24 and thence lead 25 to a divide by 5 counter which produces an output of 50 kilocycles per second. Since each pulse represents an incremental distance of .0001 of an inch of linear motion, the pulse rate from counter 30 represents a linear motion of 5 inches per second, or 300 inches per minute. Control of velocity and distance is exercised in subsequent subsystems of the control section by dividing this 50 kilocycle per second pulse rate down to lower pulse rates for lower velocities and by counting the total number of pulses to get specified magnitudes of displacement.

The output of divider 30 is applied on lead 81 to the manual feed rate over-ride 52 and thence on its output lead 82 to the velocity command system 29. Manual feed rate over-ride 52 has an important function to be discussed below. However, for the purposes of the immediate discussion only, consider the manual feed rate over-ride 52 as merely performing the function of dividing the input 50 kilocycle pulse rate, down to an output pulse rate on lead 82 of 33.3 kilocycles. This 33.3 kilocycle pulse rate corresponds to a cutting tool feed rate of 200 inches per minute. For normal operation of the contouring control system, this 200 inches per minute feed rate is the maximum rate. Under certain conditions, this maximum may be increased by use of the manual feed rate over-ride 52.

The function of velocity command system 29, in one important aspect, is to lower the incoming pulse rate on lead 82 by the proper amount so as to obtain an output pulse rate of lead 36 corresponding to the programmed linear velocity or command feed rate. Thus, the feed rate in the last column of the program manuscript table above dictates the extent to which the incoming pulse rate will be reduced in accordance with the desired feed rate. By way of example, assume the desired feed rate is 100 inches per minute. Velocity command 29 accordingly selects an average of 1 out of each 2 input pulses (coming in at a pulse rate of 33.3 kilocycles equal to 200 inches per minute), and furnishes this reduced pulse rate as an output on lead 36. Similar output ratios may be obtained for other required velocities. This is accomplished in velocity command 29 by pulse rate multiplier 54 the major components of which are the pulse rate multiplier counter 55, the working command storage or register 57, and the multiplication gates 56 which interconnect the PRM counter 55 and the working command storage 57. PRM counter 55 and working command storage 57 (as well as the rest of the control section) operate in the binary-coded-decimal form, as does the data from the punched tape equipment 21.

PRM counter 55 cyclically counts 200 pulses. Working command storage 57 has set into it, indirectly, a number from input equipment 21, which is the command feed rate in inches per minute. If the number in storage 57 is 200, then multiplication gates 56 are gated to permit 200 pulses out on lead 36 for every 200 pulses in on lead 82. If a feed rate of 100 inches per minute is stored in working command storage 57, then only half of the pulses in to counter 55 during any period of time would pass through to output lead 36. In this way, any decimal fraction of the pulse rate input to velocity command 29 may be derived as an output pulse rate, for utilization in subsequent portions of the control section.

It is of importance that whatever pulse rate appears on the output lead of velocity command 29, the distribution of pulses be reasonably uniform with respect to time. It may be recalled that the application of the command signal from the control section command phase counter 31 to the servo mechanism is through phase discriminator 18 which functions to compare the phase of the command counter output signal with the phase of the feed back signal. A command signal from the control section which has bunched or irregularly grouped pulses to represent a pulse repetition rate would be a poor vehicle indeed to carry command signals to the phase counter and phase discriminator.

Figure 7C:
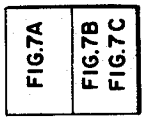

For this reason, PRM 54 is of a special type in that the PRM counter 55 is arranged to count in a binary-coded-decimal form which is different from the binary-coded-decimal form for which working command storage 57 is adapted. The combination of these two uniquely related code forms, with the intermediary of special gating circuitry in multiplication gates 56, provides a uniformly distributed output pulse train on lead 36 appropriate for utilization in a phase sensitive system. The detailed logic circuitry and operation of PRM 54 will be described in detail with reference to FIGS. 6–7C.

Data input from tape equipment 21 to velocity command 29 and in particular to PRM 54, is through the intermediary of the buffer command storage register 59 located in velocity command 29. Buffer storage 59 holds the new command until completion of the previous block of punched tape commands. Upon this completion, the data in buffer storage 59 is instantly transferred to working command register 57 on lead 50. Upon completion of this transfer, the data input section 21 again functions to reload buffer storage 59 with instructions from the next following block of punched tape data. Thus, input equipment 21 reloads buffer storage 59 during the time that PRM 54 is processing the preceding block of data. Buffer storage of this type is used throughout the control section wherever instructions from the input equipment 21 is required for the operation of that particular sub-system. Without buffer storage, there would be a delay between successive paths, or other operations, since the input data from the tape could not be applied instantaneously to the working storage registers but would have to be read into them from the tape at the completion of each operation.

In the case of the velocity command 29, however, instantaneous transfer of input data to working storage 57, is not the only reason for the inclusion of a buffer command storage register. The buffer command storage 59 is an integral part of the automatic acceleration and deceleration feature of the contouring control system. As was explained above, it is sometimes desirable to change the velocity upwardly or downwardly at the end of a cut or immediately at the beginning of a new cut when the two successive cuts are programmed at widely different velocities. This helps insure that the workpiece is not marred during the transition. A smooth and gradual velocity transition is obtained through use of the automatic acceleration or deceleration apparatus.

Automatic acceleration/deceleration is accomplished in velocity command 29. Consider the situation wherein the end of a cut is being approached, and the next cut should have a feed rate number which is considerably less than that of the preceding cut. During the current cut, the feed rate is stored and used in working command storage 57. Instructions for automatic acceleration comprise, among other things, a separate block of data which modifies only the velocity relating to the last previous block specifying a given path. The feed rate number for automatic acceleration is inserted in buffer command storage 59. Thus the number in buffer 59 is less than the number in working storage 57. At an appropriate distance before the end of the cut, selected by the automatic acceleration program, a signal from distance counters 42 and 42' is generated indicating that automatic acceleration is to begin.

The binary-coded-decimal comparison circuit 58 simultaneously senses the working and buffer storages 57 and 59 to ascertain which holds the larger number. If the two stored numbers were the same, there could be no output from the comparator 58. However, in this situation the number in working storage 57 is larger than that in buffer storage 59. Accordingly, there is an output from the comparator 58 on lead 83 which, with the signal generated from distance counters 42 and 42', permits the application of a pulse train on lead 84 to working storage 57. Lead 84 is provided with a pulse rate taken directly from the output of the pulse rate divider 28 and therefore under ordinary circumstances applies a pulse rate of 250 cycles per second directly to the working command storage.

The working command storage 57 is actually a reversible binary-coded-decimal counter. Accordingly, if the output from comparator 58 indicates that the number in working storage 57 is greater than that in buffer storage 59, it actuates the reversible counter storage 57 through lead 83 in its countdown rather than count up mode of operation. In this way, the number stored in working command storage 57 continuously decreases at a 250 cycles per second rate until it equals the number stored in buffer command storage 59. When this happens, the comparator 58 has no output and the pulse train applied to working storage counter 57 on lead 84 is blocked. This means that the present feed rate number has now been converted to the feed rate number programmed for automatic acceleration.

The result of this process on the output of PRM 54 of velocity command 29 may be readily comprehended. The pulse rate representing resultant command velocity or feed rate number on lead 36 continuously changes from the rate commanded before deceleration was ordered to the rate required by the deceleration block of data. With this automatic acceleration or deceleration circuitry, it is possible to gradually convert a present velocity at the machine into the velocity for the next cut (at any desired rate of change). The transition may be achieved more rapidly by having a higher pulse rate than 250 cycles per second applied on input lead 84 to the reversible counter working storage 57.

In the actual operation of automatic contouring control equipment, it is sometimes apparent to the man overseeing the operation of the machine tool equipment, that a particular program under which direction the machine is operating, may possibly be improved. Thus, for example, it may be the case that the operator can see that a feed rate for a particular cut that was programmed into the tape may be too slow, or it may possibly be too fast. To enable the operator to vary the feed rate for any particular cut in accordance with his skill and knowledge, a "manual feed rate over-ride" control is provided, such that the feed rate may be changed from that of the programmed feed rate. This feed rate over-ride is represented by block 52. In essence, the feed rate over-ride is a special type of pulse rate multiplier inserted between leads 81 and 82 with a manual switch control which enables the operator to feed a number directly into the working command storage of the PRM of over-ride 52. In ordinary operation, the switch of over-ride 52 is placed in its indicated position on contact 10. This means that the 50 kilocycle input to the manual feed rate over-ride is converted into the 33.3 kilocycle output as discussed above. The switch of the over-ride 52 is a 16 position selector switch which permits the gating out of 0 to 15 pulses out of every 15 input pulses to over-ride 52, to thereby produce an output pulse rate which may vary from 0 to 50 kilocycles, in discrete steps of 3.3 kilocycles. When feed rate over-ride 52 is used to provide a zero output, it brings the entire contouring control system to a stop but synchronism is maintained throughout the system. The control system may then be started up by changing the selector switch to some position other than the zero position. Effectively, then, the output of over-ride 52 is a pulse rate commensurate with velocities from zero to 150% of whatever velocity is programmed for automatic operation. The output of feed rate over-ride 52 is applied to velocity command 29.

*Function generator*

Velocity command 29 propagates a train of pulses on its output lead 36 having a rate commensurate with the feed rate programmed into the punched tape. This is commensurate with resultant velocity that the cutting tool will travel relative to the workpiece. However, this velocity must be broken down into its X and Y components in order for the X and Y feed mechanisms to be individually actuated. Consequently, the pulse rate on lead 36 is applied as an input to function generator 37. Function generator 37 comprises two PRM's 86 and 87 (which actually use a single PRM counter in common). The pulse train from velocity command 29 is applied to the PRM counter in each of the two PRM's 86 and 87, related to the Y and X coordinates, respectively. The Y and X programmed departures are respectively applied to the working command storage registers in PRM's 86 and 87, from the numerical input equipment 21 along leads 22 and 34. For linear interpolation, therefore, the output of PRM 86 on lead 88 is the pulse rate into function generator 37 multiplied by a number commensurate with the sine of the slope angle of the path to be cut. Similarly, the output of PRM 87 on lead 89 is the input pulse rate multiplied by a number commensurate with the cosine of the angle. The Y output lead 39 is coupled to the Y-axis distance counter 42 while the X output lead 40 is connected to the X distance counter 42'. Accordingly, lead 39 has a pulse train appearing on it whose rate is representative of the commanded Y component of velocity while lead 40 has a pulse rate upon it which is directly representative of the X component of velocity. From this point on to the servo loop, the X and Y circuitry are exact duplicates of each other.

It is important to note that the pulse rate on output lead 39 from function generator 37 is applied to both the Y-axis distance counter 42 and the Y-axis command phase counter 31 along the leads 41 and 43, respectively.

*Axis distance counter*

The function of the axis distance counter is to count out, for each block of input data representing one path cut, the commanded number of pulses from function generator 37 into command phase counter 31 and then stop the command phase counter from accepting additional pulses when the commanded total displacement for the given axis is completed. Thus, if 2500 pulses are counted out into the command phase counter 31, these pulses will produce a motion command of 0.25 of an inch. The other axis might have a total distance count of 2317 pulses corresponding to a desired distance of motion along that coordinate of 0.2317 of an inch. When both axes have completed the specified displacement, new data, waiting in the buffer storage units of each of the two distance counters, is immediately transferred to the working registers of those counters, and the normal cycle is resumed on the new block of data. At the same time data is transferred from buffer to active storage appropriately throughout the entire control section.

The distance counter 42 includes a countdown counter 92 which has sufficient counter capacity to accept 99,999 counts, equal to a distance of 9.9999 inches. The Y departure for each block of data is applied from input equipment 21 along leads 22 and 44 to the Y departure buffer storage 91. Upon completion of the previous block of data, the Y departure stored in buffer storage 91, is immediately transferred to countdown distance counter 92 and effectively sets that distance counter to read the next Y departure. With the pulse train applied from function generator 37 along lead 39 as its input, the countdown counter 92 commences counting down toward zero from the Y departure magnitude initially set in it.

Upon reaching the zero count the last decade of countdown counter 92 provides an output pulse from distance counter 42 on lead 93 which is an input to the first decade 95 of Y-axis command phase counter 31. This signal blocks or disables the commnd phase counter 31. Consequently, when Y-axis distance counter 42 has counted the number of pulses equal to the Y departure programmed into it, no more pulses are counted in the command phase counter 31 from the function generator 37. This ultimately has the effect of providing a zero command signal to phase discriminator 18. When the countdown counters of both the Y-axis and X-axis distance counters have generated an output as a result of the counters both reaching a zero state, and both command phase counters are therefore disabled, the condition is set for the next block of data to be acted upon. This means that both axes have completed their specified displacements, and the normal cycle is resumed on the next new block of data. At this time instructions in the buffer storage registers throughout the control system are transferred to the working storage registers.

*Command phase counter*

The command phase counters 31 and 32 are required for each axis to generate a command signal to the two phase discriminators. The command phase counter 31 comprises three decades of binary-coded-decimal counters 95, 96 and 97. All three are countup counters, but counter 95, which is the first decade of the three, is a variable rate counter in a special sense. It may be noted that the 250 kilocycle per second pulse train from clock 23 is applied as an input to the variable rate counter 95 along input leads 24 and 26. In the absence of contouring command signals on lead 43 from function generator 37 (due to a commanded zero velocity) or when the command velocity signal on lead 43 is blocked from being put in to counter 95 due to the completion of the count in Y-axis distance counter 42, command phase counter 31 counts only the 250 kilocycle per second pulses from clock 23. The three decades 95, 96 and 97, under these circumstances, count the 250 kilocycles down to 250 pulses per second on the output lead 98 of phase counter 31. It should be noted that the divide by 1,000 pulse rate divider 28 coupled to the output of clock 23 also counts down to 250 pulses per second in the same manner. When the control system is initially started up, command phase counter 31 is preset to 000 and then started counting after the divide by 1,000 pulse rate divider 28 completes one of its thousand counts. This may be seen to be implemented by the output lead 99 coupled from divider 28 to the input of variable rate decade 95 in command phase counter 31. Thus command phase counter 31 and the pulse rate divider 28 are initially synchronized to count together in exact correspondence with each other.

When a Y coordinate pulse rate is applied from function generator 37 along lead 43 to command phase counter 31, and when there is no blocking signal from distance counter 42 on lead 93 to the variable rate decade 95, then the variable rate decade adds or subtracts the feed rate pulses on lead 43 with the clock pulse train on lead 26. The feed rate pulses are added to the clock pulses if the command from the input equipment 21 on leads 22, 44, 45 and 46 indicates that an addition should be made, i.e., indicates that the Y component of velocity should be in the positive Y direction. If the instruction from input equipment 21 indicates that a negative Y departure is involved, then the pulses applied to the phase counter on lead 43 are subtracted from the clock pulses. The addition and subtraction is accomplished in the following manner. If addition is commanded from input equipment 21, then the simultaneous appearance of a pulse on leads 26 and 43 at the input of counter 95 results in the counter counting 2 rather than one for that situation. If subtraction is required by the appropriate command, then the simultaneous appearance of pulses on leads 26 and 43 results in the variable rate counter counting zero rather than counting a one.

The net result of this operation is that, when adding or upscaling in the counter, the output pulses on lead 19 from the last decade of the phase counter 31 jumps forward or advances in phase slightly; to be exact, it advances 1,000th of one cycle for the 250 cycle per second pulse rate. Conversely, if the counter subtracts or operates in a downscale direction, then the output lags or jumps back 1,000th of an output cycle for each subtracted pulse. This phase relationship is with reference to the output of the pulse rate divider 28 which also has a 250 cycle per second pulse rate. Thus, the greater the pulse rate on the input 43 to phase counter 31 from function generator 37, and therefore the greater the commanded Y-axis velocity, the greater will be the rate of change in the phase of the output signal from the phase counter 31 on lead 19 relative to the output signal from the pulse rate divider 28. The command of a positive or negative direction determines whether the phase is advancing or retarding with respect to output 61 of divider 28. This phase controlled signal on lead 19 is then applied to Y-axis phase discriminator 18 for phase comparison with the Y-axis position feed back signal applied to discriminator 18 from feed back resolver 16 (which was discussed above).

THE BASIC LOGIC BLOCKS

The overall system at this point has been described in sufficient detail such that the various aspects of the invention which fit into the overall system may be properly comprehended. Accordingly, the detailed logic circuits and the description thereof for the various aspects of the invention will now be presented. In order to insure that the nomenclature is understood, FIGURES 4A through 4H are now presented with a brief explanation thereof. All of the figures subsequent to FIGURES 4A through 4H utilize the basic logic packages now to be described.

All digital logic circuits require devices to perform logic functions on the one hand, and storage or memory functions on the other. The logic functions in this system are performed by NOR packages as represented in FIGURES 4A through 4C. It is well known in the art that any Boolean equation can be synthesized with NOR logic exclusively. The memory or storage is provided by the bistable multi-vibrators or flip-flops represented in FIGURES 4D through 4H.

NOR logic, which is well known in the art, is shown symbolically in FIGURE 4A with inputs A and B and output C. The truth table for this logic block is represented in FIGURE 4B. Very simply, this logical function can be defined as follows: If, and only if, the A input, or the B input, or both, have the logic value 1 applied thereto, then the output C has the logic value of zero. Stating it another way, the output C is equal to zero if, and only if, one or both of the input leads assumes the logic value of 1. FIGURE 4C is a single input NOR package. This is an inverter, but the notation utilized is the same as that for FIGURE 4A. The output B of the inverter always takes on the opposite binary value from that of the input A.

There are many different circuits for mechanizing the logic components represented in FIGURES 4A and 4C. However, particularly useful transistor NOR circuits for use in this numerical contouring control system are disclosed in a standard text on transistorized digital logic components entitled "Design of Transistorized Circuits for Digital Computers," by Abraham I. Pressman, John F. Rider, Publisher, Inc., New York, 1959. More particularly, a preferred two input transistor NOR circuit is shown therein in FIGURE 8–1, at page 8–191. The inverter of FIGURE 4C may be mechanized by having solely one input to the NOR circuit of FIGURE 8–1 of the Pressman text. It is often the case, that the NOR package must handle more than two input variables. This is very readily mechanized since two or more NOR circuits may be placed in parallel to provide the required function. Thus, in FIGURE 8–16, at page 8–212 of the Pressman text, there may be found two NOR circuits in parallel to provide a zero output if, and only if, one or more of the four input leads has the logic value one applied thereto. The parallel array may be increased considerably so that a large number of inputs, indeed a few dozen inputs, may be arranged to perform this logic function. The overall system operation is not affected adversely by this paralleling of the circuits since each of the NOR circuits has a transistor amplifier therein, whereby appropriate potential and current values are readily maintained.

The bi-stable multivibrator or flip-flop which is used primarily for storage or memory, is shown in FIGURE 4D. This may be mechanized in accordance with the circuit in the Pressman text shown in FIGURE 11–7, at page 11–296, by opening each of the two loops connecting each of the output leads with its input steering lead. Electronic set and reset inputs may be implemented (to perform the logic functions to be described relative to FIGURE 4F) by applying two input signals to the bases of the two transistors of the flip-flop, respectively, through a series resistor connected to each base terminal. The logic of the multivibrator of FIGURE 4D is represented in the truth table of FIGURE 4E. In the device of FIGURE 4D, it may be noted that the input to the set and reset trigger leads C and D are tied together such that C always equals D. In ordinary use in the following circuitry, the clock pulse train is applied to this C–D input. The clock pulse train is steered out of the flip-flop through either the G or the H output leads, dependent upon the state of the set steering lead A and the re-set steering lead B. In the truth table of FIGURE 4E, the output states for the leads G and H are represented both before and after the clock pulses are applied to C and D. Thus, the representation $G_N$ indicates the state of output lead G prior to the application of the clock pulse, while the representation $G_{N+1}$ indicates the state of the output lead G immediately after the application of the clock pulse. The notation for output lead H in the truth table is the same as for G. It may be seen that an output lead changes its state upon the application of a clock pulse, if, and only if, the output lead state prior to the application of the clock pulse is the same as the logic value applied to the steering lead on its side of the flip-flop. These values can be seen in the portion of the truth table enclosed by a heavy black line.

The convention herein adopted is that the logic value zero applied on a lead means that a positive voltage is applied. The logic value one, on the other hand, is used for the zero or reference voltage. This notation is consistent with the practice followed in the authoritative text on logic switching and design by Keister, Richie, and Washburn, entitled "The Design of Switching Circuits," D. Van Nostrand & Company, 1951.

The flip-flop of FIGURE 4D has two additional inputs, the electronic set lead E and the electronic reset lead F. These two inputs completely swamp the flip-flop and override any condition that exists at that time. The truth table of FIGURE 4F, demonstrates the logic operation with the inputs E and F as the entering arguments. It may be noted that irrespective of any condition in the FIGURE 4E truth table, the application of a 1 to the E lead will place the G output in state 1, and the application of 1 input to the F lead will place the H output in state 1.

The flip-flop of FIGURE 4D need not have its input leads C and D tied to each other. The truth table which completely describes this logic is presented in FIGURE 4H. The term "pulse present" as used in the truth tables means that the logic state on that lead has switched from state one to zero. If there has been no change in state, or the change has been from state zero to one, then there is a "pulse absent."

The flip-flop of FIGURE 4D is very readily utilized as a binary counting stage of an overall pulse counter. FIGURE 4G shows the flip-flop arranged in a manner so as to perform this function. It may be noted that the output lead G is fed back as the input lead A and the output lead H is fed back as the input lead B. This feed back constrains the flip-flop to act as a counter such that every time a pulse appears on the tied input leads C–D, the outputs G and H of the flip-flops change their state. This may be seen very readily by referring to the truth table of FIGURE 4E. The flip-flop of FIGURE 4G is a special instance of the truth tables of FIGURES 4E and 4H in that A and $G_N$ must always be the same, and B and $H_N$ must always be the same. Under these circumstances, whenever a zero going pulse input, i.e., change in state from one to zero, is applied to the $C=D$ lead, the output states G and H switch. The mechanization of such circuitry is shown in detail in the above-mentioned Pressman reference in FIGURES 11–7, at page 11–296.

VELOCITY COMMAND, DETAIL (FIGS. 5A–5E)

In FIGS. 5A–5E, there is shown the relationship of the manual feedrate override stage 52, the X-axis and Y-axis distance counters 42 and 42' respectively, the pulse rate multiplier 54 comprising the pulse rate multiplier counter 55, the working command storage 57, and the multiplication gates 56, the buffer command storage 59, and the binary coded decimal comparator 58.

The output of manual feedrate override stage 52 is applied as the input gate signal to the velocity command 29 (FIG. 2). It is seen in FIGS. 5A–5E that this latter signal is actually applied to the least significant decade of pulse rate multiplier counter 55, pulse rate multiplier counter 55 comprising a decade 201 and a decade 202. Each of decades 201 and 202 comprise four flip-flops, the flip-flops in each decade being successively weighted 1, 2, 4 and 5 repectively. The "1" weighted flip-flop in decade 201 is shown detached from the other three flip-flops thereof to show its connections more clearly.

The output of clock 23 is passed through an inverter 203, the output of inverter 203 being applied to a three decade reference counter 204, the flip-flops comprising a decade in this counter being weighted 1, 2, 4 and 5 respectively. The H output of the "4" flip-flop of decade 205 is applied as an input to manual feedrate override 52. Since in a 1, 2, 4, 5 binary coded decimal counter, a pulse appears twice in the "4" flip-flop during each cycle, a 50 kc. pulse train appears on lead 82 as the input to manual feedrate override 52.

From the "50" flip-flop of decade 206 of reference counter 204, there is derived from the H output thereof, a signal having a pulse repetition frequency of 2,500 kc. and this signal is used as the trigger input to the least significant decade 210 of working command storage 57 as will be further explained hereinbelow.

From the "100" flip-flop in the most significant decade 207 of pulse reference counter 204, there is derived a pulse train having a pulse repetition frequency of 1000 cycles, there is derived from the "200" flip-flop, a pulse train having a frequency of 500 cycles and from the coincidence of H outputs of the 200 flip-flop and the 500 flip-flop, there is derived a pulse train having a frequency of 250 c.p.s.

The pulse trains derived from the most significant decade of pulse reference counter 207 are so applied to the acceleration selection gates, generally designated by numeral 213, whereby at the output of these gates, there may be provided a 250 cycle pulse train on lead 215 which is provided by the 250 cycle pulse train appearing on lead 214 or a 500 cycle pulse train which is provided by the 500 cycle pulse train appearing on lead 208. The 250 cycle output on lead 215 has pulses occurring at the coincidence of the pulses in the "100," "200" and "500" flip-flops of decade 207 and the 500 cycle output on lead 215 has pulses occurring at the coincidence of pulses in the "100" and "200" flip-flops in decade 207.

Also, applied to the acceleration selection gates section 213 is a signal appearing on lead 216 which is a binary zero either when the setting in the second most significant decade of the X-axis and Y-axis distance counters 42 and 42' are less than the value of the setting in the least significant decade 222 of the preparatory command buffer storage 220 or when decade 222 is in the zero state. In the first alternative, a binary one appears on lead 217 and in the second alternative a binary one appears on lead 218.

This is further applied to the acceleration selection gates section, a signal which is the output of an inverter 223 the input to the inverter being the output of a two input gate, the inputs to gates 224 being the H outputs of the 10 and 80 flip-flops of decade 221 of preparatory command buffer storage 220. In this latter connection, it is seen that the output on lead 225 is a binary zero when the 10 and 80 flip-flops in decade 221 are in their one states. Accordingly, gate 224 effectively is a 90 command recognition gate for the buffer storage, 90 conveniently being a number which is chosen for programming the acceleration or deceleration operation.

Thus, in the event that either the output on lead 217 is a binary one or the output on lead 218 is a binary one, a zero output appears on lead 216 and if the preparatory command buffer storage 220 contains a 90 command, a binary zero output appears on lead 225. The further condition required for the enabling of the acceleration selection gate section 213 is that the transfer blocking signal and the blocking during tape reading signal be in their binary zero states, on lead 219 and 209 respectively. Also, a 500 cycle output can only appear on lead 215 if there is a 100+ command in buffer command storage 57, whereby a binary one appears on lead 208. The operation of the acceleration selection gates section is explained in detail hereinbelow.

Working command storage 57 comprises a three digit reversible counter wherein the most significant digit is contained in flip-flop 212, the second most significant digit is contained in decade 211 and the least significant digit is contained in a decade 210. Multiplication gate sections 226, 227 and 228 mix the outputs of the decades of working command storage 57 and pulse rate multiplier counter 55 to provide pulse outputs having frequencies in accordance with chosen numerical commands.

The flip-flops comprising the least significant decade 210 of working command storage 57 are weighted 1, 2, 4 and 8 respectively, the flip-flops comprising decade 211 are weighted 10, 20, 40 and 80 and flip-flop 212 is weighted 100 whereby a working command of 199 is enabled in the working command storage.

It is to be noted that in multiplication gates 56, the outputs of the least significant decade 201 of pulse rate multiplier counter 55 are essentially combined with the outputs of the flip-flops of decade 211 of working command storage 57 and that the outputs of the least significant decade 210 of working command storage 57 are combined in multiplication gates 56 with the outputs of the flip-flops of the most significant decade 202 of pulse rate multiplier counter 55. In gate 226, there are combined the G output of the "1" flip-flop of decade 201 and the signal provided from the output of manual feedrate override 52.

The buffer command storage 59 comprises a least significant decade 229, a ten's decade 230 and a most significant digit flip-flop 231. In decade 229, the flip-flops are respectively weighted 1, 2, 4 and 8, respectively. In decade 230, the flip-flops are respectively weighted 10, 20, 40 and 80 respectively and flip-flop 231 is weighted 100. The buffer command storage has inserted thereinto, the information from the numerical input data equipment stage 21, such information being inserted while the tape upon which the program is contained is moving. After such information is inserted into buffer command storage 59, appropriate control equipment in the system (not shown) effects the halting of the movement of the tape and the transfer of the contents of the buffer command storage into the working command storage.

To effect this transfer, there is generated a transfer blocking signal 232, a transfer reset signal 233 and a transfer signal 234 as shown in FIG. 10. In these waveforms, the bases are at the binary zero level, i.e., +6 volts and the pedestals are at the binary one level, i.e., zero volts. It is seen that the duration of transfer blocking signal TB encompasses the time of occurrence of the transfer reset signal TR and the time of occurrence of the transfer signal, $\overline{TF}$, the $\overline{TF}$ signal occurring at the trailing edge of the transfer reset signal TR and enduring to the trailing edge of the transfer blocking signal TB.

The absence of the transfer blocking TB signal is utilized in the velocity command section of the system as a necessary condition for actuating the programmed automatic acceleration and deceleration. The transfer reset signal TR is applied to the F (electronic reset) inputs of the flip-flops of working command storage 57 to set these flip-flops to the zero state and thereafter the transfer signal TF is utilized to effect the transfer of the contents of buffer command storage 59 to working command storage 57. The latter transfer is effected by the respective outputs of two input gates such as gates generally designated by the numeral 57A. The output of a transfer gate is a binary one when the $\overline{TF}$ signal appears on one of the lead inputs thereinto and the H output of a corresponding flip-flop in buffer command storage 59 is also in the zero state, i.e., the latter flip-flop is in its one state, and appears on the other lead input to the gate. In such situation, the one appearing at the output of the transfer gate, applied to the E (electronic set) input of the corresponding flip-flop in the working command storage switches it to the one state.

Binary coded decimal comparator 58 comprises a unit section 235, a tens section 236 and a 100 section 237. In comparator 58 the settings of the decades of buffer command storage 59 are compared with the setting of the corresponding decades in working command storage 57. Thus, if the value of the setting in buffer command storage 59 exceeds the value of the setting in working command storage 57, then a binary zero appears on lead 238 and at the time that there is a pulse output from inverter 240 on lead 241, i.e., a binary zero, a binary one appears at the output of gate 242 on lead 243.

It is recalled that the output from inverter 240 is a 250 c.p.s. pulse train or a 500 c.p.s. pulse train during the acceleration operation. When there is a pulse train output from inverter 240 and a binary zero on lead 238, working command storage 57 which is connected to function as a reversible counter operates as an up counter. In the event that the value of the setting in buffer command storage 59 is less than the value of the setting in the working command storage 57, then a binary zero appears on lead 239 at the output of the comparator 58 together with the pulse train appearing on lead 241 during the acceleration operation whereby a binary one appears at the output of gate 244 on lead 245 and actuates working command storage 57 to function as a down counter. In both its up and down counting modes, working command storage 57 cycles at a 250 p.p.s. rate.

When the outputs of the comparator show a differences whereby the operation of the working command storage as a reversible counter is effected, such counting proceeds until the settings in buffer command storage 59 and working command storage 57 are the same whereby a binary one appears on leads 238 or 239 respectively to halt the functioning of the working command storage as a counter. Simultaneously, the outputs of inverters 246 and 247 become binary zeros. If at the time that the counting of working command storage 57 has ceased and at that time there are binary zeros on leads 216 and 225 respectively, then a binary one appears at the output of a gate 248 and this binary one in conjunction with the operation of the control equipment in the system and numerical data input equipment stage 21 effects the reinitiation of movement of tape for insertion of the next block of data into buffer storage 59.

The trigger input, i.e., the clock to the working command storage when it functions as a reversible counter is provided from the H output of the 50 flip-flop in decade 206 of the pulse reference counter. The latter output is applied as the trigger input to the "1" flip-flop in the least significant decade, i.e., decade 210 of working command storage 57. However, when working command storage 57 is actuated to function as a reversible counter, it cycles at a rate in accordance with the frequency of the output of inverter 240 since the output from inverter 240 is gated through gates 242 and 244 and is applied on the steering lead to the flip-flops of the working command storage. It is, of course, to be noted that the inputs to the steering leads of these flip-flops appear on leads 249, these inputs being the outputs of inverters 251 and 252 respectively.

*Pulse rate multiplier (FIGS. 6, 7A–7C)*

In FIG. 6, there is shown an arrangement of a single decade of a pulse rate multiplier. It is, of course, to be understood that the pulse rate multiplier may comprise a plurality of decades and one decade has been selected to provide convenience of explanation of operation. In FIGS. 7A–7C, there is shown a timing diagram of the waveforms which occur in the operation of the arrangement of FIG. 6. In this latter connection, the multiplier of FIG. 6 is arranged to function whereby the output thereof provides a pulse train wherein the amount of pulses for a given duration is equal to one half the amount of clock pulses applied to the multiplier.

Referring now to FIG. 6, it is seen that the pulse rate counter portion of the multiplier comprises flip-flops 261, 262, 264, and 265 weighted 1, 2, 4 and 5 respectively.

In the operation of the counter, the clock pulse input is applied on lead 253 which corresponds to lead 82 and thence on leads 261*c*, 261*d* and 264*d*. The steering lead 261*a* has applied thereon the output of an inverter 254, there being applied to inverter 254 the output of a three input gate 255, the inputs to the gate being the G output of flip-flop 261 on line 261*g*, the input gate signal appearing on line 256 and thence on line 257 and the G output of flip-flop 264 appearing on line 264*g*. In this latter connection, the waveform of the clock pulse train and the waveform of the input gate signal train are shown on lines 280 and 281 in FIGS. 7A–7C. The input gate signal may be provided at the output of a device such as manual feedrate override 52.

In lines 280 and 281, it is seen that there are ten input gate pulses to every 20 clock pulses. It is further to be noted that in lines 280 and 281, the base line represents the upper logic level and the pedestal of the pulses represents the lower logic level which as has been explained above have been chosen to be zero volts and +six volts respectively.

The input applied on steering lead 261*b* is the output of an inverter 258, there being applied to inverter 258, the output of a two input gate 259, the latter inputs being the H output of flip-flop 261 on lead 261H and the input gate signal from line 256 which appears on lead 260.

The input on leads 262*c* and 262*d* is provided from the output on line 261*g*. The input on line 264*c* is the output on line 262*g* and the input on line 264*d* is the clock pulse from line 253. The input applied on steering lead 264*b* is the output of an inverter 266 to which there is applied the output of a two input gate 267, the inputs to gate 267 being the output on lead 264*h* and the input gate signal from line 256. The input applied on leads 265*c* and 265*d* is the output on lead 264*g*.

If it is assumed that flip-flops 261, 262, 264 and 265 are all initially in their zero states, then upon the appearance of a binary zero on line 256, i.e., when an input gate pulse appears with flip-flops 261 and 264 both in their zero states, flip-flop 261 is switched to its one state. This can be seen by the examination of line 282 in FIGS. 7A–7C. It is shown therein that at the coincidence of the leading edge of the third clock pulse and the trailing edge of the first input gate signal, flip-flop 261 is switched to its one state. In this latter connection, it is to be noted that the waveforms showing the outputs of the flip-flops in the counter have as their bases the binary zero voltage level and as their pedestals the binary one level which, of course, is the reverse of the voltage levels shown in lines 280 and 281.

With the switching of flip-flop 261 to its one state, a binary one appears on leads 262*c* and 262*d*. Now, upon the coincidence of the trailing edge of the second input gate pulse and the leading edge of the fifth clock pulse, flip-flop 261 is switched back to its zero state whereby the level on leads 262*c* and 262*d* goes from binary one to binary zero, i.e., from zero volts to +6 volts and consequently flip-flop 262 is switched to its set state. Upon the coincidence of the trailing edge of the third input gate pulse and the leading edge of the seventh clock pulse, flip-flop 261 is again switched to its one state. However, since no pulse appears simultaneously on leads 262*c* and 262*d*, flip-flop 262 remains in its one state. Thereafter, at the coincidence of the trailing edge of the fourth input gate pulse and the leading edge of the eighth clock pulse, flip-flop 261 is switched back to its zero state and flip-flop 262 is also switched to its zero state since such switching of flip-flop 261 produces a pulse on leads 262*c* and 262*d*.

At the time that flip-flop 262 is switched to its one state, a binary one appears on lead 264*c*. When flip-flop 262 is switched back to its zero state, a pulse appears on lead 264*c* and flip-flop 264 is consequently switched to its one state at the same time. Upon the coincidence of the trailing edge of the fifth input gate pulse and the leading edge of the tenth clock pulse, flip-flop 261 cannot be switched to its one state because there is a binary one logic level on lead 264*g*. However, since there is a binary zero on lead 264*b* and since a clock pulse is applied on lead 264*d*, flip-flop 264 is switched to its zero state.

At the time that flip-flop 264 is switched to its one state, a binary one appears on leads 265*c* and 265*d*. When flip-flop 264 is switched back to its zero state, a pulse appears on leads 265*c* and 265*d* whereby flip-flop 265 is switched to its one state.

The foregoing cycle now repeats itself for the ensuing five input gate pulses. It is appreciated that upon the coincidence of the trailing edge of the tenth input gate pulse and the twentieth clock pulse flip-flops 264 and 265 are both switched to their respective zero states and the flip-flops of the counter are all in their zero state at this time. Lines 282, 283, 284 and 285 show the waveforms of the G outputs of the flip-flops during the ten input gate pulse cycle.

The H outputs of flip-flops 264 and 265 and the input gate signals on line 256 comprise the inputs to a three input gate 263. At a time when flip-flops 264 and 265 are both in their one state, i.e., when the value of one setting of the counter is nine and upon the coincidence of the leading edges of the twentieth clock pulse and the tenth gate pulse, a binary one appears at the output of gate 263. This binary one input is inverted in inverter 268, the output of inverter 268 being the carry pulse to the next decade of multiplication gates. When the G output of flip-flop 265 goes from one to zero at the trailing edge of the tenth gate pulse, a zero is applied on the *c* and *d* leads of the "1" flip-flop of the next significant decade of the counter and it is switched to its one state. Line 290 in FIGS. 7A–7C shows the waveform of the carry pulse. It is seen that in this waveform, the pedestal and the base are shown according to the upper and lower voltage levels.

In the working command storage portion of the pulse rate multiplier flip-flops 271, 272, 274 and 278 are respectively weighed 1, 2, 4 and 8 and provide one of the decades of the working command storage. In actuality, the working command storage is connected to function as a reversible counter. However, in FIG. 6 only the H output leads are shown for convenience of explanation of operation.

It is, of course, to be realized that if the pulse rate multiplier comprises a plurality of decades such as three, for example, the outputs of the flip-flops comprising the most significant decade of the working command storage are combined with the outputs of the flip-flops comprising the least significant decade in the pulse rate multiplier counter in the multiplication gates and correspondingly to the outputs of the flip-flops of the least significant decade of the working command storage are combined with the outputs of the flip-flops of the most significant decade of the pulse rate multiplier counter in the multiplication gates. Thus, if the pulse rate counter in FIG. 6 is the least significant decade of a pulse rate multiplier, then the working command storage decade shown in FIG. 6 is the most significant decade of the multiplier. Accordingly, if a three decade multiplier is utilized, flip-flops 271, 272, 274 and 278 are weighted 100, 200, 400, and 800. However, for this example, it suffices that there can be assumed a one decade multiplier whereby only a multiplication of a units pulse rate count is affected.

In accordance with the above, let it be assumed that there is a numerical command six in the working command storage, i.e., flip-flops 272 and 274 are in their one states. In this situation, the outputs on leads 272*h* and 274*h* respectively are, of course, binary zeros. Accordingly, there is pulse output on the output summation line 273 in the following alternative co-incidence of conditions: Either flip-flop 261 is in its one state, flip-flop 262 is in its zero state and the gate pulse occurs on line 256 whereby a binary one appears on line 269 or flip-flops 261 and 264 are both in their zero states and the gate pulse appears whereby a binary one appears on line 270. If either of these conditions obtain, then there is a pulse output on output summation line 273. A numerical command, six in the working command storage signifies, of course, that for every ten input gate signals there will appear six pulses on the output summation line. Lines 291–300 in FIGS.7A–7C show the respective waveforms appearing on output summation line 273 for numerical commands zero-nine respectively. It is seen that these waveforms are based on voltage levels and not on binary states. Lines 286–289 show the waveforms appearing on the output summation line for the one states of the individual respective flip-flops in the working command storage. These waveforms also are based upon voltage levels. Inspection of the waveforms of lines 286–289 shows that the waveforms of lines 291–300 are actually different combinations thereof. Thus the waveform for the numerical command, six as shown in line 297 is the combination of the waveforms of lines 287 and 288.

The waveform of line 301 indicates the pulse output appearing on the output summation line from the less significant decades. For example, let it be assumed that a three decade pulse rate multiplier is utilized wherein the pulse rate multiplier counter portion of FIG. 6 is the least significant decade of the counter, i.e., the unit's decade, and the working command storage portion of FIG. 6 is the most significant decade thereof, i.e., the hundred's decade, the counter cycling completely in a thousand counts. Let it be further assumed that the numerical command number is 245 whereby it is intended that 245 pulses appear on output summation line 273 for every one thousand input gate pulses as shown on line 281. In this situation, with regard to the unit's decade of the pulse rate multiplier counter, a pulse will appear on the output summation line at every second and seventh input gate signal as shown in the waveform of line 293. With regard to the ten's decade of the pulse rate multiplier counter, a pulse will appear on output summation line 273 when that decade setting is 10, 30, 60 and 80 which is, of course, in accordance with the waveform of line 298. With regard to the hundred's decade of the pulse rate multiplier counter, the pulse appears on the output summation line when the setting in the hundred's decade of the pulse rate multiplier counter is 100, 300, 500, 600 and 800 which is, of course, in accordance with the waveform of line 296.

It is to be noted from inspection of waveforms shown in lines 291–300 of FIGS. 7A–7C, i.e., the numerical command waveforms, that the pulses therein are relatively symmetrically displaced with respect to each other. This results from the utilization of a binary coded decimal counter and a binary coded decimal working storage command in the pulse rate multiplier wherein the weightings of the respective flip-flops in the pulse rate multiplier counter are different from the weighting of the flip-flops in the working command storage. Particularly, in a counter wherein each decade is of the 1, 2, 4, 5 binary coded decimal type, and in the working command storage wherein each decade is of the 1, 2, 4, 8 binary coded decimal type, there results the generation of pulse trains in accordance with the substantial symmetry provided by the pulse train output of the 1, 2, 4 and 5 flip-flops of the counter during the cycling thereof whereby there is no undesirable bunching of pulses in the actual numerical command pulse train. If pulse rate multiplier counter 55 were chosen to be of the 1, 2, 4, 8 type, the same as the working command storage 57, then the situation would occur where there would be a pulse from the "1" flip-flop of the counter at every other input gate pulse; where there would be a pulse ouput from the "2" flip-flop at the second, third, sixth and seventh gate pulses; where there would be a single output from the "4" flip-flop which would last from the fourth through the seventh gate pulse; and where the "8" flip-flop would be in its one state for the eighth and ninth pulse.

With reference to the pulse rate multiplier of the velocity command, it has been shown how the selection of a 1, 2, 4, 5 weighting for the pulse rate multiplier counter flip-flops and the selection of a 1, 2, 4, 8 weighting for the working command storage flip-flops provide relatively evenly spaced pulse trains on the output summation line, the latter being the pulse trains representing the numerical comamnds. Also, the above weightings require a minimum of pulse multiplication gates to produce a relatively uniform pattern of pulses in the trains.

It has been found, that there is an advantage in utilizing a multiplier counter code which is different from the working command storage codes. Thus, in FIGS. 8A–8D, there are shown the waveform outputs of flip-flops in other type weightings of the pulse rate multiplier.

In FIGS. 8A–8D, lines 302 and 303 indicate a clock pulse train and a gate pulse train respectively with which the outputs of the elements of the multipliers are synchronized. The clock and gate pulse trains are shown in voltages. The flip-flop and gate multiplication gate outputs are shown in binary weighting, i.e., one and zero.

In FIGS. 8A-8D, lines 304–307 show the states of the flip-flops in a pulse rate multiplier counter wherein the flip-flops of each decade are weighted 1, 2, 4 and 8 respectively. Lines 308–311 show the patterns of pulses for an eight, a four, a two and a one command wherein there is utilized a 1, 2, 4, 8 counter and a 1, 2, 4, 8 working command storage. Line 312 shows the waveform of the carry pulse in this type multiplier.

Lines 313–316 show the patterns of pulses for a five, a four, a two and a one command respectively when a 1, 2, 4, 8 counter is utilized with a 1, 2, 4, 5 working command storage. Line 317 shows the carry pulse in this type multiplier.

Lines 318–321 show the patterns of pulses for a five, a two, a one and a one command respectively when a 1, 2, 4, 8 counter is utilized with a 5, 2, 1, 1 working command storage. Line 322 shows the carry pulse in this type multiplier.

Lines 323–326 show the patterns of pulses for a seven, a four, a two and one command respectively when a 1, 2, 4, 8 counter is utilized with a 7, 4, 2, 1 working command storage. Line 327 shows the carry pulse in this type multiplier.

Lines 328–331 show the waveforms of the flip-flop in a 1, 1, 2, 5 counter. Lines 332–336 show the patterns of pulses for an eight, a four, a two, and a one command when a 1, 1, 2, 5 counter is utilized with a 1, 2, 4, 8 working command storage. Line 336 shows the carry pulse in this type multiplier.

Lines 337–341 show the patterns of pulses for a five command, a four command, a two command and a one command when a 1, 1, 2, 5 counter is utilized with a 1, 2, 4, 5 storage command. Line 341 is the waveform of the carry pulse for this type multiplier.

Lines 342–346 show the patterns of pulses for a five command, a two command, a one command and a one command respectively when a 1, 1, 2, 5 counter is utilized with a 1, 1, 2, 5 working storage command. Line 346 shows the carry pulse for this type multiplier.

Lines 347–351 show the patterns of pulses for a seven command, a four command, a two command and a one command when a 1, 1, 2, 5 counter is utilized with a 1, 2, 4, 7 working command storage. Line 351 shows the carry pulse for this type multiplier.

Lines 352–356 show the patterns of pulses for a five command, a four command, and a one command when a 1, 2, 4, 5 counter is utilized with 1, 2, 4, 5 working command storage. Line 356 is the carry pulse for this type multiplier.

Lines 357–361 show the patterns or pulses for a five command, a two command, a one command and a one command respectively when a 1, 2, 4, 5 counter is utilized with a 1, 1, 2, 5 working command storage. Line 361 shows the carry pulse in this type multiplier.

Lines 362–366 show the pattern of pulses for a seven command, a four command, a two command and a one command respectively when a 1, 2, 4, 5 counter is utilized with a 1, 2, 4, 7 working command storage. Line 366 shows the carry pulse in this type multiplier.

*Buffer storage command and transfer of information thereinto*

In FIG. 9, decades 367, 368 and 369 and flip-flop 370 comprises a buffer storage command wherein a numerical command of 1,999 may be inserted, flip-flop 370 containing the most significant digit. This command is inserted when the tape on which the program is contained is in movement in the numerical input data equipment stage. The information from the tape is chosen to appear in binary zero logic levels.

When tape movement is initiated, there is first generated the buffer address signal which appears on line 371 and which selects the particular buffer for which the information is intended. Next, there is generated on line 372, a 000 signal which is gated together with the signal on line 371 to provide a binary one, the latter being applied to the electronic reset inputs (F inputs) of the flip-flops comprising the buffer command storage whereby the buffer is reset to the zero state. The binary numerical information, viz., 8, 4, 2 and 1 appears on leads 373, 374, 375 and 376 respectively, the latter being the settings for the 8, 4, 2 and 1 flip-flops of each decade of the addressed buffer. The line and read's signals select the decade of the addressed buffer and are generated on leads 377, 378, 379 and 380 respectively.

FIG. 11 simply shows the operation of the transfer of information into one decade of the working command storage. For convenience decade 369 of FIG. 9 is chosen for illustration. It is seen in FIG. 11, that there is applied to all the electronic reset (F) inputs of the flip-flops, the output of a gate 381, the inputs to which are the 000 signal on line 372 and the address signal on line 371 to reset the flip-flops to the zero state. Applied to the electronic set (E) inputs of the flip-flops are the outputs of the three-input gates 382, 383, 384 and 385 respectively, the input to each gate being the numerical information, the address signal on line 371 which selects the buffer and the line and read signal on line 377 which selects the particular decade or digit of the selected buffer. Thus, if it is intended to insert a numerical command, six in buffer command storage decade 369, then a zero signal appears on lines 375 and 374. These signals respectively in coincidence with the line and read signal on line 377 and the address signal on line 371 effects binary one outputs from gates 383 and 384 to set flip-flops 392 and 394 to their one states.

With regard to transfer from the buffer command storage to the working command storage, the reset, i.e., the H outputs of the buffer command storage flip-flops are utilized.

Normally, to transfer the contents from the buffer command storage to the working command storage, it is necessary to first halt movement of the tape since it is desired not to affect the setting of the buffer command storage during such transfer. Coincident with the halting of the tape and the counting down of the X and Y axes counters to zero, provision is made in the system of this invention for producing three signals, viz., a transfer blocking signal, a transfer reset signal and a transfer signal. These signals are shown on lines 232, 233 and 234 respectively in FIG. 10. The transfer blocking signal TB encompasses the times of the transfer reset signal, TR, and transfer signal $\overline{TF}$, the transfer reset signal TR being generated prior to the generation of the transfer signal, $\overline{TF}$. Actually, the transfer blocking signal is utilized in the acceleration selection gates to prevent the effecting of an acceleration operation during a transfer and is further explained hereinbelow.

The transfer reset signal is applied to the electronic reset, (F), inputs of the flip-flops comprising the working command storage whereby they are all switched to the zero state. Then upon the coincidence of an H output from a buffer command storage flip-flop which is at a zero level and the transfer signal $\overline{TF}$ which is also at a binary zero level, a particular transfer gate is enabled to set a corresponding flip-flop in the working command storage to the one state. Thus in FIG. 9, if flip-flop 370 has a one command therein, then a binary one appears at the output of gate 389 when $\overline{TF}$ is generated and flip-flop 390 in the working command storage is switched to its one state.

*Automatic acceleration and deceleration*
*(FIGS. 5A–5E, FIGS. 12 and 13)*

It has been stated hereinabove, that it is quite often desirable to change the velocity upwardly or downwardly at the end of the cut or immediately at the beginning of a new cut when the two successive cuts are programmed for widely different velocities. To effect such velocity changing and to provide a smooth and gradual velocity transition, there is provided the automatic acceleration and deceleration arrangement.

Such arrangement comprises the binary coded decimal comparator 58 shown in FIG. 2, FIGS. 5A–5E and FIG. 12, the acceleration selection gates 213 of FIGS. 5A–5E and the arranging of working command storage 57 to function as a reversible counter, FIG. 13.

The acceleration and deceleration is controlled by the preparatory command in buffer storage 220, FIGS. 5A–5E. In this operation, gate 224 detects the presence of an 80 and a 10 in the 80 and 10 flip-flops of decade 221 to enable the recognizing that the preparatory command is in the ninth decade. The output at gate 224 is inverted in inverter 223 and fed to the circuits which control the change in the working command storage during acceleration and deceleration. The value of the second digit of the preparatory command in buffer storage 220 is compared with the count in the 0.1 inch decades of the X and Y axes distance counters 42 and 42′, i.e., the second most significant decades of these counters respectively, such comparison being accomplished in comparators 393 and 395 respectively. The significance of the latter comparison is to accomplish the acceleration or deceleration operation as is required when the distance to be traveled is at least no greater than one inch. The comparators are so arranged that there is a positive or binary zero output voltage therefrom whenever the distance in the distance counters exceeds the distance specified by the second digit of the preparatory command, i.e., the values of the setting in decade 222. Gates 396 and 398 are zero recognition circuits for the X and Y axes counters. Outputs are taken from the zero recognition circuits of the one inch decades of the distance counters and applied to comparators 393 and 395 respectively to detect distances in excess of one inch. The outputs of comparators 393 and 395 are inverted in inverters 397 and 399 respectively, the outputs of inverters 397 and 399 being applied as inputs to a gate 100, the outputs of gate 100 on line 217 being a binary one whenever the distances on both the X and Y axes are less than the distance specified by the second digit of the preparatory command, i.e., the setting in decade 222. A four-input gate 101 is connected to the G outputs of the four flip-flops of decade 222 of the preparatory command to detect the condition of four G output zeros, such four G output zeros corresponding to a 90 command.

Whenever the preparatory command for programmed automatic acceleration has a zero as the second digit or both X and Y axes distance counters have counted down to a magnitude which is equal or less than that of the second digit of the preparatory command, then the programmed automatic acceleration functions to initiate the changing of the working command storage number in the velocity command. This is seen since when either lead 217 or 218 is a binary one, a zero appears on lead 216.

It is to be understood that at the end of the normal data block, when the axes distance counters are at zero, there is a transfer of data from the buffer command storage to the working command storage via the transfer gates as has been previously described. However, when there is a programmed automatic acceleration, it is necessary for the working command storage to change at a rate with respect to time which produces accelerations which the control and the system can follow. Accordingly, during acceleration, the working command storage reversible counter is chosen to count toward the setting in the buffer command storage at a suitable counting rate such as 250 c.p.s., this counting rate being equivalent to an acceleration rate of 250 inches per minute per second of the number which is represented by the working command storage.

In comparator 58, the 100's decade thereof is connected to the 100's decades of the working command storage and the buffer command storage and the other decades of the comparator are respectively connected to the corresponding decades of the two storages of like significance. The comparator which compares the setting in the 100's decades of the storages has precedence over any difference in the less significant decades. This precedence is exercised by means of the output lead of the comparator of the most significant decade thereof which is applied as an input to the next most significant decade of the comparator. The output of a comparator which is utilized in the acceleration operation is provided at the output of the least significant decade thereof, to be inserted at the proper place.

It has been explained hereinabove that at the time that a block of data is loaded into the buffer from tape, tape movement is halted and the transfer cycle is undergone. It has also been stated that for the transfer signals, viz., the transfer blocking, the transfer reset and the transfer signals to be generated, the X and Y axes counters have to be in their zero states respectively. However, in the situation where there is programmed automatic acceleration, although, tape movement is also halted during the acceleration operation, the transfer signals are not generated since the X and Y axes counters are not in the zero state. For this reason, a binary zero appears on lead 209 during the acceleration and deceleration operation. A binary zero appears on lead 219 since the output on lead 219 in a binary one during tape movement and changes to a binary zero when tape movement is halted.

In FIG. 12 wherein there is shown a binary coded decimal comparator, let it be assumed that the comparator shown therein is utilized to compare the command setting in the middle decade of a three decade working command storage with the setting in the middle decade of a corresponding three decade buffer command storage. Let it be assumed that the inputs in the top of the drawing are from the G and H outputs of flip-flops in the working command storage decade and the inputs at the bottom of the drawing are from the set and reset outputs of the middle decade of the buffer command storage. In the arrangement of this figure, the working command storage inputs are respectively the G and H outputs of the "1," "2," "4," and "8" flip-flops. The inputs at the bottom of the drawing are the corresponding G and H outputs of the respective "1," "2," "4" and "8" flip-flops of the buffer command storage decade. For convenience of explanation, the working command flip-flops will be designated by the letter A, and the buffer command flip-flops will be designated by the letter B. It is seen that the A8 G output and the B8 H output are applied as inputs to a gate 103 and the A8 H output and the B8 G output are applied as inputs to a gate 104. The output of gate 103 is applied as an input to gate 106 and is also applied as an input to gate 107. The output of gate 104 is applied as an input to a gate 105 and is also applied as an input to a gate 108.

Also applied as inputs to gate 105 are the A4 G output and the B4 H output. Also applied as inputs to gate 106 are the A4 H output and the B4 G output. Thus, if A8 in its one state and B8 in its zero state, then disregarding the results of the comparison of the immediately preceding decades, a one appears on lead 109 and a zero appears on lead 110 whereby the output of gate 108 has to be a zero.

The output of gate 105 is applied as an input to gate 107 and the output of gate 106 is applied as an input to gate 108. Also applied as inputs to gate 105 are the H output of B4 and the G output of A4 and also applied as inputs to gate 106 are the H output of A4 and the G output of B4. Thus, if it is assumed that both A8 and B8 are both in their zero states and that A4 is in its one state but that B4 is also in its zero state, in such situation, the level on lead 111 is a binary zero, the level on lead 112 is a binary one whereby the output on lead 110 again is a zero.

Similarly, there are applied as inputs to a gate 113, the H output of B2, the G output of A2, the output from gate 106 and the output from gate 104. There are applied as inputs to a gate 114, the G output of B2, the H output of A2, the output of gate 103 and the output of gate 105.

With regard to gates 115 and 116, to gate 115 there are applied as inputs, the G output of A1, the H output of B1, the output of gate 114, the output of gate 106 and the output of gate 104. There are applied as inputs to gate 116, the H output of A1, the G output of B1, the output of gate 113, the output of gate 111, and the output of gate 103.

Examination of the above shows that the comparator functions to compare the setting in the A8 flip-flop with the setting in the B8 flip-flop, the setting in the A4 flip-flop with the result of the comparison between the 8 flip-flops and the setting in the B4 flip-flop, the setting in the A2 flip-flop with the setting in the B2 flip-flop and the results of the respective comparisons between settings in the 8 and 4 flip-flops and the setting in the A1 flip-flop with the setting in the B1 flip-flop together with the results of the comparisons of the interrelated settings in the other flip-flops.

If only the setting in a single decade of the working command storage is compared with the setting of a corresponding decade in the buffer command storage, then the outputs of gates 107 and 108 would indicate which setting had the greater value, i.e., the buffer command or the working command storage. Thus, in the event that the setting in the A decade is greater than the setting in the B decade, then the output of gate 108 is a binary zero and the output of gate 107 is a binary one.

However, let it be assumed that there is a more significant decade in each storage. In the event that the setting in such more significant B decade exceeds the value in the setting in the corresponding more significant A decade, then a binary zero appears as an input to inverter 117 and a binary 1 appears as an input to inverted 118. Accordingly, the output of inverter 118 which is a binary zero is applied as an input to gate 122 and as input to gate 119 and the output of inverter 117 which is a binary one is applied as an input to gate 121 and as an input to gate 120. Since the output of inverter 117 is a binary one, then, of necessity the output of gates 120 and 121 are binary zeros respectively. Also, since the output of inverter 118 is a binary zero, a binary one appears at the output of gate 122. It is thus seen that with the comparator of FIG. 12, the outputs appearing in each decade constitute the result of the comparison of the total settings of all the decades in each storage up to that point. Consequently, the output of the comparator for the least significant decade is a resultant of the comparison of the settings of the all corresponding decades.

It has been shown how the outputs of inverters 117 and 118 serve to control the ouputs of gates 121 and 122 provided that the inputs to inverters 117 and 118 are different. If it is assumed that the inputs to inverters 117 and 118 are the same, then, of course, the comparison between the particular corresponding decades of both storages determine the respective logic levels of the outputs of gates 121 and 122. Thus, if in FIG. 12, the inputs to inverters 117 and 118 are both binary ones, which indicate that the settings in the immediately preceding corresponding decades are of equal value and if it is further assumed that the A8 flip-flop is in its one state and the B8 flip-flop is in its zero state, then, the output of gate 122 is a binary zero as has been shown and the output of gate 121 is a binary one. It is to be realized that the comparator is always comparing the value of setting of the working command storage with the value setting of the buffer command storage. The effecting of a changing of the setting in the working command storage to match the setting in the buffer command storage, however, is not accomplished unless the program on the tape in the numerical data input equipment calls for the change.

Referring back now to FIGS. 5A–5E, there is shown therein how the operation of the acceleration and deceleration arrangement functions to change the setting in the working command storage to match that in the buffer command storage.

In FIGS. 5A–5E, it is seen that the output of inverter 251 is a binary zero provided that the output of inverter 240 is a binary zero and the setting in the buffer command storage exceeds the setting in the working command storage whereby a binary zero appears on lead 249. The output of inverter 252 is a binary zero provided that the output of inverter 240 is a binary zero and the value of the setting in the working command storage exceeds the value in the setting in the buffer command storage as evidenced by the appearance of a binary zero on lead 239.

A binary zero appears at the output of inverter 240 provided that the one flip-flop of the hundreds' decade 207 of reference counter 204 is in its one state; provided that the transfer blocking signal and a blocking during tape reading signal are not generated whereby binary zeros appear on leads 219 and 209; provided that the least significant decade 222 of the preparatory command buffer storage is in the zero state or that the second most significant digits in the X-axis and Y-axis distance counters 42 and 42' have counted down to a value respectively which is equal to or less than the setting in decade 222; provided that decade 220 has a setting of 90 and provided that either the 200 and the 500 flip-flop of decade 207 of reference counter 204 are both in their one states or that the 200 flip-flop in decade 207 is in its one state and the 100 flip-flop 212 in the working command storage is in its one state as evidenced by binary zeros on leads 126 and 127.

The significance of the above conditions is as follows: In accordance with the waveforms of a 1, 2, 4, 5 binary coded decimal counter, the 100 flip-flop in reference counter 204 provides an output having a pulse repetition frequency of 1 kc. The significance of the concurrent gating of the H output states of the 200 and 500 flip-flops is to provide a pulse train having a pulse repetition frequency of 250 c.p.s. on lead 214. The significance of having the concurrent H outputs of the 200 flip-flop in the reference counter and the H output of the 100 flip-flop in the working command storage is to provide a pulse train on lead 208 which has a pulse repetition frequency of 500 p.p.s. provided there is a numerical command, 100, in the working command storage. The significance of having a concurrence of the absence of the transfer blocking signal, $\overline{TB}$ and the absence of the tape reading blocking signal is to insure that no acceleration or deceleration can occur during a tape reading or during a transfer. The significance of having the comparisons of the second digit of the preparatory command and the second digit of the X and Y axes distance counters is to control the point at which acceleration or deceleration can commence.

When the conditions are met for providing a pulse train of 250 or 500 p.p.s. at the output of inverter 240 and if the comparator shows a difference in the value of the setting of the buffer command storage as compared to the value of the setting of the working command storage, then the working command storage flip-flops are actuated to count in either the up or down direction depending upon whether the buffer command storage setting exceeds the value of the setting of the working command storage or vice versa.

In FIG. 13, there is shown the actual connections of the flip-flops of a decade of the working command storage to function as a reversible counter. The flip-flops therein are given the same designating numerals as the flip-flops comprising the decade of the working command storage shown in FIG. 6.

It is seen in FIG. 13 that the H output of the "50" flip-flop in decade 206 of the reference counter 204 is applied as the *c* and *d* and *c'* and *d'* inputs to the "1" flip-flop of the least significant decade of the working command storage. If it is assumed that the setting of the buffer command storage has a value that is greater than that of the working command storage then the output of inverter 251 is zero provided all the conditions as outlined above in the description of the acceleration and deceleration operation are met. In such situations, the working command storage functions as an up-counter.

Thus, taking flip-flop 271 to be the "1" flip-flop of the least significant decade of the working command storage, there is applied to clock leads **271*c* and 271*d*, the pulses produced at the output of the "50" flip-flop in the reference counter, such output having a pulse repetition frequency of 2,500 p.p.s. Applied to gate 130 is the output of inverter 251 which is a 250 p.p.s. pulse train and also applied to gate 130 is the G output of flip-flop 271. Applied to gate 132 is the output of inverter 252 and the H output of flip-flop 271. Thus, if flip-flop 271 is in its zero state, then upon the appearance of the clock pulse on leads 271*c* and 271*d* from the "50" flip-flop in reference counter 204, flip-flop 271 is switched to its one state. With flip-flop 271 in its one state, thereafter, upon the appearance of a binary zone output on steering lead 271*b* and with the coincident occurrence of a clock pulse on leads 271*c* and 271*d*, flip-flop 271** is switched to its zero state. The pulses for the *c* and *d* leads in flip-flops 272 and 274, are accordingly provided with the G output of the immediately preceding flip-flop goes from the binary one to binary zero state.

When flip-flop 271 makes the transition from the one to the zero state and when the output of gate 272K is a binary one whereby a binary zero appears at the output of inverter 272I, flip-flop 272 is switched to the one state. To provide a binary one to the output of gate 272K, flip-flops 272 and 278 have to be in the zero state, and the output of inverter 251 appearing on lead 249 has to be a binary zero. Similarly, when flip-flop 271 is switched from the one to zero state and with flip-flop 272 in the one state, a binary one output from gate 272M consequently provides a binary zero output from inverter 272N on steering lead **272*b* to switch flip-flop 272** to the zero state.

Upon the coincidence of the transition of flip-flop 272 from the one to the zero state and a binary one output from a gate 274K with a consequent zero output from an inverter 274I appearing on steering lead **274*a*, flip-flop 274 is switched to the one state. A binary one output is provided from gate 274K when flip-flop 274 is in the zero state and a binary zero appears on lead 249. Upon the coincidence of the transition of flip-flop 272 from the one to the zero state and a binary zero output from inverter 274N on lead 274*b*, flip-flop 274 is switched to the zero state. A binary zero is provided from inverter 274N when the input on lead 249 to gate 274M is a binary zero and flip-flop 274** is in the one state.

Upon the coincidence of the transitions of flip-flops 271 and 274 from the one to the zero states, a binary zero level on steering lead **278*a* and a binary one level on steering lead 278*b* and with flip-flop 278 in the zero state, flip-flop 278 is switched to the one state. A binary zero level appears on steering lead 278*a* upon the coincidence of a binary zero on lead 249 and a binary zero on lead 278*g*, these being inputs to a gate 278K. A binary one also appears on lead 278*b* when a binary one exists on the 278*h* lead input to a gate 278M. Similarly, upon the coincidence of the one to zero transitions of flip-flop 271, the appearance of a binary zero on lead 278*b*, the one state of flip-flop 278 (a binary one is present on lead 278*g* and a binary zero is present on lead 278*h*), flip-flop 278** is switched to the zero state.

In operation, assuming that flip-flops 271, 272, 274 and 278 are all initially in the zero state, the counter cycles in the ordinary mode of operation until flip-flops 271, 272 and 274 are all in the one state whereby the decimal digits one to seven are sequentially provided. At the eighth pulse appearing at leads **271*c* and 271*d* flip-flops 271, 272 and 274 are switched to the zero state and flip-flops 278 is switched to the one state due to the coincident one to zero transitions of flip-flops 271 and 274. The ninth pulse appearing at leads 271*c* and 271*d* switches flip-flop 271 to the one state. Flip-flops 272 and 274 remain in the zero state and flip-flop 278 remains in the one state since the coincidence of conditions required to switch it to the zero state are not present. At the appearance of the tenth pulse on leads 271*c* and 271*d*, flip-flop 271 is switched to the zero state. Flip-flop 272 remains in the zero state since the level on steering lead 272*a* is a binary one as flip-flop 278 is in the one state at this time. Flip-flop 274 remains in the zero state due to the absence of pulses on leads 274*a* or 274*b*. However, flip-flop 278 is switched to the zero state due to the presence of a pulse on lead 278*d* (the one to zero transition of flip-flop 271) and a binary zero level on lead 278*b*. In this manner, the decade comprising flip-flops 271, 272, 273 and 274 counts in the binary coded decimal mode in the up direction, cycling at every ten counts. It is to be noted that a transition from the one to the zero state of flip-flop 278** occurs when the count in the decade goes to zero at the tenth pulse. The pulse consequently produced thereby is the carry pulse for the least significant flip-flop in the next most significant decade, etc.

In the event that the value of the setting in the working command storage exceeds the value in the buffer command storage when the working command storage functions as a down-counter.

Thus, for example, if flip-flops 272 and 274 are in their zero states whereby the values in the decade is nine, the appearance of the count-down gate pulse will cause a binary zero to appear on lead 271*b'*. With the appearnce of a binary zero on lead 271*b'* and a clock pulse on leads 271*c'* and 271*d'*, flip-flop 271 is then switched from its one to its zero state, the states in the other flip-flops not changing to provide an eight setting in the decade.

With only flip-flop 278 in its one state, upon the appearance of the next countdown gate pulse on lead 250 whereby a binary zero appears at the output of inverter 136, flip-flop 271 is switched to its one state, the transition of the 271 H output from a binary one to a binary zero providing pulses at the *c'* and *d'* inputs of flip-flops 272 and 278 respectively. Since flip-flop 278 is in its one state, the output of gate 138 is a binary zero. With the appearance of the input gate signal on line 250, the output of gate 140 is accordingly a binary one, the output of inverter 139 is a binary zero and consequently flip-flop 272 is switched to its one state. The transition of the 272 H output from a binary one to a binary zero provides a pulse at the *c'* and *d'* inputs of flip-flop 274 whereby the appearance of the binary zero on lead 274*a'* switches flip-flop 274 to its one state. Simultaneously, a binary one appears on lead 278*b'* and flip-flop 278 is switched to its zero state. Thus, the setting of the counter is now seven.

When the flip-flops comprising the decade are all in their zero states, upon the application of the clock pulse on leads 271*c'* and 271*d'*, flip-flop 271 is switched to its one state whereby a pulse appears at leads 272*c'* and 272*d'*. Flip-flop 272 is not switched to its one state at this time because flip-flop 278 is in its zero state and the output of gate 138 is a binary one whereby the output of inverter 139 is, in turn, a binary one. Flip-flop 274 is not switched to its one state since no clock pulse is provided on leads 274*c'* and 274*d'*. However, flip-flop 278 is switched to its one state since the binary one output of gate 138 is inverted in inverter 137 whereby a binary zero appears on lead 278*a*. At the time that flip-flop 278 is switched to its one state, the transition of the 278 H output from the one to the zero state provides the pulse for the *c'* and *d'* inputs for the least significant flip-flop of the next most significant decade. In this latter connection, since flip-flop 278 is switched to its one state when a count goes from zero to nine in the decade and is then switched to its zero state when a count goes from eight to seven, the only time that a pulse is provided from the H output of flip-flop 278 is when the count in the decades goes from zero to nine, such pulse being the carry pulse for the least significant flip-flop in the next most significant decade.

*Manual feedrate override* (*FIGS. 14 and 15*)

In FIG. 14, there is shown an arrangement suitable for use as manual feedrate override stage 52. In this arrangement, the output of the pulse rate divider 30 (the output of the "4" flip-flop in decade 205, FIGS. 5A–5E) is applied as the clock pulse to the least significant flip-flop 151 in a four-stage scale of sixteen binary counter comprising flip-flops 151, 152, 154 and 158. This counter counts the clock pulses applied to trigger leads 151*c* and 151*d*, the transitions from a binary one to a binary zero at the G outputs of the flip-flops providing the *c* and *d* inputs for the next succeeding flip-flop.

It is to be noted that there is applied to the electronic set (E) input of flip-flop 151, the output of a four input gate, the inputs to gate 153, being the G outputs of the flip-flops. Accordingly, when the sixteenth clock pulse of a cycle is applied to leads 151*c* and 151*d* momentarily, all of the flip-flops of the counter are switched to their zero states, in accordance with normal operation of the counter. However, when inputs to gate 153 all coincidentally become binary zero, then a binary one appears on electronic set input lead 151*e* and flip-flop 151 is switched to its one state.

Accordingly, with the arrangement of the counter of this FIG. 14, the counter is made to cycle every 15 counts. As will be shown hereinbelow, since the manual feedrate override switch can conveniently be constructed to provide 150 percent of a chosen 100 percent system operation velocity, a fifteen count cycling of the counter of FIG. 14 provides a convenient numerical relationship with such percentages.

The feedrate override switch 159 component of the manual feedrate override comprises the series of four mechanically connected contact arms which are adapted to selectively make contact with contacts arranged in rows, the rows indicating a percentage velocity. It is seen that there are 16 rows, each row being a multiple of 10 percent whereby the rows range from zero percent to 150 percent. The 100 percent row can be chosen to be the normal desired rate of operation and accordingly, the manual feedrate override can be set whereby the contact arms make contact with the contacts on 100 percent row.

It is seen that if the contacts are moved to the 100 percent row then a six volt, i.e., a binary zero appears on lead 60 and a binary zero also appears on lead 161. These leads are inputs to gates 170 and 172 respectively. It is noted that the contacts for providing binary zero outputs on leads 160 and 161 are on columns 2 and 8 of the override switch. Since there are no contacts in columns 1 and 4 at the 100 percent row there is a zero volt output on leads 162 and 163, i.e., binary ones respectively.

When the contacts arms are at the 100 percent row, if flip-flops 151 and 152 are in their zero states, and flip-flop 154 is in its one state, the output of gate 170 is a binary one whereby the output of gate 174 is a binary zero. Similarly, when the contact arm is at the 100 percent row, if flip-flop 151 is in its one state, the output of gate 172 is a binary one whereby the output of gate 174 is a binary zero. This may be readily understood if columns 1, 2, 4 and 8 of the override switch are considered to correspond to a static four scale of sixteen binary counter wherein column 1 has the weight of one, column 2 has the weight of two, column 4 has the weight of four, and column 8 has the weight of eight. Accordingly, when the contact arms are placed at the 100 percent row, effectively, a storage command of 10 is provided. Since, ten is two-thirds of 15, the amount of pulses of a cycle, the contact arms are placed at the 100 percent row, for every 15 clock pulses applied to leads 151*c* and 151*d* of flip-flop 151, ten pulses will appear at the output of gate 174.

In FIG. 15, line 181 shows the waveform of the clock, lines 182–185 show the binary output waveforms produced at the G outputs of flip-flops 151, 152, 154 and 158 respectively during a cycle of fifteen clock pulses. Line 186 shows the output of gate 174 when the contact arms of switch 159 are at the 80 percent row. Line 187 shows the output at gate 174, when the contact arms are at the 40 percent row. Line 188 shows the output of gate 174 when the contact arms are at the 20 percent row and line 189 shows the output of gate 174 when the contact arms are at the 10 percent row. In this latter connection, it is noted in switch 159 that at the 10 percent row, a contact only appears at column 1, at the 20 percent row a contact only appears at column 2, in the 40 percent row, a contact only appears in column 4 and at the 80 percent row, a contact arm only appears in column 4. Thus, lines 186–189 show the respective outputs of gate 174 which are produced when only a single column is gated together with the outputs of the counter comprising flip-flops 151, 152, 154 and 158. Accordingly, any percentage figure other than 10, 20, 40 and 80 percents respectively are provided by the corresponding combinations of the waveforms of lines 186–189.

It has been shown above that when the contact arms of feedrate override switch 159 are at the 100 percent row, actually the pulse train that is gated out by gate 174 for a given interval contains only two-thirds the number of clock pulses applied as the *c* and *d* inputs to flip-flop 151 for such given interval. In ordinary operation of the system of this invention, the frequency of the pulses appearing at the output of gate 174 when the contact arms of switch 159 are at the 100 percent row can be chosen to be the desired velocity and the pulses in the pulse train produced from gate 174 are the input gate pulse for the pulse rate multiplier in the velocity command. It is recalled that in the pulse rate multiplier the numerical command frequency, i.e., the frequency appearing on the output summation line of the pulse rate multiplier is a fraction of the input gate signal. For example, a numerical command, 600, signifies that for every thousand input gate pulses to the pulse rate multiplier, i.e., every thousand pulses appearing at the output of gate 174 in override 52, 600 pulses appear on the output summation line of the pulse rate multiplier. Thus, the numerical command is a ratio, viz., the ratio of the number of pulses for a given interval on the output summation line of the pulse rate multiplier to the number of pulses at the output of gate 174. Since this is such a ratio, the increasing or decreasing of the pulse repetition frequency at the output of gate 174 thus correspondingly increase or decrease the output on the summation line of the pulse rate multiplier in accordance with the chosen ratio. Thus, manual feedrate override switch 159 permits the increasing of the frequency of the input gate signal to the pulse rate multiplier of the velocity command from the chosen 100 percent rate by a factor of one and one-half and permits decreasing the rate down to zero. This is, of course, readily appreciated when it is seen that if the contact arms are placed, for example, at the 150 percent row, then for each complete cycle of the counter comprising flip-flops 151, 152, 154 and 158 fifteen pulses appear at the output of gate 174. Similarly, the selection of any row other than the 100 percent row increases or decreases the output frequency of gate 174 in multiples of 10 percent from the 100 percent output frequency. Of course, when the contact arms are at the zero row, a binary zero cannot appear at the output of gate 174 and consequently there is no output from the manual feedrate override. Consequently, there is no output from the velocity command and the function generator. Because of this, the command phase counter does not receive velocity command pulses. With this arrangement, therefore, as explained hereinabove, the entire control system can be halted by setting switch 159 to zero and thereafter can be restarted by setting switch 159 at any row other than the zero row.

FUNCTION GENERATOR, DETAIL

Before describing the detailed logic of the function generator circuitry, it is worthwhile to reconsider the purpose that the function generator serves within the framework of the entire control section.

As discussed hereinbefore, the velocity command 29 operates responsive to a command input from the numerical input data equipment 21 and control pulses from the manual feed rate over-ride 52 to yield a velocity command signal on lead 36 consisting of a plurality of pulses and having a frequency commensurate with the velocity of a desired cut. Basically, as shown in FIG. 2, the velocity command 29 comprises a pulse rate multiplier 54 having pulse rate multiplication counter 55, which counts the input pulses coming from the manual feed rate over-ride 52; working command storage 57, which stores the command data supplied by numerical data input equipment 21; and multiplication gates 56, which develop the velocity command signal on lead 36 under the control of PRM counter 55 and working command storage 57.

Function generator 37 operates responsive to the velocity command signal from velocity command 29 to deliver command signals consisting of pulses having a frequency commensurate with the velocity of the X and Y motion required to develop the desired velocity of cut along a particular contour. In other words, function generator 37 delivers output signals representative of the X and Y components of the command velocity. Of course, the instant disclosure concerns itself only with motion in a single plane and extension of the teachings herein to three-dimensional motion may be performed by one with normal skill in the art.

In general, development of component velocities for ultimate control of the X-axis and Y-axis feed mechanisms is accomplished by multiplying the command velocity signal on lead 36 from velocity command 29 by a number commensurate with either the direction sine or the direction cosine of the instantaneous slope of the cut. For a straight line, these multipliers are constant because the slope is constant, whereas for a circular contour, the multipliers continuously vary because the slope varies continuously. From the standpoint of the multiplication operation performed, function generator 37 comprises two pulse rate multipliers similar to the type considered in conjunction with velocity command 29. A detailed logic drawing of the elements in function generator 37 is presented in FIGS. 16 through 20 when taken as shown in the sheet layout of FIG. 20A.

The function generator 37, as shown in FIGS. 16 through 20, consists of two pulse rate multipliers both functioning from a single pulse rate multiplier counter 404 whose input is the command velocity on lead 36 from velocity command 29. The working command storage registers for these pulse rate multipliers are in the form of a count-up counter 402 and a count-down counter 406. As in the case of the velocity command PRM 54, buffer storage registers 401 and 407 are provided between the numerical data input equipment 21 and command storage registers 402 and 406 respectively.

PRM counter 404 contains five binary-coded-decimal decades 410–414 arranged to register a maximum decimal count of 99,999 in response to input pulses from velocity command 29 on lead 36. Each decade of PRM counter 404 consists of four bistable stages weighted respectively 1–2–4–5. Command storage registers 402 and 406 each comprise five binary-coded-decimal decades 425–429 and 430–434, arranged to register a maximum decimal number of 99,999. As in the case of the velocity command PRM 54, the decades of the command storage registers consist of four bistable stages weighted respectively 1–2–4–8. The interaction of the numbers stored in the command storage registers 402 and 406 with the number counted in PRM counter 402 due to the influence of multiplication gates 403 and 405 is similar to that previously described in connection with operation of the PRM 54 of velocity command section 29. The specific details of multiplication gates 403 and 405 are not repeated here, because they are fully covered hereinbefore. It is sufficient to understand that the output signals from multiplication gates 403 and 405 on count-up summation line 454 and count-down summation line 455, represent the component velocities required for machine control. These signals are applied to subsequent X and Y-axis control circuitry.

It is important to recognize that the command storage registers 402 and 406 are straight count-up and count-down counters respectively, rather than the reversible counter employed in the velocity command PRM 54. The decreased complexity achieved by such substitution is an important feature of the invention. The interaction of the various logic elements, the unique contribution to circular motion generation afforded by the use of count-up and count-down counters in conjunction with gating circuitry to permit generation of circles over an entire 360 degree range, and the unique features for preventing errors due to circle function overflow, will be more fully understood after a detailed examination of the logic. First, however, consider the operations required for linear and circular interpolation.

*Linear interpolation*

The input pulses from velocity command 29 on line 36 are applied as gating pulses to pulse rate multiplier counter 404 and are counted upon occurrence of a clock pulse on line 81. The clock pulses are extracted from the output of divide-by-five pulse rate divider 30 in FIG. 2, and consequently occur at 50 kilocycles/second. Thus, PRM counter 404 counts up in response to each concurrent occurrence of a clock pulse and a gating pulse from velocity command 29. Upon each count, PRM counter 404 applies discrete pulses to multiplication gates 403 and 405, depending upon the count registered. These discrete pulses are gated to output summation lines 454 and 455 in accordance with the numbers stored in command storage registers 402 and 406 respectively.

For generation of slope motion at any desired angle with respect to the machine axes, both command storage registers 402 and 406 are supplied by a number other than zero. Thus, a definite pulse rate appears on both output summation lines 454 and 455. For contouring along either the X or Y axis of the machine, a maximum command of 99,999 is inserted in the command storage register of the appropriate half of the function generator, and 00,000 is inserted in the other. Insertion of these commands will cause one of the multiplication gates to respond to 99,999 out of each 100,000 of the input gate pulses from velocity command 29 and pass on a pulse train to command phase counter 31 or 32 which will cause the feed mechanism associated with the appropriate axis to move at substantially the velocity commanded by the velocity command signal. The other multiplication gate will block all pulses.

There are three basic ways of commanding the function generator to generate a slope: (1) the direction sine and direction cosine of the slope path may be inserted in the count-up and count-down command storage registers respectively; (2) the X and Y departure distances may be inserted in the count-up and count-down command storage registers respectively; and (3) multiples of the X and Y departure distances may be inserted in the count-up and count-down command storage registers respectively. A brief consideration of each of these approaches will serve to illustrate their respective merits.

Multiplication of the velocity command signal on lead 36 by numbers equivalent to the sine and cosine of the slope angle to be cut will self-evidently yield two signals representative of the X and Y components of the commanded velocity. Thus, for a 45 degree slope, the two commands will both be 70,711. The output pulse rates on summation lines 454 and 455 will then be approximately 71% of the input pulse rate and will produce resultant velocities along the two axes which will add together vectorially to develop the commanded velocity along a 45 degree slope. A switch, or gate 463, appearing in FIG. 20, directs these velocity signals to the appropriate control circuitry in accordance with which command register contained the particular sine or cosine numbers. The functioning of gate 463 will be explained in detail in conjunction with the subsequent detailed explanation of circular interpolation.

It should be recognized that the numbers stored in command storage registers 402 and 406, determine only the slope and velocity of cut. In order to limit the length it is necessary to supply further instructions to Y-axis distance counter 42 and X-axis distance counter 42'. The required distance information is incorporated in each block of instructions as the Y-axis departure and X-axis departure. Routing circuitry associated with numerical data input equipment 29 directs the departure information to the correct distance counter. As output pulses appear on summation lines 454 and 455 they are directed by gating circuit 463 to the appropriate distance counter. Each output pulse causes the associated distance counter to count down by one decimal digit until all stages register zero. At this time, the desired departure has occurred and further component velocity command signals from the function generator are blocked from the associated command phase counter, thereby terminating further operation in the direction controlled by the zeroed counter. When both distance counters register zero, the next block of instructions is read into the equipment.

In some instances, the departure information is used to control the slope and velocity generation directly, rather than resorting to the direction sine and cosine of the slope angle. Under these circumstances, the departure numbers are inserted into command storage registers 402 and 406. The reason departure distances may be directly inserted in the command storage registers is because in order to generate a particular slope it is merely necessary that the two pulse rates on summation lines 454 and 455 have a particular definite ratio between them. A factor that arises when using departure distances, rather than values of the sine and cosine, is that the resultant vectorial velocity of both X-axis and Y-axis motion is less than the commanded velocity on lead 36. This may be illustrated by a simple example. If it is desired to go a total distance of four inches on both the X and Y axes (X and Y departure both equal to 4.0000 inches), a number of 40,000 would be stored in both the count-up and count-down command registers 402 and 406. These commands would develop equal pulse rates on both summation lines 454 and 455 until the distance counters indicated that signals representative of four inches of travel had been generated. The cut executed would be at the correct slope; however, the resultant velocity of cut would be in the ratio of $$\frac{40,000}{70,711}$$

to the commanded velocity. This is because if the direction sine and cosine had been registered, the number in the registers would have been 70,711.

In order to obtain the original desired velocity when using X and Y departure information directly, it is necessary to employ a velocity command which is the desired velocity times the inverse of the aforecited ratio. In other words, when departure information is used directly in the command registers, the command velocity should be calculated in accordance with the formula:

$$V_c = \frac{10 \times V_d}{L}$$

where $V_c$ equals the command velocity inserted on the input data tape, $V_d$ equals the desired velocity of cut, and L equals the slant length of the path.

An advantage inherent in using departure information directly, is that it permits the elimination of distance counters. When the departure numbers are inserted in command storage registers 402 and 406 the application of 100,000 gating pulses to PRM counter 404 will result in producing the same number of pulses on each summation line as the number stored in the associated command register. The generated pulses will thereupon command motion in accordance with the exact departure. Of course, the elimintaion of distance counters requires that PRM counter 404 complete an entire cycle for each slope, whereas using distance counters permits the termination of a cut at any time a desired length is attained thereby affording recycling without waiting for a complete counter cycle.

For relatively short paths and high contouring velocities, or combinations of the two, the calculated command velocity may be in excess of that normally available, due to the particular timing clock employed. This difficulty may be overcome either by using the direction sine and direction cosine in the manner mentioned above, or by multiplying the departure distances with a constant factor while reducing the originally calculated command velocity number by the same factor until it becomes less than the maximum permissible. When the latter technique is used, the multiplied departure values are inserted in the command storage registers 402 and 406, and the actual departure values are inserted in X-axis and Y-axis distance counters 42' and 42.

*Circular interpolation*

In order to generate circular tool center paths (perform circular interpolation), the function generator circuitry is modified by feeding the output pulse rates on summation lines 455 and 454 through a cross-coupling connection to the inputs of count-up and count-down command registers 402 and 406 respectively. In circular function generation, this cross-connection causes count-up counter 402 to increase in digital value from its initial number in accordance with the output on count-down summation line 455 and causes count-down counter 406 to decrease in digital value from its initial number in accordance with the output on count-up summation line 454. The resulting outputs that are delivered to subsequent control circuitry continuously vary in frequency. An appreciation of why this action develops circular motion in the feed mechanisms may be had by considering the nature of the signals involved.

The velocity of motion between tool and work piece at a zero degree position when generating a counter-clockwise circle will be entirely in the Y-axis. As the cut proceeds through the first 90 degrees of circle generation, the X component of the total velocity varies as the function of the sine of the instantaneous angle whereas the Y component varies as a function of the cosine of this angle. When the 90 degree position has been attained, the Y component of the velocity has been reduced to zero and X component of the velocity is equal to the total velocity. In other words, the X velocity varies from zero to a maximum in accordance with a function of the sine of the position angle and the Y velocity varies from a maximum to zero as a function of the cosine of the position angle. By controlling the information stored in command storage registers 402 and 406 in accordance with these sine and cosine functions of the position angle it is therefore possible to modify the velocity commands to both the X and Y axis feed mechanisms in order to generate circular motion.

Storage of a number in count-up command register 402 equivalent to the radius of the desired circle times the sine of the angle in the first quadrant at which the circle generation is to commence, and storage of a number in the count-down command register 406 that is equal to the radius of the desired circle times the cosine of the angle in the first quadrant at which the circle generation is to commence, will enable the function generator to initially generate command signals on count-up and count-down summation lines 454 and 455 respectively commensurate with the required component velocities at that particular angle and due to the described cross-connection to continuously generate signals to develop a circular cut in the first quadrant. The reason for this, lies in recognition of the fact that $\int \sin \theta d\theta = -\cos \theta$ and $\int \cos \theta d\theta = \sin \theta$. This being so, the cross-connection is effective to integrate the stored numbers with respect to time and add or subtract the results respectively to the numbers in the opposing registers. Thus, the stored numbers ($R \sin \theta$ and $R \cos \theta$) are integrated and due to their effect via the multiplication gates upon the incoming velocity command pulse rate on lead 36, the component velocity commands appearing on summation leads 454 and 455 are effective to cause the tool feed mechanisms to generate a circle.

It should be recognized that the described operation related to the counter-clockwise generation of a circle in the first quadrant only. The relationships described, i.e., the Y component of velocity being a function of the cos $\theta$ and the X component of velocity being a function of the sin $\theta$, are applicable under the described conditions only. As each quadrant is considered the particular trigonometric relationship varies. Also, within each quadrant the trigonometric relationship varies with the rotational direction of generation. At times the X component of velocity varies as a function of the sine while the Y component of velocity varies as a function of the cosine, and vice versa.

In order to generate a complete circle it is necessary to selectively store the command information for each quadrant of cut in the correct command storage register. This selective storage requires recognition of the quadrant and direction of generation for each rotational cut made. Reference to the "Program Manuscript," set forth hereinbefore, will show that this information is presented for each block of data. The particular operations performed in response to the mentioned data will be developed more fully in the following discussion. However, it should be understood that because the component velocities for the X and Y axis feed mechanisms will appear on either the count-up or count-down summation lines 454 or 455, in accordance with the particular sector of a circle being generated, gating means 463 in FIG. 20 are provided.

Gating means 463 are responsive to the direction of circle generation and the quadrant involved, to connect summation lines 454 and 455 to the appropriate axis control circuits. The addition of gating means 463 and other gates described subsequently, permit the use of simple straight count-up and count-down counters whereas reversible counting techniques had to be used in the past. Elimination of the complexities inherent in reversible counting results in the elimination of costly components subject to failures.

During circular interpolation count-down counter 406 counts toward zero and count-up counter 402 counts toward the radius numbers. Circular function generation can be started at any angle by using proper initial commands and terminated at any angle by setting distance counters 42 and 42' to count down to zero upon relative movement of the tool piece a specified amount.

When discussing linear interpolation it was indicated that it was not necessary to use the sine and cosine values directly, but rather, departure information could be inserted in command storage registers 402 and 406. In the case of circular interpolation, it will be recognized by considering FIG. 3 that the radius times the sine of the position angle is represented by the X Arc Center Offset data $J_D$ and that the radius times the cosine of the position angle is represented by the Y Arc Center Offset data $K_D$. Thus, these values may be inserted directly into the command registers. In order to develop the necessary command velocity to obtain a desired velocity of cut, the following formula, similar to that already considered for the linear interpolation, should be used:

$$V_c = \frac{10 \times V_d}{R}$$

where $V_c$ equals the velocity feed rate number command, $V_d$ equals the velocity desired in inches per minute, and R equals the radius of the circle path in inches.

*Specific operations*

A complete understanding of the operation of the function generator during linear and circular interpolation may best be understood by considering several examples. Such examples are available in considering the sequence of events required to develop the cut from point B to point D in the contour illustrated in FIG. 3. The specific items of data placed upon the tape and available as outputs from the numerical input data equipment 21 to generate the straight line and circular contours from points B to D appear on the second and third line of Table 1 of the "Program Manuscript" set forth hereinbefore. These lines of data are set forth again, for convenience.

| From Data Point | Data to Point | Program Selection | X Departure | Y Departure | Y Acr Center Offset | X Arc Center Offset | Feed Rate Number |
|---|---|---|---|---|---|---|---|
| B | C | g1 | x+6.0000 | y+1.7500 | -------- | -------- | f016 |
| C | D | g3 | x+2.5000 | y+3.7500 | k 3.7500 | j 1.5000 | f025 |

The control data impressed upon the input data tape supplied to numerical input data equipment 21 includes a letter address which directs the particular binary-coded information directly following it on the tape to the proper portion of the control system. For example, a discrete letter address precedes the feed rate information representative of the command velocity, for directing it to the buffer command storage 59 of velocity command 29. Similarly, a discrete letter address precedes the departure information, directing it to the appropriate X-axis and Y-axis distance counters. Further, letter addresses dictate the appropriate buffer command storage units in the function generator to which departure information is to be directed.

A distinction exists, however, in the function generator directing circuitry when the program selection indicates that circular interpolation will occur. As mentioned, the particular command register 402 or 406 used to control X or Y command signal generation is determined by the direction of circle generation and the quadrant involved. Thus, the X and Y Arc Center Offset data is selectively stored in up-counter buffer command storage 401 or down-counter buffer command storage 407 in accordance with the direction of generation and quadrant information.

Discussion of the Program Manuscript hereinbefore, pointed out that circular interpolation and the direction of generation is commanded by program selection data represented by the letter addresses *g*2 and *g*3; the former address indicating circular interpolation in a clockwise direction and the latter address indicating circular interpolation in a counter-clockwise direction. Furthermore, the polarity signs accompanying the X and Y departure data discretely identifies the quadrant in which the interpolation is to occur. Control circuitry operates in response to this inserted information to develop signals for directing the control data to the appropriate registers and for interconnecting the appropriate control units. The particular control circuitry employed is not germane to the invention and any means within the competence of one skilled in the art is acceptable.

Figure 18:
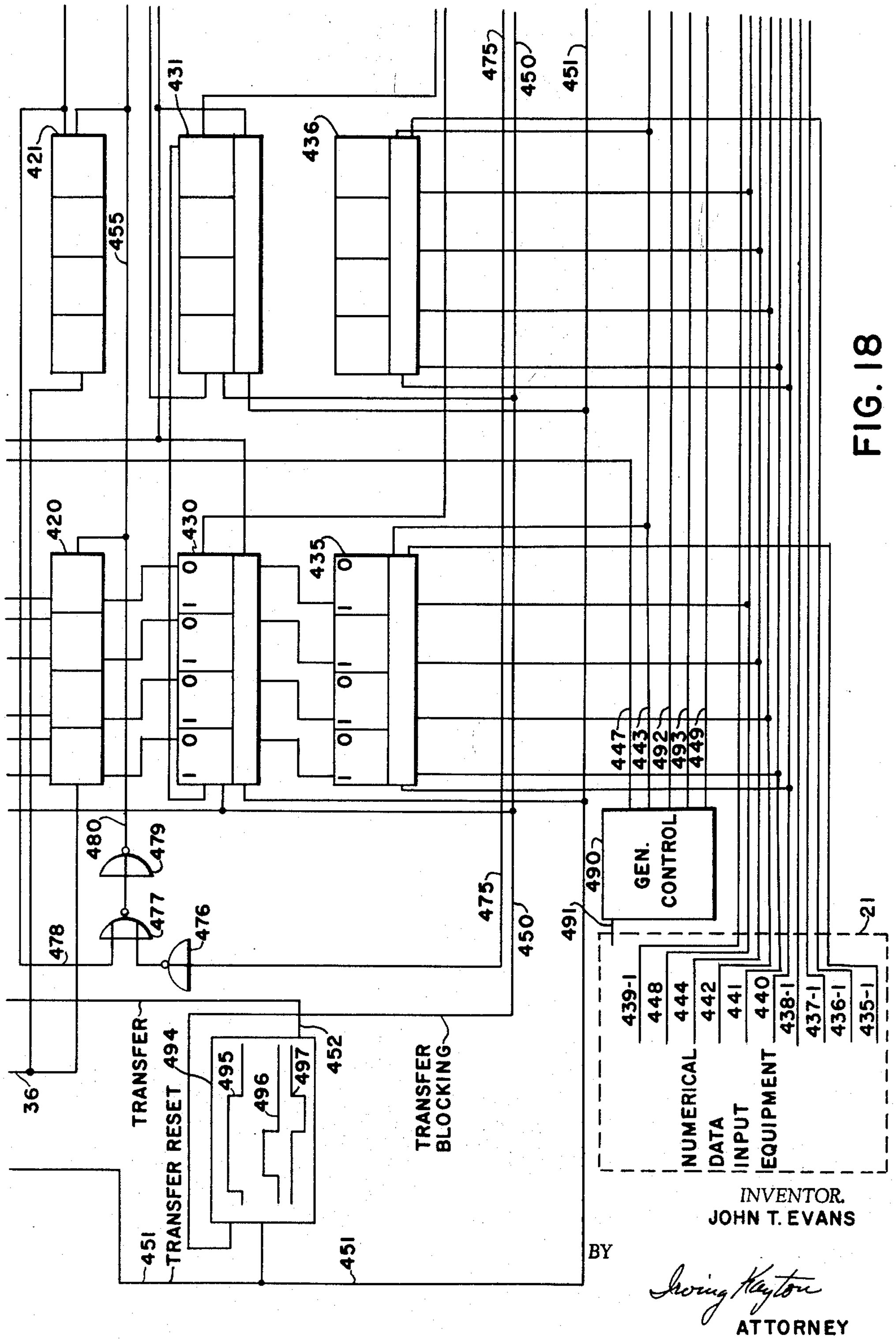
Figure 19:
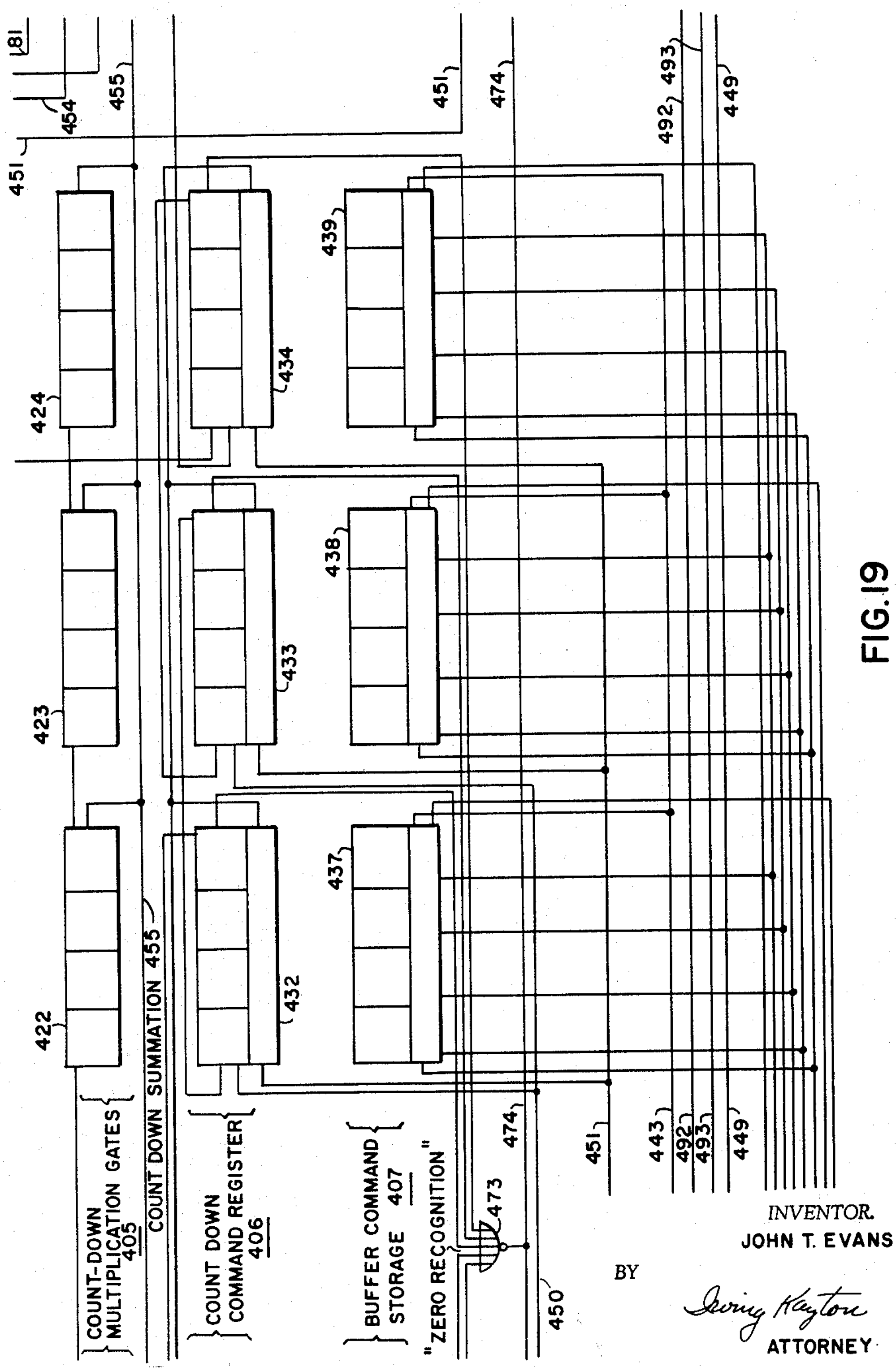

Such control circuitry is illustrated by block 490 in FIG. 18. Lead 491, connecting the control circuitry to numerical input data equipment 21, is indicative of the control exerted thereby in response to the command information. As more fully described hereinafter, the five output leads 447, 443, 449, 492, and 493, have signals impressed thereon in accordance with the requirements of circular interpolation. The presence of a binary "0" on either lead 447 or 443 serves as a letter address indicating that the succeeding digital information is to be stored in up-counter buffer storage 401 or down-counter buffer storage 407 respectively. The presence of a binary "0" on lead 449 indicates that circular interpolation is contemplated and, therefore, the count-up and count-down command registers 402 and 406 should be interconnected. Finally, the presence of a binary "0" on either lead 492 or 493 indicates which output summation line, 454 or 455, should be connected to which axis control circuitry. The signals appearing on leads 492 and 493 are always complementary.

Function generator operation in response to the linear interpolation data covering points B to C is relatively simple and will now be considered. Because the function generator is essentially two similar pulse rate multipliers, consideration of the lower portion only, will furnish a complete understanding of the operation.

A plurality of transfer leads 441, 442, 444, and 448 interconnect each decade of the buffer storage unit 407 with numerical data input equipment 21. These leads are selectively energized in accordance with the information on the input tape to reflect the binary states required in a 1–2–4–8 code to store a particular decimal digit in each decade. When the latter address gl, indicative of linear interpolation is read, the subsequent appearance of the letter address for the X departure data (6.0000) energizes lead 443 and enables buffer command storage 407. A signal on reset lead 440 thereupon resets all buffer storage decades, 435 to 439, to zero in preparation for storage of new data. Then, as successive lines of data from the input tape energize transfer leads 441, 442, 444, and 448, row sort leads 435–1, 436–1, 437–1, 438–1, 439–1 are selectively energized to gate the successive decimal digits into their associated decades 435–439. The described transfer of data from numerical data input equipment 21 to buffer storage 407 is similar to such transfer into any other buffer storage unit.

When all command buffer storage units have been set to register the commands for the cut from point B to point C, and the preceding cut has been completed, three transfer signals are generated. The transfer signal generation means is represented by block 494 in FIG. 16, and the nature of each of the signals as functions of binary value and time is shown therein. The "transfer blocking" signal 495, is first to occur, and provides a binary "1" on lead 450 for a duration of time which includes the occurrence of the other two signals. The "transfer reset" signal 496, provides a binary "1" on lead 451 a short time after occurrence of the transfer blocking signal. The "transfer" signal 497, provides a binary "0" on lead 452 upon termination of transfer reset signal 496. The information contained in buffer command storage 401 and 407 is transferred to command registers 402 and 406 in response to the transfer signals. In addition, PRM counter 404 is reset to zero.

Typical count-up and count-down command storage registers are illustrated in FIGS. 21 and 22 respectively. Their operation will be considered subsequently. Several characteristics should be recognized, however, to proceed with a consideration of the function generator. Each command storage register 402 or 406 comprises a plurality of decades. A typical count-up decade, 425 in FIG. 16, comprises four bistable stages 501, 502, 504, and 508 arranged to count up pulses appearing on lead 496 in accordance with a 1–2–4–8 binary-coded-decimal form. Upon reaching a decimal count of 10, a carry pulse is delivered on lead 499 to either another decade or some other recognition circuit (in this case, "one recognition flip-flop" 470). A gating arrangement is provided in conjunction with the first bistable stage to prevent the decade from counting unless a binary "0" is applied to the gating input on lead 498. Means are also provided for setting the entire decade to zero in response to a signal on lead 507 and for setting the individual stages in accordance with the number stored in its associated buffer storage in response to a signal on lead 500.

The individual decades of count-down command register 406 are similar to decade 425, just described, except that they count down from 9 to 0 and provide a "carry" pulse when going from 0 to 9.

Returning to function generator operation, upon storage in buffer storage units 401 and 407 of the data corresponding to the slope commands for the cut from points B to C in FIG. 3, it will now be understood that "transfer blocking" signal 495 will be generated. This signal is applied to all but the least significant decades of PRM counter 404, up-counter 402, and down-counter 406. This prevents counting by effectively inhibiting the gating inputs. Immediately following the transfer blocking signal, "transfer reset" is implemented by signal 496 on lead 451. The transfer reset signal is applied to all decades of all counters. The transfer reset signal sets all stages of count-down register 406 to binary "1" and all stages of count-up register 402 and PRM counter 404 to binary "0." This difference in settings, is of course due to the difference in the "carry" signal in the various registers. Once resetting is completed, "transfer" signal 497 on lead 452 enables each stage of up-counter 402 and down-counter 406 to assume the state commanded by its associated buffer storage unit.

Upon completion of the above operations, the function generator is set and ready to operate in response to velocity command pulses from velocity command 29 over input lead 36. As pulses are received from velocity command 29, they are applied directly as a steering gate to decade 410 of PRM counter 402 and to multiplication gates 403 and 405. As described in conjunction with the velocity command section 29 the decades of the multiplier reference counter respond to the 50 kilocycle clock pulses appearing on lead 81 whenever an input gate signal from velocity command 29 appears on lead 36. Thus, pulse rate multiplier reference counter 404 begins counting from zero at a rate determined by velocity command 29. In accordance with the numbers stored in the up-counter and down-counter command registers 402 and 406 (the X and Y departures), the multiplication gates 403 and 405 respectively gate out the appropriate components velocities on count-up summation line 454 and count-down summation line 455. The signals are representative of the velocities in the Y and X directions respectively and consequently, must be gated to the appropriate phase counters.

The signal appearing on the summation line 454 and 455 consists of a plurality of pulses similar to that appearing on the input lead 36. They occur with a frequency determined by the numbers appearing in count-up and count-down command registers 402 and 406, and approximately at the times of the clock pulses occurring on lead 81. It will be recognized, however, that due to slight delays in the multiplicity of gates appearing in the multiplication gates 403 and 405 (specifically illustrated in conjunction with velocity command 29), this timing is not accurate; consequently, re-synchronizing flip-flops 456 and 457 are provided.

The input to re-synchronizing flip-flop 456 consists of clock pulses on lead 81 as triggering inputs, and the output appearing on count-up summation line 454 and its complement as steering inputs. The output pulses on count-up summation line 454 are applied directly to terminal 456*a* and to an inverter 510. The inverted signal, the complement of the signal on summation line 454, is applied to terminal 456*b*. The transfer reset signal appearing on 451, and described above, is applied to terminal 456*f* as an electronic reset. Re-synchronizing flip-flop 457 has similar connections under the control of the output pulses from count-down summation line 455 and clock pulses on line 81. These re-synchronizing flip-flops change state in response to the appearance of an output gating pulse on the summation lines during occurrence of a timing pulse on lead 81, and provide binary "0" outputs from terminals 456*h* and 457*h* in response thereto. The effect of this arrangement is to delay the output pulses until the next succeeding clock pulse on lead 81, and to re-synchronize the output pulses with the clock pulses.

The outputs from terminals 456*h* and 457*h* are applied over conductors 458 and 459 respectively to switching circuit 463 which is adapted to connect them to the appropriate X-axis and Y-axis distance counters and command phases counters.

During linear interpolation, the output from count-up summation re-synchronizing flip-flop 456 is connected to the Y-axis control circuitry and the output from count-down re-synchronizing flip-flop 451 is connected to the X-axis control circuitry. This is accomplished by generating a binary "0" on lead 492 from generator control 490 and its complement, binary "1," on lead 493. These signals appear in response to detection of the letter address *g*1 on any block of data. Examination of gating circuitry 463 will show that under the described conditions of leads 492 and 493, the "0" output pulses from count-up multiplication gates 403 are applied to Y-axis command phase counter 31 and Y-axis distance counter 42, whereas the "0" output pulses from count-down multiplication gates 405 are applied to X-axis command phase counter 32 and X-axis distance counter 42'. Thus, the appropriate component velocities are directed to the correct control circuits.

The function generator will deliver the same component command pulse rates until both the X and Y axis distance counters 42' and 42 indicate that sufficient pulses to command the desired cut from B to C have been generated. At that time pulse generation is stopped and the next block of data is transferred into the command registers. In this case, the next cut is circular.

The circular cut programmed between points C and D, as shown in FIG. 3, appears in the fourth quadrant and is in a counter-clockwise direction; consequently, the Y Arc Center Offset data (3.7500) is stored in the buffer storage units 407 associated with count-down command register 406 and the X Arc Center Offset data (1.5000) is stored in buffer storage unit 401 associated with count-up command register 402. In response to the letter address *g*3, associated with this block of data, control circuitry 490 generates a binary "0" on lead 449 which, as will soon be described, effectively cross-connects the up-counter 402 and down-counter 406. Thus, as pulses are counted by pulse rate multiplier reference counter 404, output pulses will be generated on the respective summation lines of the count-up and count-down counters for application to the Y-axis and X-axis phase command counters 32 and 31. Because the X velocity must decrease towards zero as a portion corresponding to 360 degrees is attained, the output of count-down summation line 455 is connected to X-axis command phase counter 32 and because the Y velocity must increase to a positive maximum as a position corresponding to 360 degrees is attained, the output of count-up summation line 454 is connected to Y command phase counter 31 under these conditions.

In general, the type of operation desired has been described. The unique control circuitry to accomplish the desired operation without unwanted ambiguity will now be examined.

The actual setting of the function generator for circular interpolation is similar to the setting for linear interpolation. The differences that exist are due to the selective use of the command storage registers as counters. First, the quadrant and direction of generation data contained in the program selection letter address and the polarities of the X and Y departure is used to generate the enabling addresses that direct the Arc Center Offset numbers to the appropriate counter. Second, the program selection letter address is used to develop a signal to cross-connect the command registers. Third, the program selection letter address and the polarities of the X and Y departures is used to generate signals for controlling connecting circuitry 463 in FIG. 20 to connect the correct control circuits to the function generator outputs. Whereas the means of generating these signals and addresses is not unique to the invention, the means for implementing the desired operations are.

The development of proper addresses to direct the X and Y Arc Center Offset numbers to the appropriate counters, and their storage therein, has been previously described. Also, the control of connecting circuitry 463 by signals on leads 492 and 493, has been described.

In order to cross connect the outputs of the command registers 402 and 406, during circular interpolation, lead 449 is placed in a binary "0" condition. This causes the various NOR gates appearing on the left of FIG. 20 to couple the outputs appearing on summation lines 454 and 455 to the respective count inputs of the least significant decades 434 and 429 of count-down register 406 and count-up register 402. Thus, NOR gate 484 provides a binary "1" output in response to an output on summation line 455. This "1" is inverted in inverter 485 and applied directly to the count input steering gate of decade 429. The subsequent appearance of a clock pulse on lead 81 causes count-up command register 402 to increase its registration by one decimal digit.

NOR gate 483 interconnects count-up summation line 454 with the steering gate input of decade 434 in the count-down register 406. NOR gate 483 has three inputs: one from summation line 454; one from zero recognition gate 473 of the count-down register; and one from control lead 449. Assuming count-down register 406 is not at zero, when control lead 449 indicates circular interpolation by a binary "0" all output pulses on count-up summation line 454 cause a "1" output of NOR gate 483. This "1" output is inverted in inverter 487 and applied directly to the steering input of register 406 and is effective to cause a count-down of one decimal digit when a clock pulse appears on lead 81.

Upon completion of each of these preparatory activities the function generator is set and ready to perform circular interpolation in response to velocity command signals supplied from velocity command 29 over input lead 36. Recall that the Y Arc Center Offset data, 3.7500, is now in count-down register 406 and that the X Arc Center Offset data, 1.5000, is in the count-up command register 402. As pulses are applied over lead 36 they are used as a steering gate to stage 410 of PRM counter 404. Just as described in connection with linear interpolation, the PRM counter responds to the 50 kilocycle clock pulses on lead 81 whenever an input gate pulse is applied via lead 36. Each time the number stored in either register 402 or 406 causes a pulse to be gated by the multiplication gates 403 or 405, the number stored in the opposite register is modified by one digit. Operation continues until the registers reach zero or maximum registration, or until the departure values registered in the distance counters are reduced to zero. Circular motion may be started or stopped at any angle in any quadrant by inserting appropriate starting point Arc Center Offsets in command registers 402 and 406 and appropriate departure distances in distance counters 42 and 42'.

In the cut from points C to D in FIG. 3, the Y velocity varies in accordance with the sine of the angle whereas the X velocity varies in accordance with the cosine of the angle; consequently, the output appearing on count-up summation line 454, which is commensurate with the required velocity in the Y direction, must be supplied to Y-axis distance counter 42 and Y-axis command phase counter 31. Also, the signal appearing on the count-down summation line 455 must be applied to X distance counter 42' and X-axis command phase counter 32. This interconnection is accomplished in accordance with signals on leads 492 and 493 generated responsive to the aforecited quadrant and generation direction information. Consider the NOR gate configuration appearing in the upper portion of FIG. 20. This configuration illustrates a first NOR gate 460 having inputs from the count-up re-synchronizing flip-flop on line 458 and from lead 492. It will be understood that when both these leads present the binary digit "0", a "1" output appears on output lead 464 for application as an input to NOR gate 462. A second NOR gate 461 having as one input the signals from the count-down re-synchronizing flip-flop on line 459, and as the other input, the signal on lead 493. When both of these latter-mentioned leads present the binary digit "0", a "1" will appear on the output lead 466 of NOR gate 461.

In order to cause Y distance counter 42 to count down (its normal operation), it is necessary to apply "0" pulses to the input thereof. The same situation is, of course, true with respect to X-axis distance counter 42'. In carrying out the invention, application of the outputs from either the count-up or count-down re-synchronizing flip-flop 456 or 457 to the distance counters is made in accordance with the condition of leads 492 and 493. In order to connect the count-up lead 458 to supply counting pulses to the Y-axis distance counter 42, the commands on leads 492 and 493 must be "0" and "1" respectively. Under these conditions, NOR gate 460 has "0" applied to both of its two inputs whenever a count-up pulse appears on count-up lead 458. The effect of such an input condition is to provide a "1" on output lead 464 which is applied as an input of NOR gate 462. Presence of "1" on the input of NOR gate 462 will insure a "0" on the output 465 of NOR gate 462. The output on lead 40 is, effectively, the output of one section of the function generator and, in the present case, represents the output on the count-up summation line 454. The appearance of a "0" thereon causes the Y-axis distance counter 42 to count one digit because it is applied to the input of NOR gate 468, the other input of which is always at a "0" with the exception of the time at which the Y-axis distance counter 42 registers the decimal digit 00,000. Thus, the appearance of "0" on the two inputs of NOR gate 468 provides it with a binary "1" output which is inverted by inverter 467 and applied to count down the Y-axis distance counter. Note that application of "1" on lead 493 to one of the inputs of NOR gate 461 insures that the output thereof will always be "0" irrespective of the condition of count-down lead 459 and consequently, only the output of the count-up multiplication gates 403 is connected to the Y-axis command circuits.

The gating circuitry interconnecting X-axis distance counter 42' to the outputs of the function generator is essentially the mirror image of that already described. When lead 492 is at "0" and lead 493 is at "1", the count-down summation output on lead 459 is interconnected to count-down X-axis distance counter 42'. Reversal of the conditions of the inputs 492 and 493 is under the control as previously described, of control circuitry 490 that is responsive to data block 21. More specifically, the condition of leads 492 and 493 is a function of the quadrant and direction of rotation of the particular circle being generated. Reversing the binary conditions of leads 492 and 493 is effective to reverse the interconnections so that the output on count-up lead 458 is applied to count-down X-axis distance counter 42' and the output of count-down lead 459 is applied to count-down Y-axis distance counter 42. The outputs appearing on leads 465 and 453 are also, it is understood, applied to the command phase counters associated with the appropriate axes in order to control the velocity of tool feed mechanisms in the desired fashion.

Several arrangements within the function generator 37 have not yet been described in detail and these particular arrangements are essential in order to provide proper operation.

*Circle function overflow*

Figure 16:
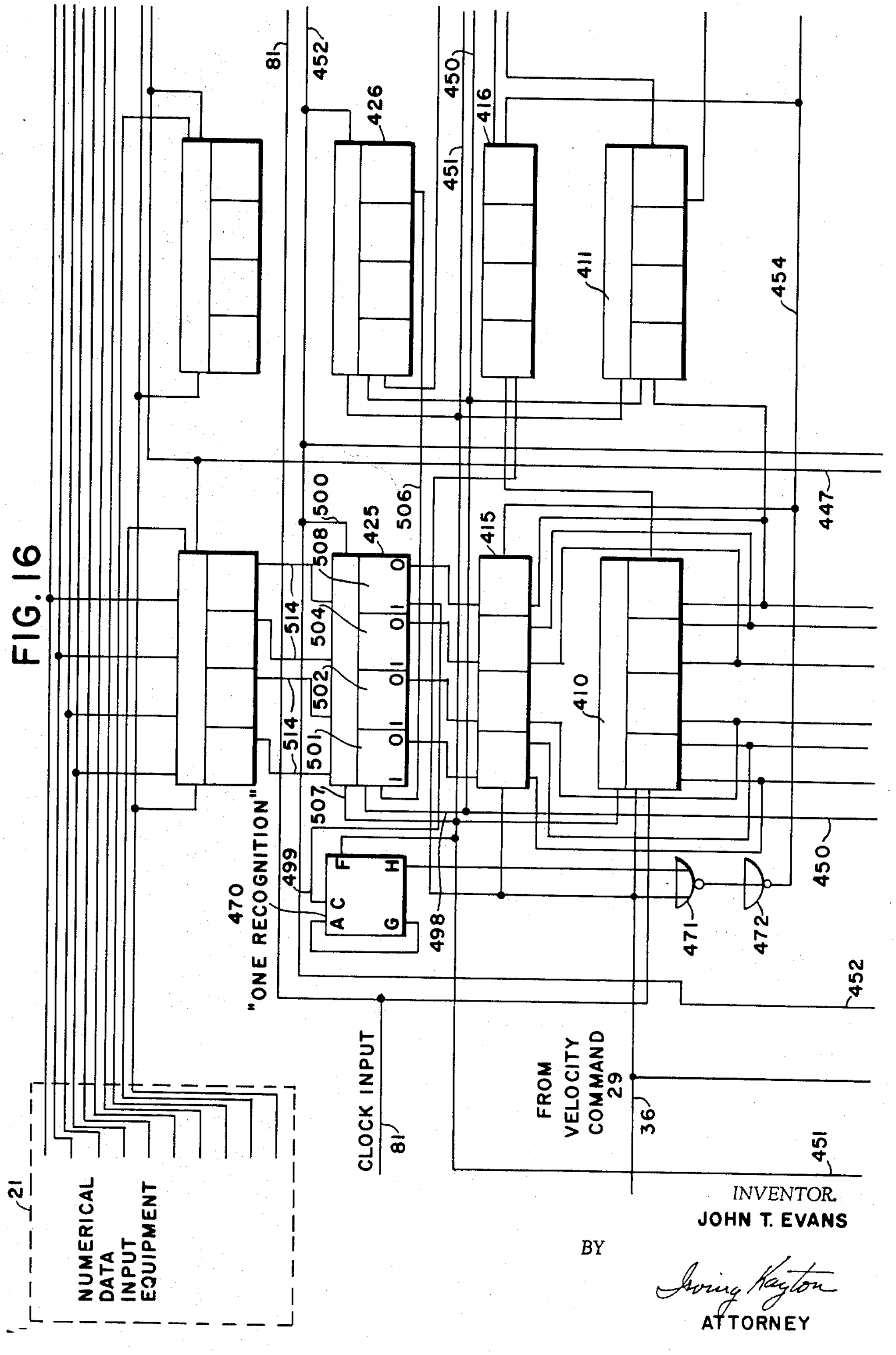
Figure 17:
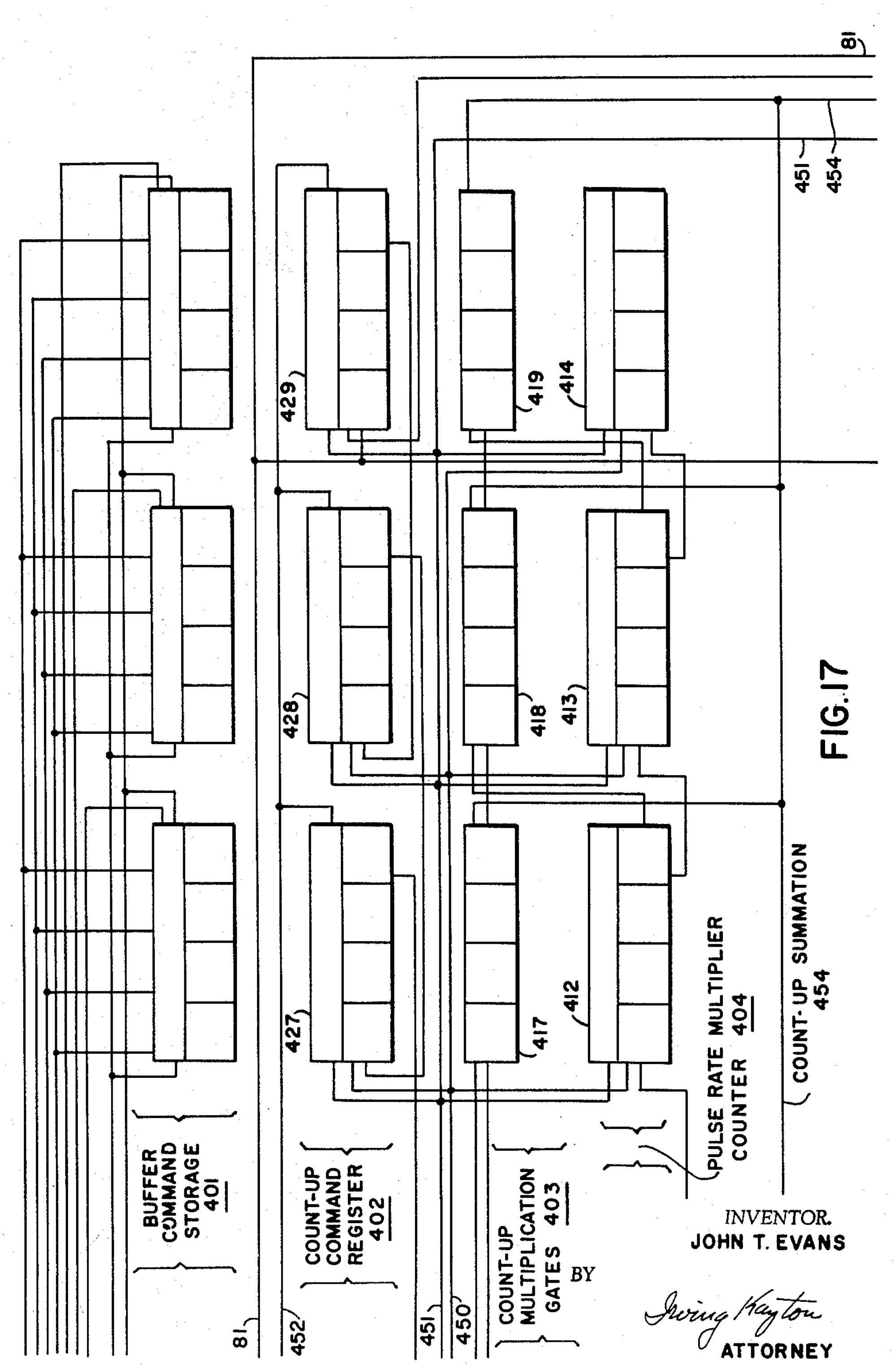

The first of these arrangements is a "one recognition" circuit which consists of flip-flop 470 appearing on the lefthand side of FIG. 16. A "one recognition" circuit is required, during circular interpolation, in the event count-up command register 402 reaches its maximum counting capacity of 99,999 before the distance counter with which it is associated commands a cessation of operations. In this event, the succeeding gate pulses being delivered over lead 36, are gated directly onto count-up summation line 454 prescribing a maximum velocity of motion in the direction currently being controlled by count-up command register 402.

"One recognition" flip-flop 470 is triggered to a "1" state whenever the five decades 425 through 429 of up-counter 402 go from the decimal state 99,999 to 00,000. This flip-flop is connected to a NOR gate 471 which passes all input signals from velocity command 29 on lead 36 to the count-up summation line whenever the flip-flop is in a "1" state. Triggering pulses are applied to terminal 470*c* from the 8 stage of most significant decade 425 of count-up register 402. Terminals 470*g* and 470*a* are directly connected together and terminal 470*h* is connected to one input of NOR gate 471 the other input to which is the input gate signal on lead 36. At the commencement of each cycle when the transfer reset pulse is applied to lead 451, one recognition flip-flop 470 is set to a 0 state by application of the transfer reset binary "1" to electronic set terminal 470*f*. Thus, during normal operation the output from terminal 470*h* is a "1". Upon the switching of the most significant digit stored in decade 425 from a "1" in the 8 stage to a "0", a pulse is applied to trigger one recognition flip-flop 470 to the 1 state, thereby applying to "0" to the input of NOR gate 471. This "0," in conjunction with the "0" signals appearing on input gate lead 36 develop "1" outputs which are inverted by inverter 472 and applied directly to count-up summation line 454.

The problems of cummulative error when performing circular interpolation were described early in the sepcification. Employment of "one recognition" flip-flop 470 insures that the departure controlled by the count-up portion of the function generator is completed in all instances. Although slight deviations from the desired contour may arise, there will be no accumulation of error from one block of instructions to the next. It is also possible that count-down command register 406 will exhaust its counting capacity before the motion it is commanding has resulted in a correct departure of cut. A "zero recognition" circuit alleviates this problem.

The "zero recognition" circuit consists of a multiple input NOR gate 473 having outputs from the individual decades 430 through 434 connected as inputs thereto. When each decade registers a zero decimal digit, all inputs to NOR gate 473 are at a binary "0" and a binary "1" appears at the output thereof. This "1" is applied over conductor 475 and inverted by inverter 476 to apply a "0" to one input of NOR gate 477. A second input to NOR gate 477 is extracted, on lead 478, from the pulse rate multiplier gate 405 at a point which provides a "0" once out of every ten input pulses from velocity command 36. This input is shown as being connected to the "carry" lead between multiplication gates 421 and 422. Thus, when the "zero recognition" gate detects a decimal zero in the count-down command register 406, every tenth pulse from the velocity command 29 is effective to produce a "1" at the output of NOR gate 477. This "1" is inverted by inverter 479 and appears at the output thereof as a binary "0". It will be noted that lead 480, the output of inverter 479, is in fact the count-down summation line 455 and consequently, when the count-down command register 406 has been counted down to a complete zero condition pulses are applied at a decreased rate to count-down summation line 455 until the distance counter signifies that the proper distance has been moved.

The preceding discussion described the use of up-counters and down-counters, as command storage registers. It is within the skill of persons competent in the art to develop numerous counters that may be employed in the system taught; however, typical counters, for use directly in the function generator described, are illustrated in FIGS. 21 and 22.

*Typical counters*

The gated count-up counter shown in FIG. 21 is a binary-coded-decimal counter having a 1–2–4–8 pattern that is arranged to count decimally from 0 to 9 and recycle to 0. The counter is triggered by clock pulses that are applied via lead 520 to trigger terminals 521*c* and 521*d* of the first flip-flop 521. It will be noted that four flip-flop stages 521, 522, 524, and 528, are employed. An enabling gate signal is applied via lead 523 to steering NOR gates 525 and 527. A second input to these NOR gates is applied by either output terminal 521*g* or 521*h* of the flip-flop. Inverters 526 and 529 connect the outputs of NOR gates 525 and 527 respectively to input steering terminals 521*a* and 521*b* of flip-flop 521. Thus, flip-flop 521 changes state each time a "0" appears on input lead 523 and a clock pulse appears on trigger lead 520. Unless input lead 523 has a "0" condition thereon, no count will be registered.

The output at terminal 521*g*, when flip-flop 521 is switched to a zero state, is applied to terminals 522*cd* of flip-flop 522 as a trigger pulse. Flip-flop 522 switches to the one state in response to this pulse. When reset to zero, subsequently, the output of flip-flop 522 triggers flip-flop 524, which in turn triggers flip-flop 528 when reset to the zero state. The input NOR gate 530 to the steering terminals 522*a* of flip-flop 522 is so connected that it blocks flip-flop 522 from responding to switching of flip-flop 521 when flip-flop 528 is in a one state. Thus, it prevents flip-flop 522 from assuming a one state upon the tenth count when it should remain in the zero state. Of course, a group of four bistable stages such as illustrated herein is basically a sixteen counter; however, two-input NOR gate 530 converts it to a count-of-ten counter.

To register a particular number in the up-counter of FIG. 22, each stage is initially reset to zero by application of a binary "1" via lead 532 to the electronic set terminal "F" of each flip-flop. Following reset, the individual stages are set in accordance with the complement of the binary value on leads 533–536 by applying a binary "0" on transfer lead 537. NOR gates 538, 539, 570, and 571 connected to electronic set terminals "E" implement this gating in an obivous fashion. The state of each stage 521, 522, 524, and 528 may be applied via leads connected to the respective "G" and "H" terminals thereof to any desired succeeding circuitry.

The gated count-down counter shown in FIG. 22 is a binary-coded-decimal counter having a 1–2–4–8 pattern that is arranged to count decimally from 9 to 0 and recycle to 9. Four flip-flop stages 541, 542, 544, and 548 are used in this counter. It is triggered by positive clock pulses applied via lead 540 to trigger terminals 541*c* and 541*d* of the first flip-flop 541. As in the case of the count-up counter, an enabling gate signal is applied via lead 543 to steering NOR gates 545 and 547. The second input to these NOR gates is applied respectively by output terminals 541*g* or 541*h*. Inverters 546 and 549 connect the outputs of NOR gates 545 and 547 respectively to input steering terminals 541*a* and 541*b* of flip-flop 541: Thus, flip-flop 541 changes state each time a "0" appears on gating lead 543 and a clock pulse appears on trigger lead 540. Unless input lead 543 has a "0" condition thereon, no count will be registered.

Assuming all stages 541, 542, 544, and 548 initially reside in the zero state, when flip-flop 541 is switched to the one state, the output pulse appearing on lead 541*h* is applied as a triggering pulse to flip-flops 542 and 548. Four-input NOR gate 565 provides a discrete "1" output only when all four stages are in the zero state. This "1" output is inverted by inverter 566 to provide a "0" to steering input A of flip-flop 548. Simultaneously, this "1" output is applied as an input to NOR gate 550 insuring a "0" output therefrom, producing a "1" signal on steering input A of flip-flop 542 due to the intervention of inverter 551. These signals permit the trigger output from flip-flop 541 to trigger flip-flop 548 while blocking a similar triggering of flip-flop 542. In response to the first input pulse therefore the decade resides in a decimal nine condition (1001). Following the 1–2–4–8 pattern, down-counting in response to succeeding input gates and triggering pulses continues in conventional fashion.

In a fashion similar to that described in conjunction with the count-up counter of FIG. 21, to register a number in the count-down counter, a binary "1" is first applied to reset lead 552. This lead is connected to all electronic set inputs "E" and consequently, all flip-flops assume the one state. Following reset, the individual stages are set in accordance with the complement of the binary values on leads 553–556 by applying a binary "0" to transfer lead 557. NOR gates 558–561, connected to electronic set terminals "F" implement this gating in an obvious fashion. The state of each stage 541, 542, 544, and 548, may be extracted via leads connected to the respective "G" and "H" terminals thereof.

In recapitulation, the detailed logic circuitry involved in function generator 37 has been fully described. As disclosed, means are provided for utilizing an up-counter 402 and a down-counter 406 in individual pulse rate multiplier systems in order to generate the necessary sine and cosine functions required for circular interpolation. The utilization of such counters has required that unique circuitry be employed to selectively connect the outputs from the respective counters to the proper X and Y distance counters and command phase counters and to selectively interconnect the counters during circular interpolation. Whereas the signals employed to control these unique gating means may be developed in accordance with known techniques, the utilization in this fashion of up-counters and down-counters permits the efficient generation of circular command signals with a minimum of circuitry. The disclosed logic has also included unique means for avoiding error in the concluding points of each path cut. If the controls generated by either the X or Y-axis command counters do not move the tool feed mechanism a sufficient amount to yield the total displacement required, special gating means are provided for generating additional pulses until the final point is attained. Only when the exact final position is attained, is the command received from the distance counters which will permit further tool feed mechanism displacement in response to new data.

COMMAND PHASE COUNTER

FIG. 23 is the circuit of the command phase counter 31 shown in block form in FIG. 2 and previously described to the extent of its relationship to the subsystems of FIG. 2. It may be recalled that the output of the command phase counter 31 is a phase modulated pulse train applied on output lead 19 to phase discriminator 18 for comparison with the phase modulated pulse train representative of the actual position of the machine tool. The phase counter counts the incoming 250 kilocycles per second clock pulse train on lead 26 down to an output 250 cycles per second pulse train on lead 19. This is so because phase counter 31 comprises three decades, indicated in FIG. 23 as the first, second, and third decades. Furthermore, the output of phase counter 31 is phase modulated by virtue of either adding pulses (from function generator 37 on lead 43) to the clock pulse train applied on lead 26, or subtracting them from the clock pulse train, dependent upon whether the velocity is to be positive or negative and therefore whether the output phase of the counter is to be increasing in the leading or lagging sense.

Each of the three decades of FIG. 23 comprises four binary stages so as to represent a decade in binary-coded-decimal form of the type wherein the first binary stage, which represents the least significant digit in that decade, has the decimal weight of 1; the second stage is weighted 2; the third stage is weighted 4; and the fourth stage is weighted 8. The first decade shown on the left is the units decade; the second the tens decade; and the third is the hundreds decade.

The second and third decades are identical to each other. The first decade, which is the input decade, may include all the circuitry typical of a fixed rate count up counter but additionally includes special logic circuitry which permits the first decade to count at a variable rate. To comprehend the manner in which the first decade functions as a variable rate counting decade, it is first necessary to understand the operation of a binary-coded-decimal decade in a fixed rate mode of operation.

Consider the second decade. Each of its four stages, 711, 712, 714, and 718, comprises a counter flip-flop stage as shown in FIG. 4G and described above. The permutations of the output states of the four stages for ten successive lock pulse inputs to the first stage 711 is shown in FIG. 24.

In FIG. 24, the left-hand column represents the decimal numbers 0 through 9 that may be represented in the second decade by logic state permutations in binary-coded-decimal form. Counting from 0 through 9 is achieved by pulsing the input stage 711 ten times, successively. The second through fifth columns of FIG. 24 represent the states of the four counter stages of the decade for the decimal digits 0 through 9. Thus, each row of FIG. 24 commences with a decimal number followed by a permutation of four logic states for the four binary stages which constitutes the binary-coded-decimal representation for that decimal number.

This representation is for the typical counting arrangement for a binary-coded-decimal count-up decade in fixed rate operation. Reference to the 1-unit stage column demonstrates that it changes state with each input pulse. Stage 712 (the 2-unit stages) changes state on every second input pulse applied to stage 711 except over end from 9 to 0. The 2-unit stage 712 pulses the 4-unit stage 714 to the one state on the fourth input pulse to the 1-unit stage 711 and to the zero state on the eighth input pulse to 711. When 4-unit stage 714 switches to the zero state, it pulses the 8-unit stage to the one state. On the tenth input pulse to 1-unit stage 711, its change of state pulses the 8-unit stage 718 so as to change the state of stage 718 to the zero state, thereby producing an output pulse on the lead to the next decade (on the output lead 19 to the phase discriminator 18 in the instance of the third decade). Thus this output occurs at the completion of every tenth count to the input stage 711. The 2-unit stage is precluded from changing state with the application of the tenth pulse to the 1-unit stage, by a blocking signal generated by the 8-unit stage when it switches to a one state for the decimal counts of 8 and 9. All four stages are then in their zero state representing decimal digit zero.

This is the type of counting that is required for the first decade when fixed rate counting is to occur. It may be recalled that fixed rate counting is to occur when there is an absence of pulses on input lead 43 from function generator 37, or when the input pulses on lead 43 are blocked by the output on lead 93 from the distance counter (see FIG. 2).

When there are pulses applied to the first decade on lead 43 and simultaneously there is an indication for a negative direction of motion along the Y coordinate, then one pulse is to be blanked from the clock pulse train on lead 26 for every pulse that appears on lead 43 from the function generator. This is equivalent to subtracting a pulse from the totality of pulses in the clock pulse train for every pulse that appears on lead 43. This blanking operation is accomplished at the input to the first stage of the variable rate input decade. This occurs for each pulse on lead 43 as long as there is a negative direction signal controlling the operation on the counter.

When, however, the movement along the Y coordinate is to be in the positive direction, the counter should count not only the pulses of the clock train on lead 26 but also the pulses applied to the counter on lead 43 from the function generator. This is accomplished by having the counter count two rather than one for every simultaneous occurrence of a pulse on lead 26 and on lead 43 at the input to the variable rate decade. To make the counter count two counts instead of one, it is necessary to change the states of the counter stages by the equivalent of a count of two. This is accomplished when the counter is registering a count of 0 to 7 inclusive by changing the state of the 2-unit stage of the variable rate decade rather than changing the state of the input 1-unit stage.

Looking at the table of FIG. 24 for the rows 0 through 7, it may be seen that changing the state of the 2-unit counter stage and leaving the 1-unit counter stage undisturbed does, in fact, change the permutations of the stages such that a count of two rather than a count of one is accomplished. In the decimal digit 0 row, changing the 2-unit stage from zero to one results in a permutation of states identical to the permutation for states for decimal digit row 2. Changing that same 2-unit stage from zero to one for decimal digit row 1 results in the identical permutation of states shown in decimal row 3.

The situation for the successive decimal number is somewhat different. In decimal row 2, changing the state for the 2-unit stage from one to zero, does not, of and by itself, result in the permutation of states required for decimal row 4. However, changing the state of the 2-unit stage from one to zero automatically results in an output from the 2-unit stage of the 4-unit stage, whereby the 4-unit stage is changed from the zero state to the one state. This is the same as the permutation of states representing decimal row 4. A similar effect accomplishes the change of permutations from the decimal 3 representation to the decimal 5 representation.

The decimal 4 row is changed to the decimal 6 row in the same way as the decimal 0 and 1 rows were changed to the decimal 2 and 3 rows, respectively. In the same way, the decimal 5 row is converted to the decimal 7 row.

The decimal 6 row, on the other hand, is somewhat more complicated. Changing the state of the 2-unit stage from one to zero results in pulsing the 4-unit stage from one to zero. However, at this point, pulsing the 4-unit stage from one to zero also produces an output to the 8-unit stage which pulses it from zero to one. This provides the appropriate representation for decimal row 8. It may be seen that changing the decimal row 6 by changing the 2-unit stage results in exactly the same thing as changing the 2-unit stage for decimal row 7, i.e., it is the same as the change brought about from decimal row 7 to decimal row 8, ignoring the 1-unit stage which is unaffected when the 2-unit stage is pulsed. The change in state of the 2-unit stage of decimal row 7 in a similar manner results in a permutation which is the same as that of decimal row 9. This change in state from one to zero in pulsing the 2-unit stage of decimal row 7, results in an output pulse which changes the 4-unit stage from state one to state zero and a pulse to the 8-unit stage which changes the state from zero to one.

When a count of 2 is to be added to a permutation of states representing decimal 8 or 9, however, the state of the 8-unit stage must be changed rather than the state of the 2-unit stage. That changing the state of the 8-unit stage will, in fact, do the job may readily be seen. Decimal 8 plus 2 is equal to decimal 10; this means the entire decade must go to 0 (a 0 on each of the four stages of that decade) with an output or carry pulse over to the next decade. Decimal row 8 shows that the only stage that is in the one state is the 8-unit stage. Changing that state to zero results in all four stages being zero and produces, of necessity, an output pulse to the next stage. Similarly, adding or counting 2 onto the permutation of decimal row 9 should produce decimal 11, which is the same as a decimal 1 with a carry over to the next decade. It may be seen that changing the 8-unit stage in decimal row 9 from one to zero, results in a permutation exactly the same as that shown in decimal row 1 and, of necessity, produces an output pulse to the next decade from the 8-unit stage.

The circuitry required in the variable rate counter for gating the 2-unit and 8-unit stages in accordance with the above description and for blocking the application of clock pulses to the counter when a negative direction Y coordinate signal is applied is shown in detail in the circuitry of the variable rate counter decade 95 of FIG. 23.

Decade 95 of FIG. 23 has circuitry which may best be understood by considering it in parts. Thus, before going into a detailed explanation of all of the circuitry of decade 95 in FIG. 23, reference will be made to the fixed rate binary-coded-decimal decade shown in FIG. 25, and then to the decade shown in FIG. 26. The decade of FIG. 25 is a fixed rate count up decade, the exact circuitry of which is included in the variable rate decade 95 of FIG. 23. Thus, the circuitry of the decade of FIG. 25 may be used for the second decade 96 and the third decade 97 of FIG. 23. On the other hand, a more conventional fixed rate binary-coded-decimal counter decade may be used for decades 96 and 97, such as is disclosed in FIG. 9–1 of "Digital Computer Components and Circuits," by R. K. Richards, D. Van Nostrand Co., Inc., 1957, at pages 399 and 400. After the fixed rate decade of FIG. 25 is explained, reference will be made to the decade of FIG. 26 which is identical to that of FIG. 25, except that additional circuitry is added so that the application of an appropriate signal will completely arrest the counting operation of the decade, while the absence of that signal permits the decade to count in the same fixed rate manner as it does in FIG. 25. The decade 95 in FIG. 23 will then be explained since it includes all of the circuitry of the decades of FIGS. 25 and 26 plus additional logic components which constrains decade 95 to count by two.

Consider now, the fixed rate binary-coded-decimal counter of FIG. 25. Four flip-flops, 701, 702, 704, and 708 are arranged in sequence corresponding to the 1-unit, 2-unit, 4-unit, and 8-unit stages of the decade and disposed with the least significant digit on the left. The clock pulse train is applied on lead 26 to the tied trigger input leads 701*c* and 701*d* of the 701 stage, and to the tied trigger input leads 702*c* and 702*d* of the 702 stage; in addition, input lead 26 is applied as the reset trigger lead input 708*d* of stage 708. The set trigger input lead 708*c* of stage 708 is taken from the 704*g* output lead of stage 704. Thus, whether or not a set trigger pulse is applied to the 708 stage through the set trigger lead 708*c*, depends upon whether or not the state of stage 704 is switching from the one to the zero logic level. Similarly, the tied input comprising trigger leads 704*c* and 704*d* of stage 704 is taken from the 702*g* output lead of stage 702.

The state of any of the 701, 702, 704, and 708 stages is determined by the left-hand output leads of those stages designated as 701*g*, 702*g*, 704*g*, and 708*g*, respectively.

Each one of the four stages is arranged as a binary counting stage in the manner of FIG. 4G in the sense that each output lead is applied back to the steering input. The logic table of FIG. 4E is, therefore, descriptive of their operation with the exception of stage 708 which, as indicated above, does not have its set and reset trigger input leads 708*c* and 708*d* tied together. For this reason, the truth table of FIG. 4H should be consulted to understand the operation of that stage.

Although each of the four stages is a counter stage substantially in the sense of FIG. 4G, some of the closed steering loops have additional logic components, and therefore switching conditions, included within the loops. Thus, in the set steering loop of stage 702, is a three-input NOR gate 751 whose output 752 is applied as an input to an inverter 753 (single input NOR gate). The output of inverter 753 is the set trigger input 702*a*. The inputs of the NOR gate 751 are the output lead 702g of the 702 stage, the output lead 701h of stage 701, and the output lead 708g of stage 708. In similar manner, the reset steering loop of stage 702 includes a two-input NOR gate 754 whose output lead 755 is the input to inverter 756, whose output in turn is reset steering lead 702b. The inputs to NOR gate 754 are the output lead 702h of stage 702 and the output lead 701h of stage 701. From the equations of FIGS. 4A and 4C, it may be seen that the sequence of a NOR gate followed by an inverter provide the logical OR function, i.e., with inputs A and B to the NOR gate, the output C from the inverter is equal to A or B.

The right-hand or reset steering loop of stage 708 similarly includes a NOR gate 757 followed by an inverter 758. The output from stage 708 to the next succeeding decade is from the output lead 708g.

Stage 701 is identical to the stage of FIG. 4G and, therefore, its operation is completely described by that portion of the truth table of FIG. 4E enclosed by the heavy line. Thus, every application of a clock pulse on lead 26 switches the state of stage 701 to the alternate state.

With the logic circuit of the decade arranged as in FIG. 25, fixed rate binary counting is performed with successive input pulses on lead 26 in accordance with the diagram of FIG. 24; thus, the permutations of states of the four stages of the counter of FIG. 25 for ten successive input pulses on lead 26 are as represented in FIG. 24. With the logic diagram of FIG. 4H and the circuit of FIG. 25, this fixed rate binary-coded-decimal decade is completely defined. However, in order to get a better sense of the circuitry so as to more readily comprehend the variable rate operation of the decade of FIG. 23, let us examine, in some detail, the operation of the logic components in the steering loops of stages 702 and 708 of FIG. 25.

Consider first stage 702. It may be noted that the clock train is applied to the tied trigger leads 702c and 702d from lead 26. If NOR gates 751, 753, 754, and 756 were not included in the steering loops then stage 702 would operate as a regular counting stage and would change state for each pulse applied on lead 26. However, as was discussed above and as can be seen from the 2-unit stage column of FIG. 24, the state of the 702 stage is not supposed to change state with every clock pulse but rather is supposed to change state for every other pulse in the clock train (except the tenth). The NOR gate circuitry in the loop insures this latter operation. It may be noted that the output lead 701h from the 1-unit stage 701 is applied as an input to both the NOR gates 751 and 754. With stage 701 in the zero state, the 701h output lead is in the one state and, therefore, a logic one signal is applied to both NOR gates 751 and 754. Of necessity, NOR output leads 752 and 755 are in state zero while the outputs from inverters 753 and 756 must, of necessity, be in state one. This means that the 702a and 702b steering inputs to the 702 stage are in the one state. Reference to the logic diagram of FIG. 4E shows that when the set and reset steering leads (A and B) are in the one state there cannot be a change in the state of that stage whether or not a pulse is present on the trigger input leads. Accordingly, stage 702 cannot change state with the application of the next clock pulse and the state of that stage remains the same. When, however, stage 701 changes to the one state, as it does with the application of the next clock pulse, then its 701h output lead will be in the zero state. An application of a zero logic signal to NOR gates 751 and 754 cannot, in itself, produce a one on the 702a and 702b steering leads. Consequently, the 701h outlet lead cannot block a change in state of the 702 stage with the application of the next clock pulse. Accordingly, the 702 stage does change state (barring the effect of the 708g output from stage 708 acting as an input to NOR gate 751) and stage 702 does change state in accordance with the requirements of FIG. 24.

The 2-unit stage column of FIG. 24, and the discussion above, indicate that an additional constraint must be placed on the 702 stage. Although it is true that stage 702 should change state for every other input pulse as the decimal number representation for that decade goes from 0 to decimal number 9, the fact remains that in going from decimal number 9 to decimal number 0, the 2-unit stage should not change state. Thus, the 2-unit stage for decimal numbers 8 and 9 must be in state zero, and it must also be in state zero for the decimal numbers 0 and 1. The output lead 708g from 8-unit stage 708, as shown in FIG. 25, is applied as an input to NOR gate 751. Looking at the permutations of states for decimal number 9 in FIG. 24, shows that the 1-unit stage is in state one. That means the 701h output lead from stage 701 is in state zero and consequently, cannot provide a signal to block the change of state of stage 702 with the next clock pulse unless something more is done. The permutation of states for decimal number 9, however, shows that the 8-unit stage is in state one. Therefore, the output 708g from stage 708 is in the one state and is applying a one along the 708g input lead to NOR gate 751. This means that the 702a steering input to the 702 stage must, of necessity, be in the one state. At the same time, with stage 702 in the zero state as required for the permutation representing decimal number 9, the 702h output lead of that stage is in the one state and, therefore, a one is applied on the 702h lead to the NOR gate 754. Consequently, a one signal is applied to the 702b reset steering input to that stage. With a one at the 702a and 702b inputs to the 702 stage, the next clock pulse cannot change the state of the 702 stage; it is completely blocked from changing states as the truth table of FIG. 4E demonstrates. As a result, changing from the permutation representing decimal number 9 to that representing decimal number 0 is effected properly in that the 2-unit stage remains in the zero state.

By way of brief recapitulation then, the NOR gates 751, 753, 754, and 756 in the steering loops of the 702 stage perform the function of insuring, firstly, that stage 702 does not change state for every clock pulse but rather changes state for every other clock pulse, and secondly, with output 708g from stage 708 coupled to NOR gate 751, it is insured that when the decade changes its representation from decimal number 9, stage 702 remains in its zero state (even though it would ordinarily change to a one state) so as to properly represent the permutation for decimal number 0.

NOR gates 757 and 758 in the reset loop of stage 708 are included for the purpose of insuring that that stage operates in accordance with the typical requirements of a binary-coded-decimal counter decade. If this were a pure binary counter, the application of a clock pulse when the decade represents decimal number 9 would not change the 8-unit stage since a binary counter represents numbers from 0 through 15. In a binary-coded-decimal counter, however, the application of a clock pulse to the counter when it represents decimal number 9 should switch it to a condition representing decimal number 0. Therefore, the 8-unit stage must be switched from a one state to a zero state in order for the counter to go from 9 to 0. This is the function of gates 757 and 758, i.e., to switch the 708 stage from a one state to a zero state after stage 708 has been in the one state for two successive clock pulses. Changing stage 708 from one to zero also, and simultaneously, provides an output pulse from stage 708 to the next succeeding decade in the chain, since a change in logic level from one to zero is a pulse out.

To understand how stage 708 is switched from state one to state zero after it represents decimal number 9, requires knowing the states of all of the input leads to the 708 stage while the decade represents decimal 9. Since trigger input leads 708c and 708d are not tied together, the operation of stage 708 is more complicated than that of stages 701, 702, and 704. However, the truth table of FIG. 4H describes completely the operation of the 708 stage. Consider the state of the input leads to stage 708 when stage 708 is in state one and the entire decade represents decimal number 9. Under these circumstances the 708*g* output lead and, therefore, the 708*a* steering lead are both in the one state. The 708*h* output lead is necessarily in the zero state and so a zero is applied on the 708*h* lead to the input of NOR gate 757. However, the second input lead to NOR gate 757 is in the 701*h* lead. Since stage 701 is in state one, lead 701*h* is in state zero. Accordingly, with both inputs to NOR gate 757 being zero, output lead 759 is in the one state. The output of inverter 758, and the 708*b* reset steering lead, are therefore in the zero state. No pulse is applied to set trigger lead 708*c* since it is derived from output lead 704*g* of stage 704. Since stage 704 did not change state for two successive pulses, it cannot be applying a pulse to the set trigger input 708*c*. The reset trigger input 708*d* to stage 708, is, however, the clock pulse train input lead 26 and, accordingly, a pulse is present on that lead. Thus, the state of all the input leads to the 708 stage are as follows: 708*a* is in state one, 708*b* is in state zero, 708*c* has no pulse applied, and 708*d* does have a pulse applied. Under this set of conditions, reference to the truth table of FIG. 4H demonstrates that stage 708 must change state from one to zero. Since state 708 changes from one to zero, and stage 702 as previously described does not change from its zero state, the permutation representing decimal number 9 is converted to the permutation representing decimal number 0.

FIG. 26 is a replica of the decade of FIG. 25 except that NOR gate 761 and inverter 762 have been inserted in the set steering loop of stage 701, and NOR gate 763 and inverter 764 have likewise been inserted in the reset steering loop of stage 701. Additionally, a counter steering pulse input line 777 is applied as a second input to NOR gate 761 and as a second input to NOR gate 763. This lead is additionally applied as an input to NOR gates 751 and 754 of the set and reset steering loops of stage 702 and to NOR gate 757 in the reset steering loop of stage 708. Since the arrangement of inverter 762 relative to NOR gate 761 is such that the inverter takes its input from the output of the NOR gate, and similarly for inverter 764 and NOR gate 763, the operation of these logic components is analogous to the sets of NOR gates and inverters described relative to FIG. 25.

The circuit of FIG. 26 operates exactly the same as that of FIG. 25 when the input lead 777 has applied thereto a logic state zero signal. When a logic state one signal is applied on lead 777, however, the entire decade is blocked from counting, i.e., the decade does not count at all even though clock input pulses are being applied to the decade on lead 26. That this is the case may be readily seen by viewing the three stages that could conceivably change their states with the application of a clock pulse on lead 26. It may be recalled that clock pulses are applied on lead 26 to the 701*c* and 701*d* trigger inputs of stage 701, to the 702*c* and 702*d* trigger inputs of stage 702, and to the 708*d* reset trigger input to stage 708. If none of these three is to change state with the application of a clock pulse then each of the three must be blocked by the logic one signal applied on lead 777. In the case of the 701 stage this obviously happens. The lead 777 is applied as inputs to the NOR gates 761 and 763; with a one on these inputs the outputs of the NOR gates must be zero. These are followed by the inverters 762 and 764, so that the outputs of these inverters and, therefore, the 701*a* and 701*b* steering leads are at logic state one whenever the input lead 777 is at logic state one. It may be recalled that having a one signal on both steering leads completely blocks any change in state of that stage. With a zero input on lead 777, however, the NOR gate 761 and 763 as well as the inverters 762 and 764 act as if they did not appear in the circuit. The application of a logic one signal on input lead 777 to the NOR gates 751 and 754 coupled to stage 702 performs exactly the same function as those described immediately above relative to stage 701. Consequently the 702 stage is blocked with the application of a one signal on the 777 lead.

In the case of stage 708, the only times when it is ordinarily possible for the 8-unit stage to change state, is when the decade is changing from decimal number 7 to decimal number 8, and when it is changing from decimal number 9 to decimal number 0. At all other times, the 708 stage remains in the state at which it was before the preceding clock pulse. From the earlier description of the decade of FIG. 25, it may be recalled that the logic states for the various inputs to stage 708 as it is about to switch from its decimal number 7 to decimal number 8 condition, and as it is about to switch from its decimal number 8 to its decimal number 0 condition, are such that it can switch under those circumstances if, and only if, a logic state of zero exists at the 708*b* input. However, with a logic one input to NOR gate 757 from the input lead 777, the 708*b* input lead must, of necessity, be at logic state one. This means that stage 708 cannot change its state, i.e., cannot change from a zero to a one state, while the decade is representing decimal number 7 and cannot change from a one to a zero state when the decade is representing decimal number 9. Thus, the added circuitry in the FIG. 26 either permits the decade of FIG. 26 to count regularly as does the decade of FIG. 25, or it prevents it from counting at all, dependent upon whether there is a logic zero signal or a logic one signal on input lead 777.

Referring now to FIG. 23 and the first decade 95 thereof, it may be seen that all of the circuitry of FIG. 26 is incorporated in decade 95, and additional circuitry is included so that the decade may operate as a variable rate counter in accordance with the principles of the invention. That which appears in decade 95 of FIG. 23 which is absent from FIG. 26 is as follows: a NOR gate 781 is associated with the set steering loop of stage 702 in that the output of the three input NOR gate 781 is applied as a second input to the NOR gate 753 previously described. In FIGS. 25 and 26 the NOR gate 753 operated exclusively as an inverter. Now, with the additional input 782 from the output of NOR gate 781, NOR gate 753 operates as a two input NOR gate. Similarly, in the reset steering loop of stage 702 is a two input NOR gate 783 which has its output 784 applied to the NOR gate 756 in the same manner as was described for NOR gate 781. A two input NOR gate 785 is associated with the reset steering loop of stage 708 in a similar manner, in that the output 786 of NOR gate 785 constitutes a second input to the previously described NOR gate 758. A third input to the decade, i.e., in addition to leads 26 and 777, is lead 778 which constitutes an input to each one of the three NOR gates 781, 783, and 785. The NOR gate 781 additionally has two more input leads; the first is 708*g* which is from the 708 stage; and the second is 702*g* from the 702 stage. The second input of NOR gate 783 is 702*h* while the second input to NOR gate 785 is 708*h*.

Depending upon the logic states of the input leads 777 and 778, decade 95 either counts the count pulses coming in on lead 26 straightforwardly one at a time, or does not count the clock pulse coming in at all, or registers a count of two for the clock pulse coming in on lead 26.

More specifically, the decade provides:

A normal count by one when lead 777 is in the zero state and 778 is in the one state;

A count of zero when lead 777 is in the one state and lead 778 is in the one state;

A count of two when lead 777 is in the one state and lead 778 is in the zero state.

The circuitry in decade 95 of FIG. 23, over that shown in FIG. 26, operates with the circuitry of FIG. 26 to produce its effect. Consider first that variable rate decade 95 is to count normally, i.e., a count of one for each clock pulse. This occurs when lead 777 is in state zero and lead 778 is in the one state. Why this is so may be seen from looking at the NOR gates 781, 783, and 785. Each of these NOR gates has an output of zero and, therefore, leaves the respective succeeding NOR gates 753, 756, and 758 unaffected when the input to each of the NOR gates 781, 783, and 785 is a one. Therefore, a one applied on input 778 assures that no new factors are interjected into the circuit above what were considered in connection with FIG. 26. Secondly, consider that decade 95 is to count by zero for each clock pulse (as will be recalled from FIG. 26, this occurs when lead 777 is in the one state). For the same reasons as described immediately above, putting the input lead 778 into the one state assures that it in no way affects the logic arrangement of the decade and so the lead 777 logic state of one controls the decades and blocks its operation.

It is when the 778 input is equal to zero, however, that decade 95 can and will count by two rather than by one or zero. Lead 777 under these circumstances, must be one for the purpose of making sure that the decade is blocked from counting in its normal one count, and the count by two circuitry can take over. It may be recalled that the binary-coded-decimal counter counts by two when the decade is in the decimal 0 through decimal 7 logic conditions, inclusive (see FIG. 24) merely by changing the state of the 2-unit stage 702. The state of stage 702 can change if, and only if, leads 702*g* and 702*a* are in the same state as each other, and leads 702*h* and 702*b* are in the same state as each other (under the assumption, of course, that input lead 777 is in state one). The state of zero on lead 778 is applied to stage 702 circuitry through NOR gates 781 and 783. It is this state of zero which is responsible for making the states of 702*g* and 702*a* equal to each other, and the states of 702*h* and 702*b* equal to each other, so that an input trigger pulse on 702*c* can change the state of that stage.

Consider the set steering loop of stage 702 under the assumption that 702*g* is in the zero state. Under these circumstances the input lead to 781 and 702*g* is zero; the input lead 778 to NOR gate 781 is zero since that is the count by two state of the 778 lead; the 708*g* input lead to NOR gate 781 will also be zero since decade 95 is representing a decimal number from 0 to 7, inclusive, and this requires that the 708 stage be in its zero state. With the three inputs to NOR gate 781 in the zero state, the output of the NOR gate must be one. Consequently, input lead 782 to the succeeding NOR gate 753 is in the one state and the output lead of NOR gate 753, which constitutes the set steering lead 702*a*, must be in its zero condition. Thus, if 702*g* is in its zero state, then 702*a* must also be in its zero state due to the action of the NOR gate 781 with the presence of a zero signal on the 778 lead. Now, consider the set steering loop under the assumption that 702*g* in its one state. Lead 702*g* applies a one to both the NOR gates 781 and 751. This means that each of the outputs 782 and 752, respectively, are in the logic zero state. NOR gate 752 receiving two zero inputs must have a logic one output on the 702*a* lead. Consequently, lead 702*a* must be in the one state when lead 702*g* is in the one state. In this way, the circuitry insures that the 702*a* set steering input lead is always in the same state as the 702*g* output lead whenever input lead 777 is in the one condition and lead 778 is in the zero condition. In exactly the same manner, the circuitry of the reset steering loop of stage 702 operates to insure that reset steering input lead 702*b* is always in the same state as the 702*h* lead. In this way, variable rate decade 95 always has its 2-unit stage swtiched with a clock pulse with the appropriate combination of 777 and 778 input conditions when the entire decade represents any decimal number from 0 through 7, inclusive.

When decade 95 represents decimal number 8, or decimal number 9, however, counting by two requires that the 8-unit stage 708, rather than the 2-unit stage, change its state with a clock pulse. The circuitry added by virtue of the NOR gate 785 in the reset steering lead of stage 708 is responsible for providing this result. Looking at NOR gate 757, it may be seen that one of the inputs is lead 777 which is in the one state for the count by two operation. This means that output lead 759 of NOR gate 757 must be in its zero condition. NOR gate 785, on the other hand, has two inputs both of which are in the zero state, i.e., input lead 778 is in its zero state appropriate for the count by two conditions and input lead 708*h* is necessarily in the zero condition since the 708 stage must be in the one condition in order to represent decimal number 8 or 9. Accordingly, the only two input leads to NOR gate 785 are in the zero condition and, therefore, the output lead 786 thereof is in the one condition. NOR gate 758, receiving its input from NOR gate 785, has a logic one applied thereto on its input lead 786. Accordingly, the output of NOR gate 758 must be zero. It may be recalled that the 708*c* input for the decimal 8 or 9 representation has a pulse absent condition; the 708*d* input has a pulse present condition due to the clock pulse applied; the 708*a* input must necessarily be in the one state since the 708 stage is in the one state. These three conditions, with the impressed condition that 708*b* must be in the zero state as a consequence of the action of NOR circuitry 785 and lead 778 being in the zero state, means that the clock pulse on lead 26 must switch the state of the 708 stage. It is readily verified that if the lead 778 were in state one, the net result would be that lead 708*b* would be in the one state; reference to the truth table of FIG. 4H demonstrates that this would result in the failure of stage 708 to change state.

Since lead 777 is in the one state for this count by two operation, we are assured that no other of the stages 701, 702, 708 can possibly change state since the effect of 777 being in the one condition is to block the operation of those stages. Accordingly, we are assured that with this combination of inputs only the 708 stage changes state with a clock pulse. In this way, decade 95 of FIG. 23 counts by two for every clock pulse input irrespective of which decimal number the decade is then representing.

Various factors enter into determining the logic states of leads 777 and 778. Let the letter "U" represent the logic state of lead 777 and the letter "V" the logic state of lead 778. This means a normal count of one is provided for $U=0$ and $V=1$; a count of zero is provided when $U=1$ and $V=1$; and a count of two is provided when $U=1$ and $V=0$. The logic value of V is dependent upon the following factors: whether or not the distance counter 42 (see FIG. 2) is applying a blocking output signal on lead 93; and whether or not an enabling signal has been generated from the numerical data equipment 21 on lead 22 indicating that the transfer of new data from the buffer storage registers to the active storage registers throughout the control section has been completed. Effectively, a flip-flop (not shown) receives an indication as to whether or not the distance counter has commanded a discontinuance of the application of the pulse train from the function generator 37 on lead 43 to the phase counter. This flip-flop is set to state zero by the application of the signal from the distance counter indicating that the path cut has been completed and the pulse train from the function generator should no longer be applied to the command phase counter. When, however, a new block of data has been transferred into the active storage for the next operation, then the flip-flop has its state changed so that the pulse train from the function generator may be applied and used at the command phase counter. If we represent the state of the flip-flop by the letter "K," then K is equal to zero when the distance counter indicates a block signal, and it is set to one when the transfer of new data to the active storage registers has been completed.

Since counting by zero or by two can only occur when a pulse is applied (which is part of the pulse train whose rate represents commanded velocity) from function generator 37 to the command phase counter 31, both U and V are functions of the appearance or lack of appearance of a pulse on lead 43. The logic state on lead 43 going to the phase counter is represented as variable "L." When L is equal to zero, there is an output from function generator 37 and when it is in the one state there is no output. Both binary variables U and V are dependent upon a synchronizing signal "M."

Since the output pulse of the function generator is a logic state of one or zero maintained for the interval spanned by one computing clock interval which spans a predetermined number (such as 5) of clock pulses on lead 26, each such output pulse is synchronized with a synchronizing signal M to count fast or slow by only one count for each function generator output pulse. This M synchronizing signal is a signal at zero state for one main clock interval preceding each computing clock signal and at state one for other times. This synchronizing signal thus permits only one count up or down (instead of 5) for each function generator output pulse. The M synchronizing signal is derived from states of the divider counter 30 of FIGS. 1 and 2 which generates the lower frequency computing clock signal.

The last binary variable upon which U and V are dependent, is the direction signal "P" which is the positive or negative sense of motion signal derived from the programmed input data. A negative direction signal conforming to a binary one for down-scale counting results in variable rate counter 95 omitting a clock pulse when a clock pulse is applied on lead 26, while a positive direction signal in the form of a binary zero results in the counter counting two for each clock pulse.

From this the binary logic states of U and V and, therefore, of leads 777 and 778 are completely defined relative to the rest of the system shown in FIG. 2 by the following two equations:

$$U=K\cdot\overline{M}\cdot\overline{L} \quad (1)$$

$$\overline{V}=K\cdot\overline{M}\cdot\overline{L}\cdot\overline{P} \quad (2)$$

Equation 2 defines the conditions required for the counter to count by two, i.e., for $V=0$, while Equation 1 defines the conditions required for the counter to be blocked from fixed rate operation and, therefore, either count by zero or by two, i.e., $U=1$.

Throughout the operation of the entire system shown in FIG. 2, the command phase counter 31 continuously operates and frequently cycles at a variable rate. At all times that the control section is operative there is a pulse output from the command phase counter on lead 19, the phase of which is a function of the summation of the zero count and two count operation of the variable rate decade 95. If the variable rate decade were never commanded to count other than in the normal progression of ones, then the output of the phase counter would be a 250 cycle per second square wave precisely in phase with the 250 cycle per second output from the divide by 1000 pulse rate divider 28 on lead 61. In FIG. 27, curve 795 shows the 250 cycle per second reference square wave out from pulse rate divider 28. Curve 796 shows a 250 cycle per second square wave out from the command phase counter on lead 19 under the condition that the counter has always operated as a normal fixed rate counter. Curve 797 shows the output of the command phase counter when one of the input clock pulses has been counted as two pulses. The phase of curve 797 is slightly in advance of curve 795. Since for one input clock pulse the phase counter counted two output pulses, it follows that the leading edge of the first output pulse (of curve 797) from the last decade of the phase counter will be provided after 999 input clock pulses rather than after 1000 clock pulses as would ordinarily be the case if the phase counter counted exclusively by one. Accordingly, the phase lead of curve 797 over that of 795 is equal to one-thousandth of a cycle of the 250 cycle per second pulse train curve 795. Similarly, curve 798 shows the situation for the output of the phase counter when the coutner has counted a zero for one of the input clock pulses. Here the curve 798 lags that of curve 795 slightly. It is approximately one-thousandth of a cycle behind that of curve 795 since the command phase counter had to count one thousand and one input clock pulses before it provided the leading edge of its output pulse. If the velocity command signal from the function generator applied along lead 43 to the command phase counter through appropriate logic arrangements is a pulse train at a steady rate, the phase of curve 797 (or 798 dependent upon whether the velocity is to be in a positive or negative direction) continuously changes relative to curve 795, and at a steady rate. This is because the command phase counter is being told to count two for specified input clock pulses at a fixed rate. Thus, for example, it may be that the frequency of the function generator output pulses is such that it tells the command phase counter to count two pulses for every 25 input clock pulses. Under those circumstances, the phase will change one-thousandth of a period after every 25 input clock pulses. This steady rate of phase shift in the output will change if the pulse rate from the function generator changes. If it does change, the rate of phase shift out from the phase counter will also change.

Throughout the entire operation of the control section of the numerical contouring control system, the command phase counter operates continuously and cyclically and, therefore, need not be reset. However, when the numerical control system is initially started up, it is appropriate to set all of the flip-flops in the command phase counter to the zero state and then start it counting in synchronism with the reference counter. This is readily done by a manual reset lead (not shown) applied to all of the flip-flops in manner well known in the art.

EXTENDED RANGE PHASE DISCRIMINATOR

Shown in FIG. 28 is the detailed circuit of the extended range phase discriminator 18 of FIG. 1, which was shown in block form encompassing reversible counter 78 and digital to analog converter 73 in FIG. 2, and which was previously described to the extent of its relationship to the sub-systems of FIG. 2. It may be recalled that the output pulse train of the command phase counter 31 is applied along lead 19 to the phase discriminator 18 while, at the same time, the output of the resolver 16 is applied through the sine to pulse shaper 69 on lead 70 as a pulse train to the phase discriminator. The phase discriminator compares the phase angle of these two pulse trains and generates an analog error signal directly proportional to the magnitude of the phase difference, and having a polarity directly related to whether the phase of the command pulse train is leading or lagging.

The phase discriminator includes a flip-flop 801 having as its 801*c* input the lead 19 from the command phase counter, and a flip-flop 802 having as its 802*c* input lead the lead 70 from resolver 16. The 801*g* and 802*g* output leads of the 801 and 802 flip-flops are applied to the up-count and down-count inputs, respectively, of reversible counter 810. Reversible counter 810 comprises four flip-flops 811, 812, 814, and 818 having a decimal weight of one unit, two units, four units and eight units, respectively. Reversible counter 810 is essentially the same as the reversible counter described above with reference to FIG. 13 as part of the pulse rate multiplier shown in the velocity command block 29 in connection with the automatic acceleration and deceleration aspect of the invention. In FIG. 13, the reversible counter is connected to operate in binary-coded-decimal form. Reversible counter 810, however, operates as a pure binary counter. Accordingly, counter 810 is simpler in its logic arrangement than the previously described reversible counter and the previously described reversible counter may be converted into a pure binary reversible counter in manner well known in the art.

The 801*h* and 802*h* output leads of flip-flops 801 and 802 are applied as inputs to the digital to analog converter 849. Similarly, the output leads of reversible counter 810 are applied to the digital to analog converter 849 at different points in network 849. The output of the digital/analog converter on lead 821 is applied through summing point 848 to operational amplifier 822 operating as a summing amplifier. The output of summing amplifier 822 is in turn applied to a smoothing network 819 which functions to average the output from the amplifier.

The set trigger inputs 801*c* and 802*c* of flip-flops 801 and 802 have applied thereon a 250 cycle per second pulse train from phase counter 31 and resolver 16 respectively, so that each flip-flop is set with each pulse of the train if there is means provided for resetting. This is so since flip-flops 801 and 802 are arranged as counter stages such as shown in FIG. 4G except that the set and reset trigger leads are not tied together. The reset trigger leads 801*d* and 802*d* have applied thereon a pulse train at a much higher pulse repetition rate than 250 cycles per second. More specifically, 801*d* has applied thereon a pulse train of 25 kilocycles per second as does reset trigger lead 802*d* except that the pulse train on reset trigger lead 802*d* is 180 degrees out of phase with the pulse train on lead 801*d*. The 25 kilocycles per second pulse train may be derived elsewhere in the system. For example (referring to FIG. 2), the 50 kilocycle per second output pulse train from pulse rate divider 30 on lead 81 may be tapped off and applied to a counting stage flip-flop such as shown in FIG. 4G. Applying the 50 kilocycle pulse train as the trigger input to such a stage, results in the set steering output of that flip-flop being a 25 kilocycle per second pulse train while that on the reset steering output lead being a 25 kilocycle per second pulse train which is 180 degrees out of phase with the pulse train on the other output lead. These two outputs are applied, respectively, to the reset trigger input leads 801*d* and 802*d* of flip-flops 801 and 802 to provide the two 25 kilocycle per second pulse trains out of phase with each other which are required to perform the resetting function of the 801 and 802 flip-flops.

Every time flip-flop 801 is set by virtue of a pulse being applied from the 250 cycle per second pulse train on lead 19, it is shortly thereafter reset by a pulse from the 25 kilocycle per second pulse train applied on lead 801*b* (and similarly, for the operation of flip-flop 802). More specifically, after the 801 flip-flop is set by a pulse on lead 801*c*, it is reset some time less than 40 microseconds later since that is the period of a 25 kilocycle rate. Each time stage 801 is set, therefore, the output lead 801*g* goes from state zero to one and output lead 801*h* goes from state one to zero. The 801*h* output lead, in going from state one to zero, therefore, applies an input to digital to analog converter 849. When the pulse on reset trigger lead 801*d* is applied to reset flip-flop 801, and 801*g* output lead switches from one to zero and, therefore, an input pulse is applied to reversible counter 810 on the count-up lead of stage 811. In similar manner, flip-flop 802 applies an input to digital to analog converter 849 from its output lead 802*h* when it is being set by an input on set trigger lead 802*c* from resolver 16 while it applies an input pulse to reversible counter 810 on the count-down lead of stage 811 when a reset trigger pulse is applied on input lead 802*d*.

When the pulse trains on input leads 801*c* and 802*c* are less than 360 degrees apart in phase, reversible counter 810 sequentially counts down one, and counts up one, and does not register a count more than one unit different from its pre-set condtion (reversible counter 810 is normally pre-set by an initial electronic pre-set input 823 to a one state for all four stages. (See third row of FIG. 4F truth table.)

Let us consider the operation of the phase discriminator of FIG. 28 under three specific sets of conditions such that the over-all capabilities of the circuit may be fully appreciated. We will first consider the situation wherein the 250 cycle pulse train from resolver 16 is only a small fraction of a cycle in advance of the 250 cycle per second pulse train from command phase counter 31. The second situation to be considered is when both of the pulse trains are exactly in phase; and the third situation we will investigate is when the resolver pulse train is slightly more than 360 degrees in advance of the pulse train from the command phase counter.

Consider first the situation where the resolver output pulse train is slightly ahead of that from the command phase counter. The first pulse to enter the phase discriminator is the pulse of the 250 cycle per second train arriving at flip-flop 802 from resolver 16 and functioning to set flip-flop 802 by virtue of its being applied on set trigger lead 802*c*. Reference to FIG. 29 shows curve 823 which represents part of the pulse from the resolver. Curve 823 is shown with the ordinate representing voltage rather than a logic state (as indicated above, zero volts represents logic state one while a positive voltage represents logic state zero). The leading edge of the pulse of curve 823 is applied on lead 802*c* and, therefore, sets flip-flop 802 as can be seen from curve 824. Curve 824 represents the logic state of flip-flop 802; thus, the leading edge of curve 823 at time *t1* serves to set flip-flop 802. Curve 825 shows the 25 kilocycle reset trigger input on lead 802*d* to flip-flop 802; the ordinate of that curve represents voltage rather than the logic state. It may be seen, therefore, that an input pulse is applied to flip-flop 802 at time *t2*. Accordingly, a reset trigger pulse is applied to flip-flop 802 whereupon it is reset as indicated by curve 824 at time *t2*. Thus, flip-flop 802 is back at its zero logic state at time *t2*. At time *t1*, the setting of flip-flop 802 results in an input pulse to converter 849 on the output lead 802*h*, whereupon, a positive current indicated by curve 826, commences to be provided out from converter 849 on lead 821. At time *t2*, when curve 824 shows that flip-flop 802 has been reset, the 802*g* output lead applies an input pulse to the count-down input of reversible counter 810. Accordingly, the reversible counter at time *t2* is registering a count of 1110, which is one count lower than its zero error representation of 1111 (shown in curve 830). Thus, even though output lead 802*h* no longer is providing an input to converter 849, the reversible counter 810 is providing an input to the converter and accordingly, an output on lead 821 from the converter is maintained beyond time *t2* as a consequence of the action of the reversible counter.

The leading edge of the command pulse on lead 19 is applied to flip-flop 801 at time *t3*, as shown in curve 827, whereupon, flip-flop 801 is set as indicated in curve 828. The output lead 801*h*, therefore, applies an input to converter 849, whereupon, a negative current commences flowing to precisely offset the positive current from the converter due to the output from reversible counter 810. Accordingly, the positive and negative currents at time *t3* are balanced out and a net zero current results as shown in curve 826 at time $t3$. Shortly thereafter, at time $t4$, the reset pulse shown in curve 829 is applied on lead 801*d* to flip-flop 801. This results in resetting flip-flop 801, whereupon, the 801*g* output lead therefrom provides a count-up input to reversible counter 810. Accordingly, at time $t4$, the reversible counter state is returned back to its zero error signal representation of 1111 and, simultaneously, the 801 flip-flop is reset as indicated in curve 828. Since flip-flop 801 is reset at time $t4$ and the reversible counter is back at its zero error state, there are no inputs to converter 849 at all. Accordingly, there is a zero output as shown at curve 826 at time $t4$. The net over-all result is that at time $t1$, when the resolver pulse is applied to flip-flop 801 (see curve 823) a positive current output results from converter 849 (see curve 826), and this output continues until a command pulse is applied at time $t3$ to flip-flop 801 (see curve 827) whereby the positive current ceases at time $t3$ from the converter (see curve 826). Thus, that phase difference between the resolver and command pulses is converted to a current having a duration precisely equal to the phase difference between the command and resolver pulses.

Now let us consider what happens when the command and resolver pulses are applied to their respective flip-flops 801 and 802 simultaneously as shown by curves 831 and 832, respectively, of FIG. 30. At that time, both flip-flops are set (curves 833 and 834) so that an input signal is applied on leads 801*h* and 802*h* to the converter 849. This results in a positive and negative current of equal magnitude being applied out from converter 849 whereupon they cancel each other completely as shown in curve 835. When the reset trigger pulse (curve 836) is applied at time $t2$ to flip-flop 802, reversible counter 810 is required to count down one count because of the change of state of output lead 802*g* (curve 837). Accordingly, the reversible counter is applying an input to converter 849, while lead 802*g* from flip-flop 802 is no longer providing the input. Thus, at time $t2$ a positive current is generated in the converter due to the reversible counter which balances out the negative current due to the input on lead 801*h* from flip-flop 801. When the trigger pulse is applied to flip-flop 801 on lead 801*d*, it is reset (curve 833), resulting in 801*h* no longer providing an input to converter 849 and also resulting in 801*g* forcing the reversible counter to count up one count to its zero error state (curve 837). Thus, at the time $t3$, there are no input signals at all to the converter 849. Curve 835, therefore, demonstrates that the output from the converter is zero at all times, even though the broken lines show that, for the period from time $t1$ through time $t3$, positive and negative currents are balanced out due to the action of the flip-flops 801 and 802 and reversible counter 810.

Although the pulse rate of the reset trigger pulse trains applied on leads 801*d* and 802*d* need not be 25 kilocycles, it is desirable to have them applied at a rather higher rate than the command and resolver pulse trains (consistent with the switching capabilities of the reversible counters). The higher the rate, the shorter will be the periods during which the flip-flops are in their set condition and, therefore, the shorter will be the periods that current will flow from the converter 849 due to an input thereto from leads 801*g* and 802*g*. This is of importance when the resolver and command pulses are applied simultaneously to produce a zero error output signal from the converter. The reason this is so can be understood when you consider that for the command and resolver pulse trains being in phase, a zero error signal out is required. Any inadvertent variation in the amount of time the positive and negative currents flow, will result in a spurious error signal. If these periods are short, then a small percentage error in either one of them results in a minute difference between them. If these currents flow for a long time because the reset trigger pulses may be of low frequency, then a small percentage error in either of them results in a substantially larger difference between them and, therefore, a substantial but spurious error signal, when otherwise a zero error signal should obtain.

Let use consider now the situation wherein a phase difference of more than one full cycle occurs between the resolver and command pulses. The situation is similar to that shown by the curves of FIG. 29 except that the reversible counter registers a full down-count of one for a full four milliseconds (one period for a 250 cycle train) and registers a down-count of two for an additional period corresponding to the phase difference in excess of one full cycle, i.e., for a period identical to the time difference between $t1$ and $t3$ of FIG. 29.

In order to more fully understand how the signals on the input leads to the converter 849 are actually converted into output currents and then into an analog potential representing an error signal which may then serve to drive a servo motor, reference will now be made to the detailed circuit of the digital to analog converter 849.

The digital to analog (D/A) converter 849 shown in schematic detail in FIG. 31, converts the error, from the average states of counter 810 and two flip-flops 801 and 802, which represents a phase difference to a D.-C. current which is amplified to drive the positioning motor. The inputs to D/A converter 849 are the outputs of the counter and two flip-flops. To explain the operation of D/A converter 849 the relation to error of the reversible counter 810 and the flip-flops 801 and 802 will be summarized.

Neglecting for the moment the small corrections to be applied for the time when flip-flops 801 and 802 are set, the measure of the error phase angle is 360 degrees multiplied by the average count with sign, found in the reversible counter, 810. As previously explained, the counter is initially preset to the state we are using to represent zero, when the error is less than 180 degrees and then registers the phase angle of error as its average state by counting up one count each time 801 is reset, which closely follows a command signal, and counting down one count each time 802 is reset, which closely follows a resolver signal. For example, when the counter is in the +1 unit state for .75 of a cycle and the +2 state for the other .25 of a cycle, the average count is +1.25 which represents a phase angle difference equal to 1.25 cycles or 450 degrees.

This is converted to a D.-C. signal of analog character through diode switches in D/A converter 849 which are controlled by reversible counter 810. While the counter is in the +1 state a current of one unit is switched into the summing point 848 of operational amplifier 822. While reversible counter 810 is in the +2 state a current of 2 units is switched into summing point 848. As this summing point is the input to high-gain operational amplifier 822, a feedback current of equal but opposite sign to the total input current is produced by the amplifier, and the output voltage of the amplifier is smoothed by filter 819 and feed to the servo motor control. The total input current to summing point 848 contains the small currents switched by flip-flops 802 and 801 as well as the major portion of the current switched by counter 810. The connections shown are those to let a negative current into summing point 848 be produced by a positive count in counter 810 so that the amplifier output voltage is positive for a positive count in the counter. Likewise, a negative count switches a positive current into the summing point and produces a negative output from the amplifier. It should be noted that it is the average current that is important since the output of the operational amplifier is passed through a smoothing filter before being applied to the motor control. In the example above, the current was 1 unit for 75% of the time and 2 units for 25% of the time, but the average was 1.25 units.

The basic switching operation may be understood in connection with the several diode switching circuits of FIG. 31. The control signal voltage at point 855 may be of either a positive or negative polarity and in this specific embodiment at this point the positive voltage is 2 volts and the negative voltage is 3 volts. With a positive voltage at 855, diode 856 is back biased since current flowing from the +105 volt bus through resistor 861 and diode 858 to the summing point 859 puts point 857 at nearly the same potential as point 859 which being the summing point is virtually zero volts. The only potential between 857 and 859 is the diode drop of a fraction of a volt. With a negative control signal voltage at 855, current from the +105 volt bus through resistor 861 flows through diode 856, placing point 857 at nearly −3 volts (the potential of point 855 less the diode drop) and back biasing diode 858 so that no current flows into summing point 848. Thus, a positive control voltage switches the current through resistor 861 into summing point 848 and a negative output switches this current so that it does not enter the summing point.

The immediately preceding explanation was for positive currents, but converter 849 also has switching circuits for negative currents, the basic circuit of which is shown in the arrangement of resistor 860 and diodes 851 and 854. The operation is similar except that a negative control voltage at 850 switches the current through diode 854 and into summing point 848 and a positive control voltage switches the current through diode 851 so that it does not enter the summing point. The advantage of switching a current in the manner described rather than using directly an output current from a NOR gate, is that the current from a NOR gate could not be made exactly zero since the nominal zero volts output is not precisely zero. In this arrangement current can be switched to zero except for a completely negligible leakage of the diode. As seen in FIG. 31, circuit 849 contains NOR logic elements 871 through 879, and resistor voltage dividers 881 through 887 for using the states of counter 810 and flip-flops 801 and 802 to control switching circuits of the type described. Resistors 860 through 865 are to give the desired current in each switching circuit.

In this embodiment reversible counter 810 is a four stage binary counter having 16 states. One of these is used as the zero state; seven states are used to count seven in a positive direction, and seven are used to count seven in a negative direction. The 16th state operates an excess error circuit (not shown) to indicate that the capacity of the counter has been exceeded and synchronism is lost because the servo failed to maintain correspondence within 7 cycles. This is an abnormal condition.

In this embodiment, an error of three cycles, which is three resolver revolutions, is the maximum that is ever required to produce top servo motor speed; consequently, the circuit operates so that all errors greater than three cycles continues to give the same error greater current as at three cycle error. FIG. 32 is a tabulation of the 16 states of reversible counter 810 in terms of the states of its component internal flip-flops, the inches of error each state represents when that state exists for the full cycle and the current produced from converter 849 during the time the counter is in a particular state. One unit of current over the full cycle corresponds to 0.1 of an inch error. In FIG. 32, the last four columns show the units of current switched into the summing point 848 for each state of reversible counter 810. Thus the zero state, 1111, switches no current into the summing point; the +1 state, 0000, switches −1 unit of current into the summing point; the +2 state, 0001, switches −2 units and other positive states up to 8 switch −3 units, that is both the −1 unit and the −2 units. Logic equations 3, 4, 5, and 6, immediately below, define the states of counter 810 required for switching each of the four values with the NOR gate circuits coupling, as shown, the counter outputs and the diode circuits.

(3) −1 unit of current$=(\mathbf{811}h+\mathbf{812}g+\mathbf{814}g)\cdot\mathbf{818}h$ (4) −2 units current$=(\mathbf{811}g+\mathbf{812}g+\mathbf{814}g)\cdot\mathbf{818}h$ (5) +1 unit of current$=(\mathbf{811}h+\mathbf{814}h)\cdot\mathbf{818}g$ (6) +2 units current$=(\mathbf{812}h+\mathbf{814}h)\cdot\mathbf{818}g$ In these logic equations, the designation of a counter output lead as a binary variable, signifies the logic state on that lead.

The arrangement of diodes 866, 867, and 878 is basically no different from that previously described except that the current through resistor 864 is switched into summing point 848 only if both control voltages at points 869 and 870 are positive, and the current is diverted from the summing point when either voltage at points 869 or 870 is negative.

The small correction currents switched by flip-flops 802 and 801 are of 1 unit negative and 1 unit positive respectively, but are of very short duration. Remembering that one of these flip-flops is set by the command and the other by the resolver signal immediately upon the appearance of the respective signal and each is reset only when a count resulting from the flip-flop being set is entered in counter 810, it is seen that a current must be switched into the summing point for each of these flip-flops in order to represent this small part of the cycle. The need for this correction was pointed out earlier in describing the operation of the counter.

In summary of the operation of converter 849, the total current into the summing point 848 over any one cycle of the 250 cycle signal, consists of a small negative current switched by flip-flop 801, a small positive current switched by flip-flop 802, and current switched by the states of counter 810 which may be either positive or negative depending on the direction of error. The net current is precisely proportional to error. A particular case is that of zero error where there are three small component currents which all add up to a total current of zero.

While the principles of the invention have now been made clear in illustrative embodiments, there will be immediately obvious to those skilled in the art many modifications in structure, arrangement, proportions, the elements, materials, and components, used in the practice of the invention, and otherwise, which are particularly adapted for specific environments and operating requirements, without departing from those principles. The appended claims are therefore intended to cover and embrace any such modifications, within the limits only of the true spirit and scope of the invention.

What is claimed as new and desired to be secured by Letters Patent of the United States is:

1. A phase comparison means, comprising: a reversible counter having two input leads and normally registering a reference number which may be varied by one unit in a first arithmetic sense for each pulse applied to one of said two input leads and by one unit in a different arithmetic sense from said first sense for each pulse applied to the other one of said two input leads; a digital to analog conversion means responsive to the output of said counter for generating an analog signal of magnitude commensurate with the number of units difference between said reference number and the actual number registered in said counter over at least a portion of the range of operation of said counter; and input logic means coupled to said two input leads of said counter and to said conversion means for precluding the simultaneous application of pulses on said two counter input leads and for defining by virtue of its logic state, during a portion of its operation, to which of said inputs of said counter a pulse was last applied.

2. A phase discriminator, comprising: first and second bistable devices; means for registering the changes in state of said bistable devices, with the outputs of said bistable devices applied as inputs to said registering means; and circuit means responsive to an output of each of said bistable devices and to the outputs of said registering means for generating an analog signal which is a function of said outputs of said bistable devices and said outputs of said registering means.

3. A phase discriminator as recited in claim 2 including means coupled to the inputs of said first and second bistable means for precluding the simultaneous application of pulses to the inputs of said registering means.

4. A phase discriminator for providing an output signal directly proportional in magnitude to the phase difference between two input signals to said discriminator even though said phase difference exceeds half a cycle, comprising: two bistable multivibrators each having first and second output leads; a reversible pulse counter having a count-up input supplied by a second output lead of one of said multivibrators and a count-down input supplied by a second output lead of the other of said multivibrators; said first output leads of said multivibrators and the output leads of said reversible counter being coupled to a common circuit; said common circuit comprising a conversion means for providing an output electrical analog signal of magnitude proportional to the time interval between an input to one of said multivibrators and an input to another of said multivibrators and of a polarity dependent upon which of said multivibrators first receives its input relative to the other.

5. A phase discriminator as recited in claim 4 including means coupled to said bistable multivibrators for preventing a coincident application of pulses on both the count-up and count-down inputs of said reversible counter.

6. A phase discriminator as recited in claim 5 wherein said coincidence prevention means comprises a first reset input lead to one of said multivibrators and a second reset input lead to the other of said multivibrators, and means for applying a pulse train on each of said reset input leads out of synchronism with the pulse train on the other reset input lead.

7. A phase discriminator for providing an output signal directly proportional in magnitude to the phase difference between two input signals to said discriminator even though said phase difference exceeds a full cycle, comprising: first and second bistable devices having first and second pulse train inputs, respectively; a reversible counting circuit; a digital to analog signal converter; means for coupling the outputs of said first and second bistable devices to said counting circuit and to said digital to analog converter; means for coupling the outputs of said counting circuit to said digital to analog converter; and means coupled to the inputs of said first and second bistable devices for precluding the application of outputs from said first and second bistable devices to said counting circuit temporally spaced more closely to each other than a specified finite time interval, said time interval being at least equal to the time required by said counting circuit to change its count by one unit.

8. A phase discriminator for providing an output signal directly proportional in magnitude to the phase difference between two input signals to said discriminator even though said phase difference exceeds a full cycle, comprising: first and second bistable devices; means for generating and applying a first input pulse train to said first bistable device and separate means for generating and applying a second input pulse train to said second bistable device; the pulse length of all pulses in both said trains being substantially uniform and equal; reset pulse generating means for applying first and second resetting pulse trains to the reset inputs of said first and second bistable devices, respectively, each of said resetting pulse trains comprising pulses having a length which is a small fraction of the length of pulses in said first and second input pulse trains and having a much higher pulse frequency than said first and and second input pulse trains; means for delaying one of said first and second resetting pulse trains relative to the other for a finite time less than a cycle of one of said resetting pulse trains; a reversible counter having its count-up input derived from an output of said first bistable device and its count-down input derived from an output of said second bistable device; a conversion circuit having inputs from said first and second bistable devices and from said reversible counter for providing an output signal equal to the sum of the signals of which the state of said counter is representative and the signal of which the state of at least one of said bistable devices is representative.

9. A phase discriminator as recited in claim 8 including a smoothing circuit to which said output of said conversion circuit is applied.

10. A phase discriminator operative over a range of phase difference greater than one cycle, comprising: first and second bistable devices each of which has set and reset inputs; means coupled to said reset inputs for precluding the simultaneous application of reset pulses to said inputs; a reversible counter having a count-up input lead and a count-down input lead to which outputs from said first and second bistable devices are applied, respectively, said reversible counter normally registering a reference number which is varied one unit in a first algebraic sense for each pulse applied on said count-up lead and one unit in the opposite aglebraic sense for each pulse applied on said count-down lead; conversion circuit means, having as its inputs an output from each of said first and second bistable devices and the outputs from said reversible counter, for algebraically combining signals representative of the magnitude and algebraic sense of the difference between the number in said reversible counter and said reference number with signals from said first and second bistable devices, said signal from said first bistable device being operated upon by said conversion circuit as of opposite algebraic sense from said signal from said second bistable device.

11. A phase discriminator as recited in claim 10 including smoothing circuit means in the output of said conversion circuit means for time averaging the algebraically combined signals of said conversion circuit.

12. A phase sensitive automatic machine tool control system, comprising: computer means for generating a phase modulated command pulse train wherein command information for directing the motion of said machine tool is borne by the phase modulation of said command pulse train; position indicating means for generating a phase modulated position pulse train wherein position information indicative of the actual position of said machine tool is borne by the phase modulation of said position pulse train; comparison means for generating a servo error signal proportional to the phase difference between said command and position pulse trains comprising first and second bistable devices responsive to said command and position pulse trains, respectively; a reversible pulse counter having as its inputs outputs from said first and second bistable devices, a conversion circuit for providing an output signal of magnitude proportional to the time interval between a command pulse train input to said first bistable device and a position pulse train input to said second bistable device and of a polarity dependent upon which of said bistable devices first receives its input relative to the other, and means for coupling an output from each of said bistable devices and outputs from said reversible counter as inputs to said conversion circuit.

References Cited by the Examiner

UNITED STATES PATENTS

| | | | |
|---|---|---|---|
| 2,885,613 | 5/59 | Myracle et al. | 318—28 |
| 2,905,895 | 9/59 | Gordon | 324—79 |
| 2,926,335 | 2/60 | Bower | 340—170 |
| 2,928,033 | 3/60 | Abbott | 318—28 |
| 2,943,248 | 6/60 | Ritchey | 318—23 |
| 2,998,190 | 8/61 | Rosenberg et al. | 235—151 |
| 3,015,806 | 1/62 | Wang et al. | 340—147 |

MALCOLM A. MORRISON, *Primary Examiner.*

DARYL W. COOK, *Examiner.*